(12) United States Patent
Katsuki et al.

(10) Patent No.: US 10,852,127 B2
(45) Date of Patent: Dec. 1, 2020

(54) IMAGE PROCESSING APPARATUS AND METHOD, DATA, AND RECORDING MEDIUM

(71) Applicant: SONY CORPORATION, Tokyo (JP)

(72) Inventors: Yugo Katsuki, Tokyo (JP); Yohsuke Kaji, Chiba (JP); Naoki Kobayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/779,937

(22) PCT Filed: Dec. 2, 2016

(86) PCT No.: PCT/JP2016/085925
§ 371 (c)(1),
(2) Date: May 30, 2018

(87) PCT Pub. No.: WO2017/104447
PCT Pub. Date: Jun. 22, 2017

(65) Prior Publication Data
US 2018/0364032 A1    Dec. 20, 2018

(30) Foreign Application Priority Data
Dec. 18, 2015   (JP) ................................ 2015-247437

(51) Int. Cl.
*H04N 7/18*     (2006.01)
*G01B 11/25*    (2006.01)
(Continued)

(52) U.S. Cl.
CPC .......... *G01B 11/2513* (2013.01); *G01B 11/25* (2013.01); *G01B 11/254* (2013.01);
(Continued)

(58) Field of Classification Search
CPC ... G01B 11/25; G01B 11/2513; G01B 11/254; G06T 3/00; G06T 7/521; H04N 5/74
See application file for complete search history.

(56) References Cited

U.S. PATENT DOCUMENTS 6,369,899 B1   4/2002   Hamada
2010/0309301 A1*   12/2010   Thiel .................... A61B 5/0088
                                                                                                   348/77
(Continued)

FOREIGN PATENT DOCUMENTS

DE    102007058590 A1    6/2009
DK    2217878 T3    10/2018
(Continued)

OTHER PUBLICATIONS

Partial supplementary European Search Report of EP Application No. 16875430.7, dated Jul. 3, 2019, 14 pages.
(Continued)

*Primary Examiner* — Peet Dhillon
(74) *Attorney, Agent, or Firm* — Chip Law Group

(57) ABSTRACT

The present disclosure relates to an image processing apparatus and method, data, and a recording medium by which the invisibility of corresponding point detection can be improved. A pattern picked up image obtained by image pickup, by an image pickup section, of a predetermined structured light pattern projected by a projection section and having a plurality of, for example, patterns 101-1 and 102-2 and so forth, each of which has a luminance distribution of a Gaussian function like, for example, a curve 102-1 or 102-2, disposed therein, is used to detect corresponding points between a projection image projected by the projection section and a picked up image picked up by the image pickup section. The present disclosure can be applied, for example, to an image processing apparatus, a projection (Continued)

apparatus, an image pickup apparatus, a projection image pickup apparatus, a control apparatus, a projection image pickup system and so forth.

12 Claims, 39 Drawing Sheets

(51) Int. Cl.
  *H04N 5/74* (2006.01)
  *G06T 3/00* (2006.01)
  *G06T 7/521* (2017.01)
(52) U.S. Cl.
  CPC ............... *G06T 3/00* (2013.01); *G06T 7/521* (2017.01); *H04N 5/74* (2013.01)

(56) References Cited

U.S. PATENT DOCUMENTS

| | | | |
|---|---|---|---|
| 2015/0036105 A1* | 2/2015 | Ide | H04N 9/3129 353/31 |
| 2015/0124055 A1 | 5/2015 | Kotake et al. | |
| 2015/0279016 A1* | 10/2015 | Kim | G06T 7/80 382/154 |
| 2016/0178355 A1* | 6/2016 | Ge | G01B 11/22 348/136 |

FOREIGN PATENT DOCUMENTS

| | | | |
|---|---|---|---|
| EP | 2217878 A2 | 8/2010 | |
| JP | H06223184 A * | 8/1994 | |
| JP | 2000-292135 A | 10/2000 | |
| JP | 2009-216650 A | 9/2009 | |
| JP | 2014-071850 A | 4/2014 | |
| JP | 5714908 B2 | 5/2015 | |
| JP | 2015-111101 A | 6/2015 | |
| JP | 2015-222250 A | 12/2015 | |
| KR | 20150112362 A * | 10/2015 | ............... G06T 7/80 |
| WO | 2009/071611 A2 | 6/2009 | |
| WO | 2015/166915 A1 | 11/2015 | |

OTHER PUBLICATIONS

Skar, et al., "The Office of the Future: A Unified Approach to Image-Based Modeling and Spatially Immersive Displays", SIGGRAPH 98, Computer Graphics Proceedings, Annual Conference Series, Jul. 19-24, 1998, 10 pages.
International Search Report and Written Opinion of PCT Application No. PCT/JP2016/085925, dated Feb. 28, 2017, 12 pages of translation and 10 pages of ISRWO.
International Preliminary Report on Patentability of PCT Application No. PCT/JP2016/085925, dated Jun. 28, 2018, 13 pages of English Translation and 07 pages of IPRP.
Raskar, et al., "The Office of the Future: A Unified Approach to Image-Based Modeling and Spatially Immersive Displays", Computer Graphics Proceedings, Annual Conference Series, SIGGRAPH 98, Jul. 19-24, 1998, 10 pages.
Office Action for CN Patent Application No. 201680072382.6, dated Feb. 3, 2020, 05 pages of Office Action and 07 pages of English Translation.

\* cited by examiner

FIG. 24

IMAGE PROCESSING APPARATUS AND METHOD, DATA, AND RECORDING MEDIUM

CROSS REFERENCE TO RELATED APPLICATIONS

This application is a U.S. National Phase of International Patent Application No. PCT/JP2016/085925 filed on Dec. 2, 2016, which claims priority benefit of Japanese Patent Application No. JP 2015-247437 filed in the Japan Patent Office on Dec. 18, 2015. Each of the above-referenced applications is hereby incorporated herein by reference in its entirety.

TECHNICAL FIELD

The present disclosure relates to an image processing apparatus and method, data, and a recording medium, and particularly to an image processing apparatus and method, data, and a recording medium by which the invisibility of corresponding point detection can be improved.

BACKGROUND ART

In the past, a method has been available in which, in order to implement reduction of distortion of a projection image projected by a projector and positioning of individual projection images by a plurality of projectors, an image of a projection image is picked up by a camera and geometric correction of the projection image according to the position or the posture of the projector, the shape of the projection plane or the like is performed using the picked up image. In such a method as just described, it is necessary to determine a corresponding point between the projection image and the picked up image.

For example, as online sensing that is a technology for determining a corresponding point while an image of a content or the like is projected, a method (for example, refer to NPL 1) for embedding a Gray code into a projection image has been proposed.

CITATION LIST

Non Patent Literature

[NPL 1]
Imperceptible Structured Light Ramesh Raskar, SIGGRAPH 98

SUMMARY

Technical Problem

However, since the Gray code is large in luminance variation gradient and has a spatially regular pattern and further necessitates projection of many patterns, there is the possibility that the Gray code may be liable to be perceived by a user who views the projection image.

The present disclosure has been made in view of such a situation as described above and makes it possible to improve the invisibility of corresponding point detection.

Solution to Problem

An image processing apparatus of a first aspect of the present technology is an image processing apparatus including a corresponding point detection section that detects, using a pattern picked up image obtained by image pickup, by an image pickup section, of a given structured light pattern projected by a projection section and having a plurality of patterns, each of which has a luminance distribution of a Gaussian function, disposed therein, corresponding points between a projection image projected by the projection section and a picked up image picked up by the image pickup section.

An image processing method of the first aspect of the present technology is an image processing method including detecting, using a pattern picked up image obtained by image pickup, by an image pickup section, of a given structured light pattern projected by a projection section and having a plurality of patterns, each of which has a luminance distribution of a Gaussian function, disposed therein, corresponding points between a projection image projected by the projection section and a picked up image picked up by the image pickup section.

An image processing apparatus of a second aspect of the present technology is an image processing apparatus including a corresponding point detection section that detects, using a pattern picked up image obtained by image pickup, by an image pickup section, of a structured light pattern that is projected by a projection section and has a plurality of patterns of a plurality of types disposed therein and in which the patterns are disposed such that, based on a code string obtained by permutation expansion of variables into which a pattern group in a partial region of a given size from within the structured light pattern is converted, a position of the partial region in the structured light pattern is determined uniquely, corresponding points between a projection image projected by the projection section and a picked up image picked up by the image pickup section.

The corresponding point detection section may convert the patterns included in the pattern picked up image into variables and permutation-expand the variables to determine a code string, and search for the partial region corresponding to a code string coincident with the code string corresponding to the patterns included in the pattern picked up image from within the structured light pattern to detect the corresponding point.

The corresponding point detection section may search a code string coincident with the code string corresponding to the patterns included in the pattern picked up image from within a code string group corresponding to partial regions of the structured light pattern, and detect the corresponding point based on a position of the partial region, with which the code string coincides, in the structured light pattern.

The code string group corresponding to the partial regions of the structured light pattern may be configured only from code strings that belong to groups different from each other, and the corresponding point detection section may be configured such that, in regard to all of the code strings belonging to the same groups as those of the code strings corresponding to the patterns included in the pattern picked up image, a coincident code string can be searched out from within the code string group corresponding to each partial region of the structured light pattern.

The group may include code strings obtained by converting patterns of a given pattern group into variables and permutation expanding the variables and code strings obtained by rotating the pattern group by a given angle, converting the patterns of the rotated pattern group into variables and permutation expanding the variables.

The corresponding point detection section may extract the patterns from the pattern picked up image obtained by the image pickup section picking up a superimposition image of an arbitrary image projected by the projection section and the structured light pattern.

The corresponding point detection section may extract the patterns using a first pattern picked up image obtained by the image pickup section picking up a superimposition image of an arbitrary image projected by the projection section and a positive image of the structured light pattern and a second pattern picked up image obtained by the image pickup section picking up a superimposition image of the arbitrary image projected by the projection section and a negative image of the structured light pattern.

Each of the patterns may have a luminance distribution of a Gaussian function.

The structured light pattern may be configured from four kinds of patterns that are combinations of two kinds of luminance distributions having luminance variation directions opposite to each other and two directions having principal axes of inertia different from each other.

An image processing method according to the second aspect of the present technology is an image processing method including detecting, using a pattern picked up image obtained by image pickup, by an image pickup section, of a structured light pattern that is projected by a projection section and has a plurality of patterns of a plurality of types disposed therein and in which the patterns are disposed such that, based on a code string obtained by permutation expansion of variables into which a pattern group in a partial region of a given size from within the structured light pattern is converted, a position of the partial region in the structured light pattern is determined uniquely, corresponding points between a projection image projected by the projection section and a picked up image picked up by the image pickup section.

An image processing apparatus according to a third aspect of the present technology is an image processing apparatus including a generation section that generates a structured light pattern in which a plurality of patterns each having a luminance distribution of a Gaussian function are disposed and which is provided for detecting corresponding points between a projection image projected by a projection section and a picked up image picked up by an image pickup section.

An image processing method according to the third aspect of the present technology is an image processing method including generating a structured light pattern in which a plurality of patterns each having a luminance distribution of a Gaussian function are disposed and which is provided for detecting corresponding points between a projection image projected by a projection section and a picked up image picked up by an image pickup section.

An image processing apparatus according to a fourth aspect of the present technology is an image processing apparatus including a generation section that generates a structured light pattern that has a plurality of patterns of a plurality of types disposed therein and is provided for detecting, based on a code string obtained by permutation expansion of variables into which a pattern group in a partial region of a given size from within the structured light pattern is converted, corresponding points between a projection image projected by the projection section and having the patterns such that a position of the partial region in the structured light pattern is determined uniquely and a picked up image picked up by the image pickup section.

An image processing method according to the fourth aspect of the present technology is an image processing method including generating a structured light pattern that has a plurality of patterns of a plurality of types disposed therein and is provided for detecting, based on a code string obtained by permutation expansion of variables into which a pattern group in a partial region of a given size from within the structured light pattern is converted, corresponding points between a projection image projected by the projection section and having the patterns such that a position of the partial region in the structured light pattern is determined uniquely and a picked up image picked up by the image pickup section.

Data according to a fifth aspect of the present technology is data of a structured light pattern in which a plurality of patterns each having a luminance distribution of a Gaussian distribution are disposed and which is provided for detecting corresponding points between a projection image projected by a projection section and a picked up image picked up by an image pickup section.

A recording medium according to the fifth aspect of the present technology is a recording medium that has store therein data of a structured light pattern in which a plurality of patterns each having a luminance distribution of a Gaussian distribution are disposed and which is provided for detecting corresponding points between a projection image projected by a projection section and a picked up image picked up by an image pickup section.

Data according to a sixth aspect of the present technology is data of a structured light pattern that has a plurality of patterns of a plurality of types disposed therein and is provided for detecting, based on a code string obtained by permutation expansion of variables into which a pattern group in a partial region of a given size from within the structured light pattern is converted, corresponding points between a projection image projected by the projection section and having the patterns such that a position of the partial region in the structured light pattern is determined uniquely and a picked up image picked up by the image pickup section.

A recording medium according to the sixth aspect of the present technology is a recording medium that has stored therein data of a structured light pattern that has a plurality of patterns of a plurality of types disposed therein and is provided for detecting, based on a code string obtained by permutation expansion of variables into which a pattern group in a partial region of a given size from within the structured light pattern is converted, corresponding points between a projection image projected by the projection section and having the patterns such that a position of the partial region in the structured light pattern is determined uniquely and a picked up image picked up by the image pickup section.

In the image processing apparatus and method according to the first aspect of the present technology, a pattern picked up image obtained by the image pickup section picking up, a predetermined structured light pattern in which a plurality of patterns having a luminance distribution of a Gaussian function projected by a projection section are disposed is used and a corresponding point is detected by a projection image projected by the projection section and a pickup image picked up by the image pickup section is detected.

In the image processing apparatus and method in the second aspect of the present technology, a pattern picked up image obtained by picking up, by the image pickup section, a structured light pattern projected by the projection section and in which plural kinds of patterns are disposed and in which the pattern is disposed based on a code string obtained by variable and permutation expansion of a pattern group in a partial region having a predetermined size of the structured light pattern such that a position of the partial region in the structured light pattern is determined uniquely is used and a corresponding point is detected by a projection image projected by the projection section and a pickup image picked up by the image pickup section is detected.

In the image processing apparatus and method in the third aspect of the present technology, a structured light pattern in which a plurality of patterns having a luminance distribution of a Gaussian function are disposed and that is used for detecting corresponding points between a projection image projected by a projection section and a pickup image picked up by an image pickup section is generated.

In the image processing apparatus and method in the fourth aspect of the present technology, a structured light pattern in which plural kinds of patterns are disposed and a pattern is disposed based on a code string obtained by variable and permutation expansion of a pattern group in a partial region having a predetermined size of the structured light pattern such that a position of the partial region in the structured light pattern is determined uniquely and that is used for detecting corresponding points between a projection image projected by a projection section and a pickup image picked up by an image pickup section is generated.

In the data and the recording medium in the fifth aspect of the present technology, a structured light pattern is obtained in which a plurality of patterns having a luminance distribution of a Gaussian function are disposed and that is used for detecting corresponding points between a projection image projected by a projection section and a pickup image picked up by an image pickup section.

In the data and the recording medium in the sixth aspect of the present technology, a structured light pattern is obtained in which plural kinds of patterns are disposed and a pattern is disposed based on a code string obtained by variable and permutation expansion of a pattern group in a partial region having a predetermined size of the structured light pattern such that a position of the partial region in the structured light pattern is determined uniquely and that is used for detecting corresponding points between a projection image projected by a projection section and a pickup image picked up by an image pickup section.

Advantageous Effect of Invention

With the present disclosure, an image can be processed. Especially, the invisibility of corresponding point detection can be improved.

BRIEF DESCRIPTION OF DRAWINGS

FIGS. 24A and 24B are views illustrating an example of a manner of code string generation.

DESCRIPTION OF EMBODIMENTS

In the following, modes for carrying out the present disclosure (hereinafter referred to as embodiments) are described. It is to be noted that the description is given in the following order.

1. First Embodiment (Structured Light Pattern)
2. Second Embodiment (Structured Light Pattern Generation Apparatus)
3. Third Embodiment (Projection Image Pickup System)
4. Fourth Embodiment (Projection Image Pickup System and Projection Image Pickup Apparatus)

1. First Embodiment

<Corresponding Point Detection and Geometric Correction>

Figure 1:
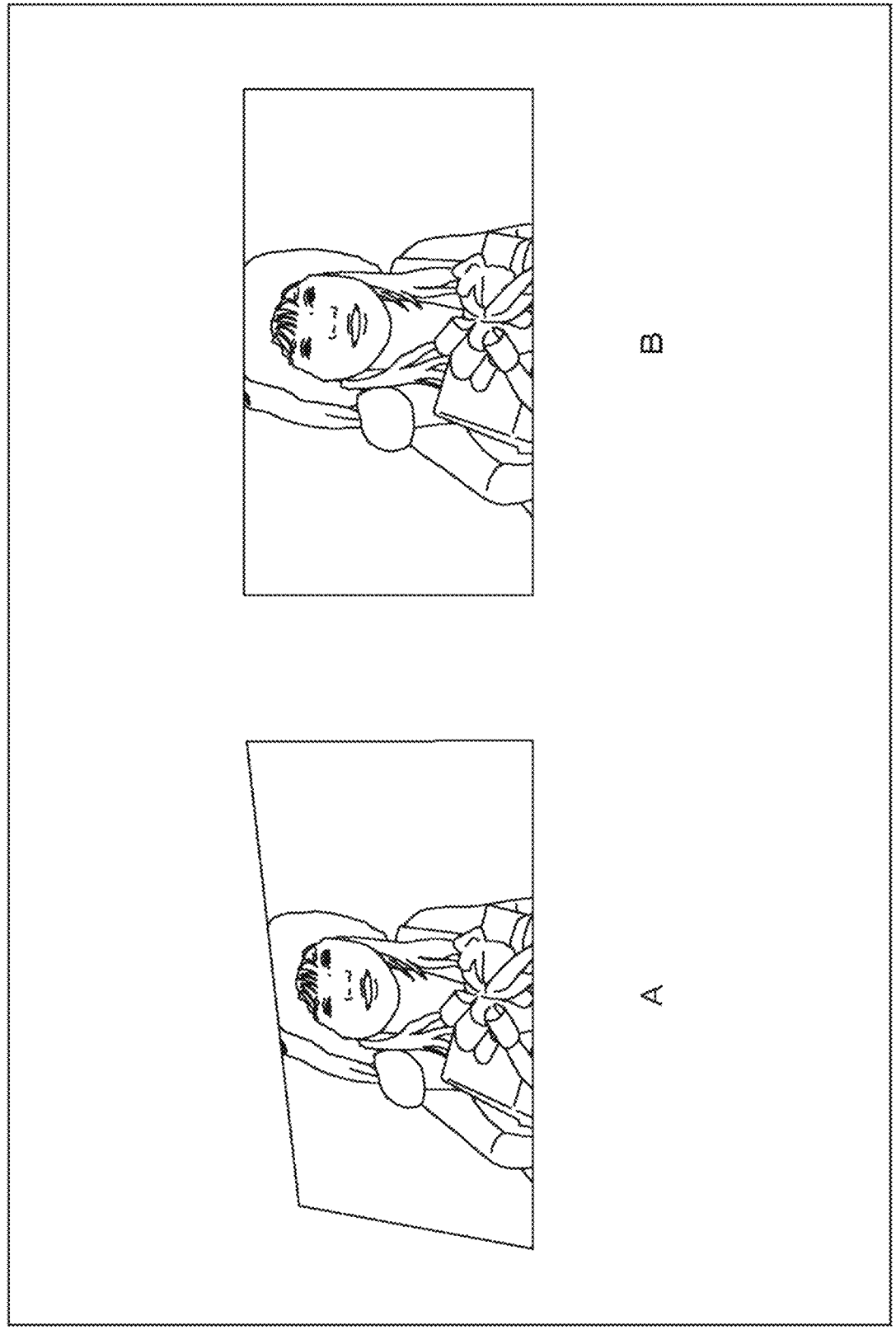
FIGS. 1A and 1B are views depicting an example of a manner of geometric correction.

A projected image (also referred to as projection image) is sometimes distorted and becomes hard to see, for example, as depicted in FIG. 1A, depending upon a posture (position, orientation or the like) of a projector with respect to a projection plane (screen, wall or the like), the shape of the projection plane or the like. In such a case as just described, by performing geometric correction such as correction or the like of the distortion for an image to be projected by the projector, it is possible to reduce the distortion of the projection image and make the projection image easy to see like an example of FIG. 1B.

Figure 2:
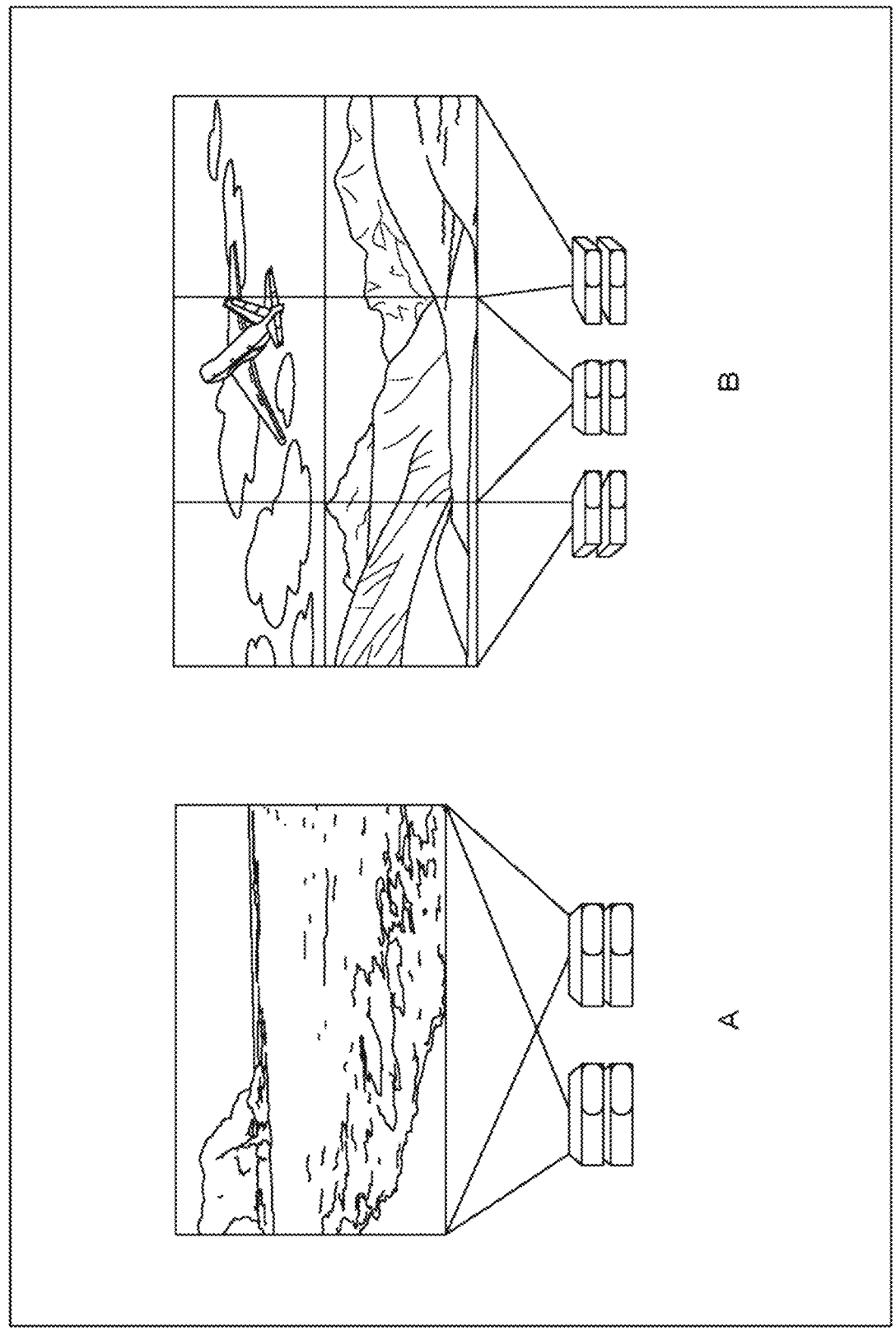
FIGS. 2A and 2B are views depicting an example of a manner of geometric correction.

Further, a system is available in which images are projected by a plurality of projectors to form a single projection image as in an example of FIGS. 2A and 2B. For example, a method is available by which images are projected from a plurality of projectors to the same position to increase the contrast ratio to implement a high dynamic range as in FIG. 2A. Further, for example, a method is available by which projection images projected from individual projectors are lined up as depicted in FIG. 2B to implement a projection image greater than a projection image projected by a single projector (projection image of a higher resolution than that of a projection image projected by a single projector). In the case of those methods, if the positional relationship between projection images projected from the individual projectors is inappropriate, then there is the possibility that the projection images may be displaced and superimposed relative to each other or an unnecessary gap may appear between the projection images, resulting in degradation of the picture quality of the projection image as a whole. Therefore, it sometimes becomes necessary not only to perform such distortion correction as described above for the individual projection images but also to perform geometric correction such as positioning of the images relative to each other and so forth.

Figure 3:
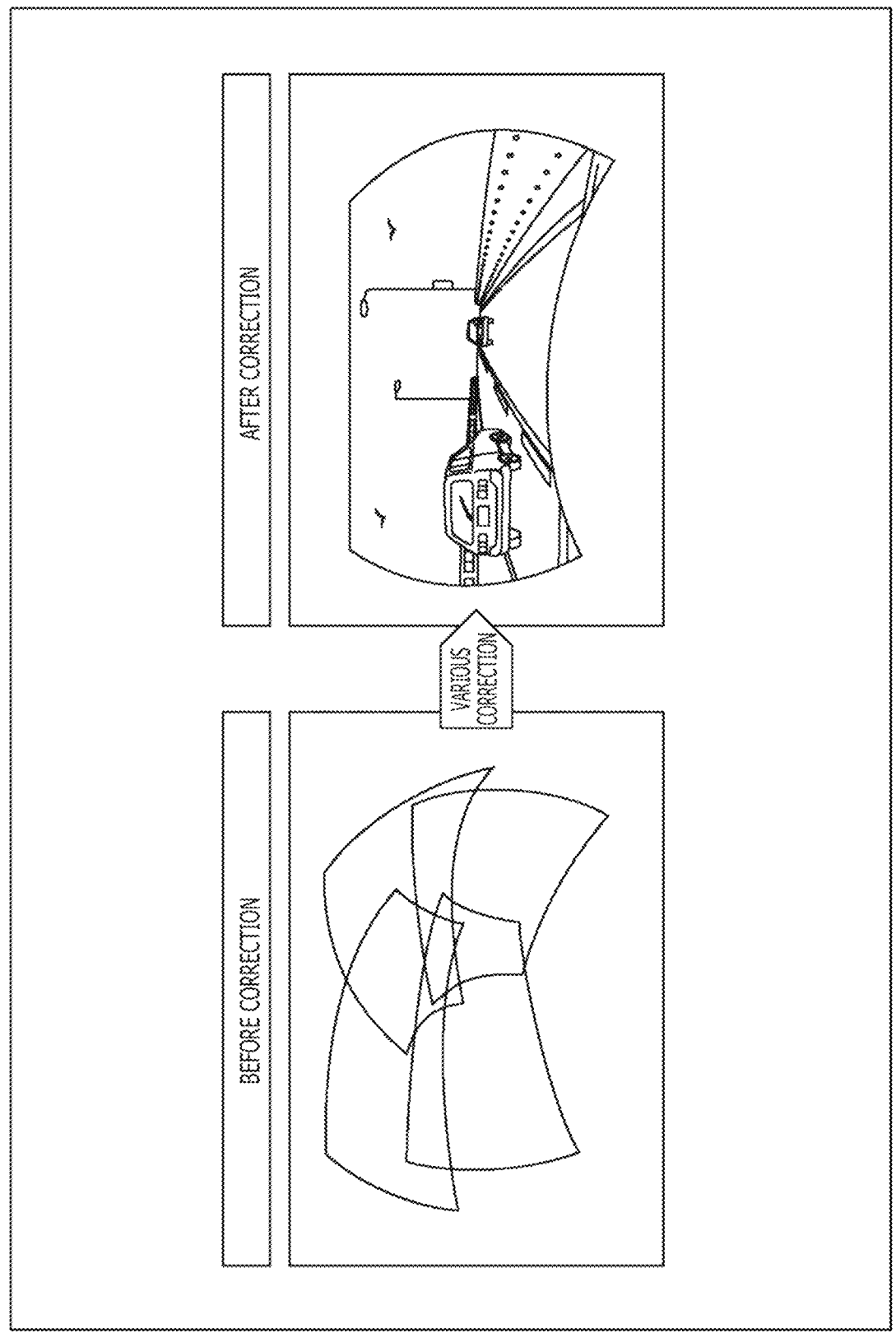
FIG. 3 is a view depicting an example of a manner of geometric correction.

By performing geometric correction for images to be projected in this manner, also in the case in which images are projected from a plurality of projectors to a projection plane of a curved face as in the example of FIG. 3, the images can be projected like a single image. It is to be noted that, in the case where a plurality of projection images are lined up to form a large projection image as in the example of FIG. 2B or of FIG. 3, by superimposing (overlapping) some of adjoining projection images with each other as in the example of FIG. 3, positioning of the projection images can be facilitated.

Although such geometric correction can be performed manually by an operator or the like who operates the projectors, there is the possibility that cumbersome works may be required. Therefore, a method has been proposed by which an image of projection images projected by projectors is picked up using a camera and the picked up image is used to perform geometric correction.

Figure 4:
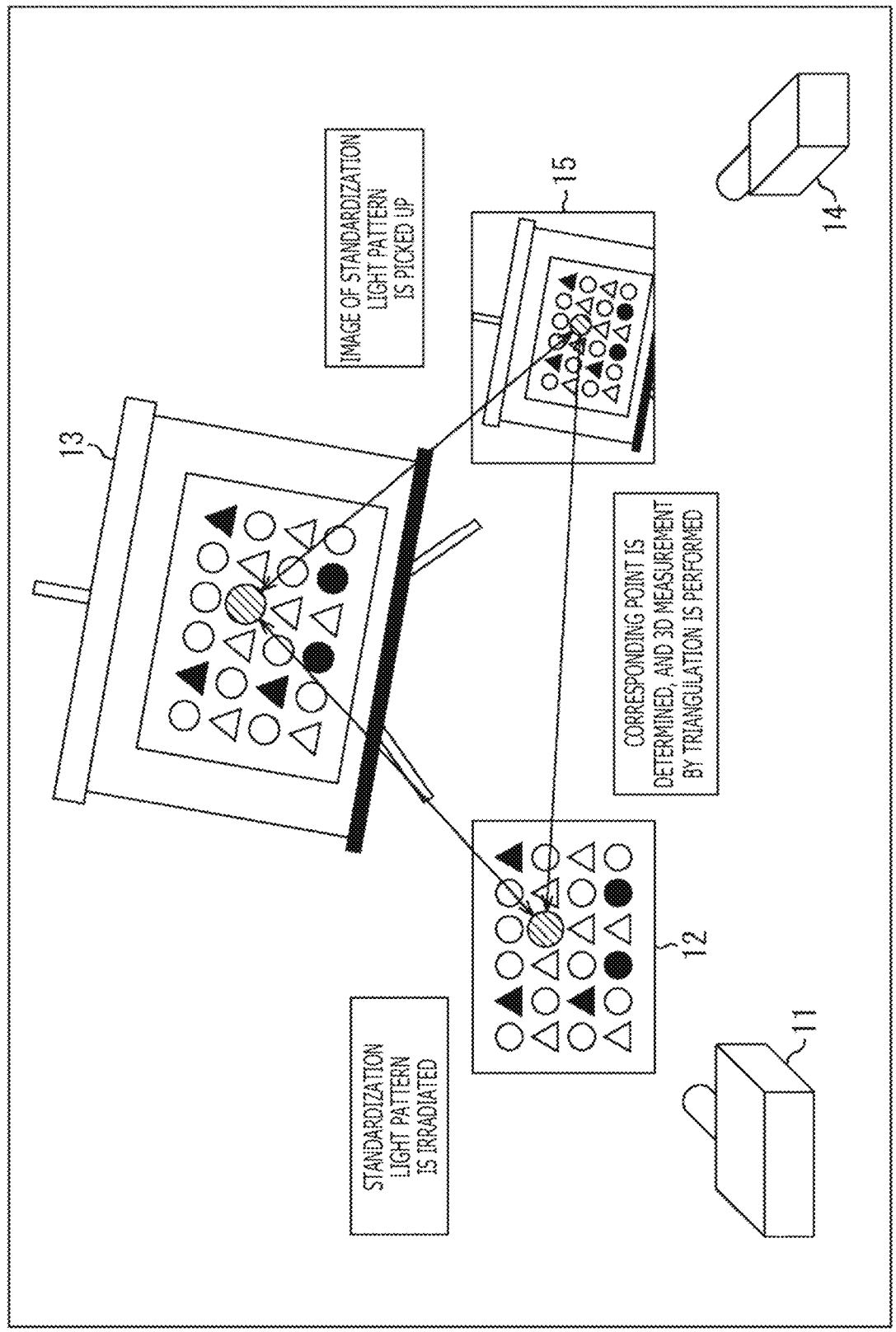
FIG. 4 is a view depicting an example of a manner of corresponding point detection.

For example, as in an example of FIG. 4, a standardization light pattern 12 of a predetermined picture is projected from a projector 11 to a screen 13, and an image of the projected standardization light pattern 12 is picked up by a camera 14 to obtain a picked up image 15. Then, corresponding points of the standardization light pattern 12 and the picked up image 15 are determined on the basis of the picture of the standardization light pattern 12, and a posture (positional relationship) between the projector 11 and the camera 14, a shape of the screen 13 and so forth are determined by triangulation or the like on the basis of the corresponding points. Then, geometric correction is performed on the basis of a result of the determination. This makes it possible to perform geometric correction more easily than that in an alternative case in which geometric correction is performed manually.

In the case where geometric correction is performed utilizing a camera in this manner, it is necessary to determine, between the projection image (which may otherwise be an image to be projected) and the picked up image, corresponding points (pixels corresponding to positions, which are same as each other on the projection plane, of the projection image and the picked up image). In other words, it is necessary to determine a corresponding relationship between pixels of the camera 14 (picked up image 15) and pixels of the projector 11 (standardization light pattern 12).

Further, in the case where a plurality of projectors are used as in the example of FIGS. 2A and 2B or FIG. 3, also it is necessary to determine a positional relationship between the individual projection images.

Figure 5:
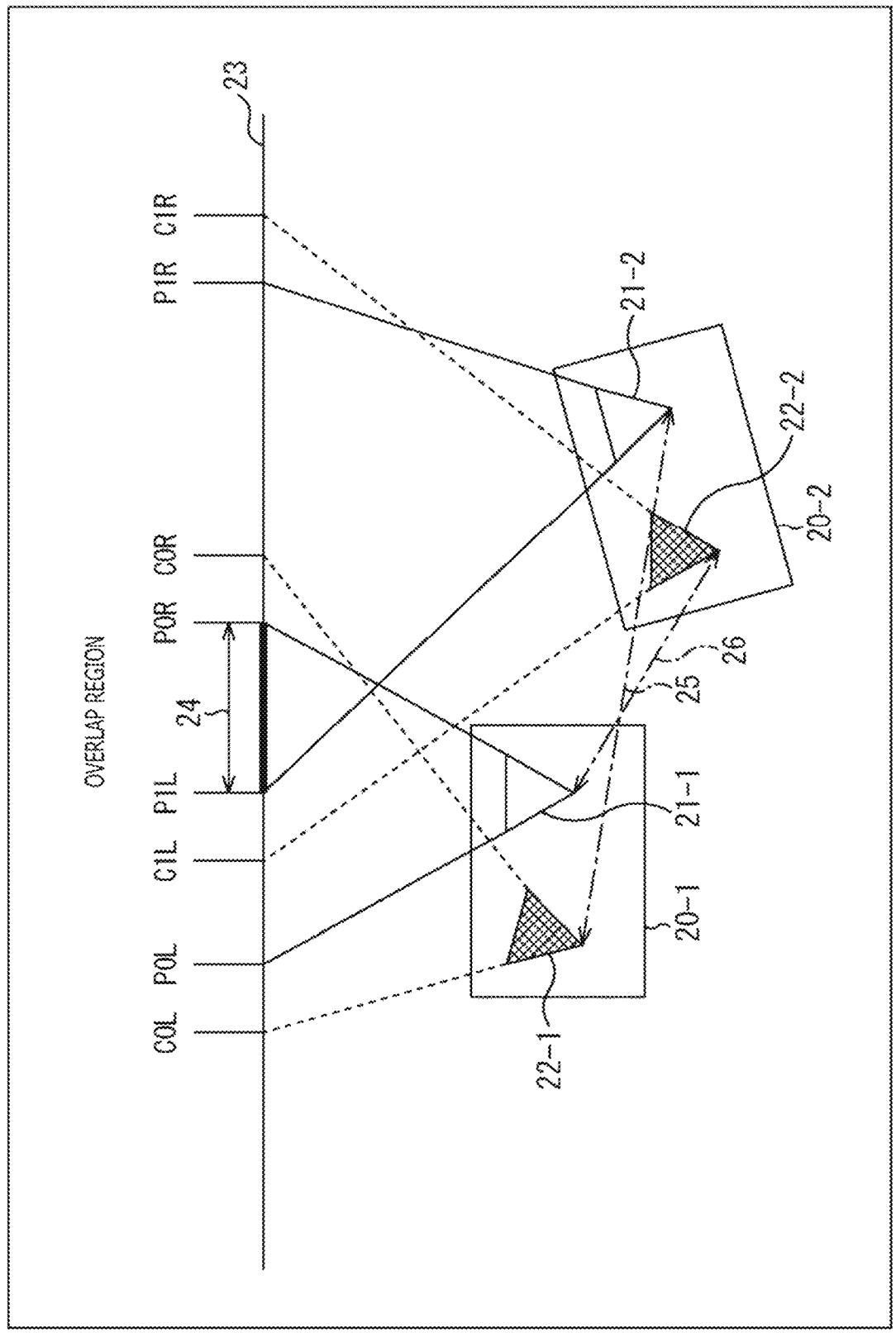
FIG. 5 is a view depicting an example of a manner of corresponding point detection.

For example, it is assumed that, as in an example of FIG. 5, a projection image pickup apparatus 20-1 including a projection section 21-1 (projector) and an image pickup section 22-1 (camera) and a projection image pickup apparatus 20-2 including a projection section 21-2 (projector) and an image pickup section 22-2 (camera) are made cooperate with each other to project an image. Here, in the case where there is no necessity to describe the projection image pickup apparatus 20-1 and the projection image pickup apparatus 20-2 in a distinguished manner from each other, each of them is referred to as projection image pickup apparatus 20. Further, in the case where there is no necessity to describe the projection section 21-1 and the projection section 21-2 in a distinguished manner from each other, each of them is referred to as projection section 21. Furthermore, in the case where there is no necessity to describe the image pickup section 22-1 and the image pickup section 22-2 in a distinguished manner from each other, each of them is referred to as image pickup section 22.

As depicted in FIG. 5, the projection region (range of the projection image) of a projection plane 23 by the projection section 21-1 of the projection image pickup apparatus 20-1 is the range of P0L to P0R. Meanwhile, the projection region of the projection plane 23 by the projection section 21-2 of the projection image pickup apparatus 20-2 is the range of P1L to P1R. In short, the range indicated by a double headed arrow mark (range of P1L to P0R) is an overlap region in which the projection images are superimposed with each other.

It is to be noted that the image pickup region (range included in the picked up image) of the projection plane 23 by the image pickup section 22-1 of the projection image pickup apparatus 20-1 is the range of C0L to C0R. Meanwhile, the image pickup region (range included in the picked up image) of the projection plane 23 by the image pickup section 22-2 of the projection image pickup apparatus 20-2 is the range of C1L to C1R.

Figure 6:
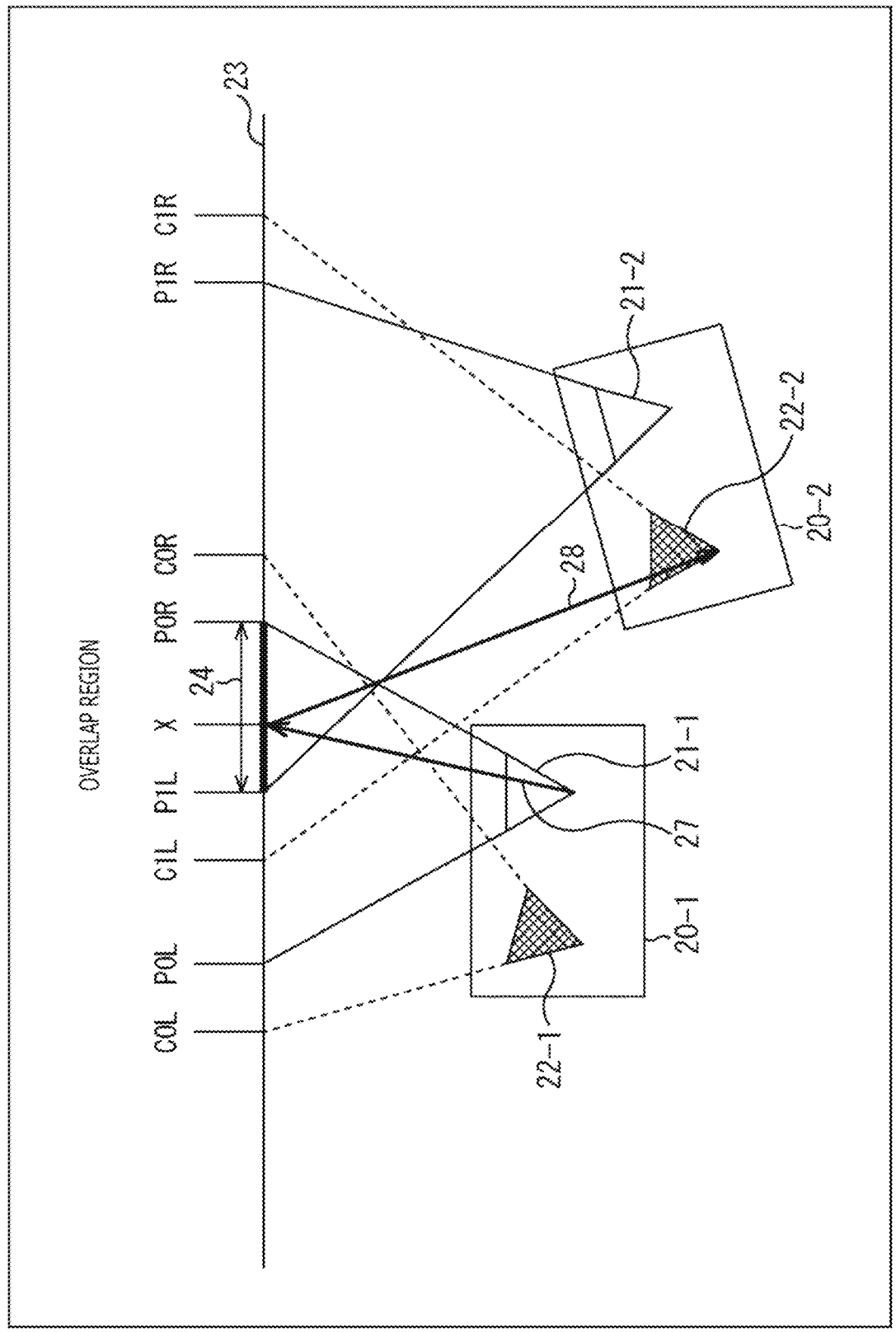
FIG. 6 is a view depicting an example of a manner of corresponding point detection.

In the case of such a system as described above, in order to perform positioning of projection images relative to each other, it is necessary not only to determine corresponding points between the projection section 21 and the image pickup section 22 on each projection image pickup apparatus 20 but also to determine corresponding points between the projection section 21 and the image pickup section 22 between the projection image pickup apparatus 20. Therefore, for example, it is determined which pixel of the image pickup section 22-2 (arrow mark 28) receives light (arrow mark 27) irradiated from a certain pixel of the projection section 21-1 after it is reflected at X of the projection plane 23 as depicted in FIG. 6. Further, a similar pixel corresponding relationship is determined also between the projection section 21-2 and the image pickup section 22-1.

By determining corresponding points between all projection sections 21 and all image pickup sections 22 between which corresponding points can be determined in this manner, it is possible to perform positioning of an overlap region (range indicated by the double headed arrow mark 24) by geometric correction.

<Online Sensing>

Although it is considered that such corresponding point detection for geometric correction as described above may be performed before projection of an image is started, there is the possibility that the corresponding points may be displaced by an influence or the like of a disturbance such as a temperature, vibration or the like while an image is projected after initial installation. If the corresponding point is displaced, then there is the possibility that the geometric correction may become inappropriate, resulting in occurrence of distortion or positional displacement of the projection image.

In such a case as just described, it is necessary to re-perform corresponding point detection. However, to interrupt projection of an image to this end is not preferable to a user who is viewing the image (there is the possibility that the satisfaction may be degraded). Therefore, a method for detecting a corresponding point while projection of an image is continued (online sensing) has been proposed.

As the online sensing technology, for example, a method that utilizes invisible light such as Infrared light or the like, a method that utilizes an image feature amount such as SIFT, an ISL (Imperceptible Structured Light) method and so forth have been proposed. In the case of the method that utilizes invisible light such as Infrared light or the like, since a projector for projecting invisible light (for example, an Infrared projector) is further necessitated, there is the possibility that the cost may increase. Meanwhile, in the case of the method that utilizes an image feature amount such as SIFT or the like, since the detection accuracy or the density of corresponding points relies upon the image content, it is difficult to perform corresponding point detection with stable accuracy.

In contrast to them, in the case of the ISL method, since visible light is utilized, increase of system components (namely, increase of the cost) can be suppressed. Further, corresponding point detection can be performed with stable accuracy without depending upon the image to be projected.

<ISL Method>

The ISL method is a technology by which a structured light pattern that is an image of a predetermined pattern is embedded in a positive-negative reversed relationship into a projection picture and is projected such that it is not perceived by a human being.

Figure 7:
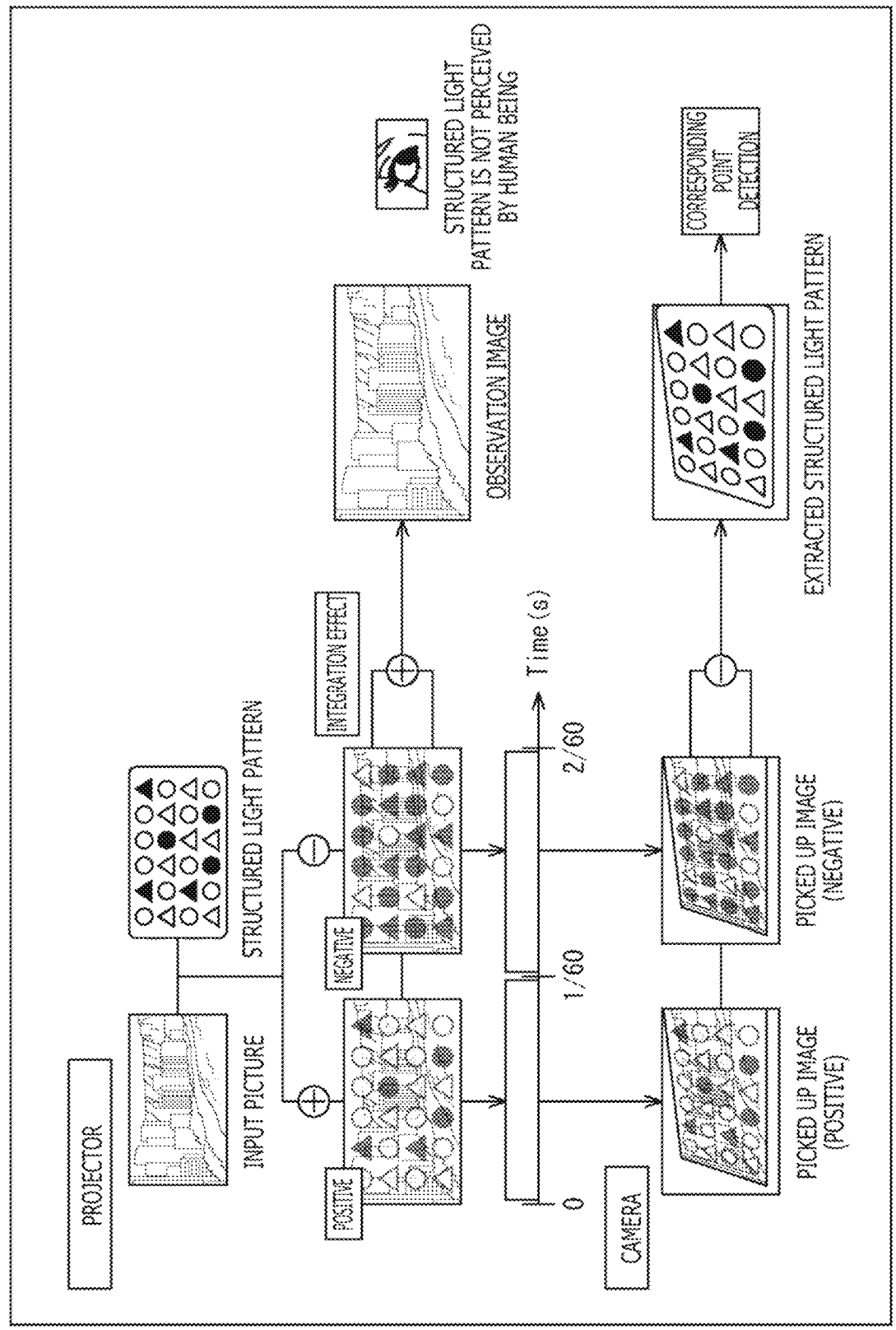
FIG. 7 is a view illustrating an example of ISL.

As depicted in FIG. 7, a projector adds a predetermined structured light pattern to a certain frame of an input image to generate a frame image in which a positive image of the structured light pattern is synthesized with the input image, and subtracts the structured light pattern from a next frame of the input image to generate a frame image in which a negative image of the structured light pattern is synthesized with the input image. Then, the projector successively projects the frames. The two positive and negative frames changed over at a high speed are perceived to the eyes of a human being such that they are added by an integration effect. As a result, it becomes difficult for a user who views the projection image to recognize the structured light pattern embedded in the input image.

In contrast, the camera picks up images of the projection images of the frames and determines the difference between the picked up images of the frames to extract only the structured light pattern included in the picked up image. Corresponding point detection is performed using the extracted structured light pattern.

In this manner, since, in the ISL method, a structured light pattern can be extracted readily only by determining the difference between the picked up images in this manner, corresponding point detection can be performed with stable accuracy without depending upon the image to be projected.

Figure 8:
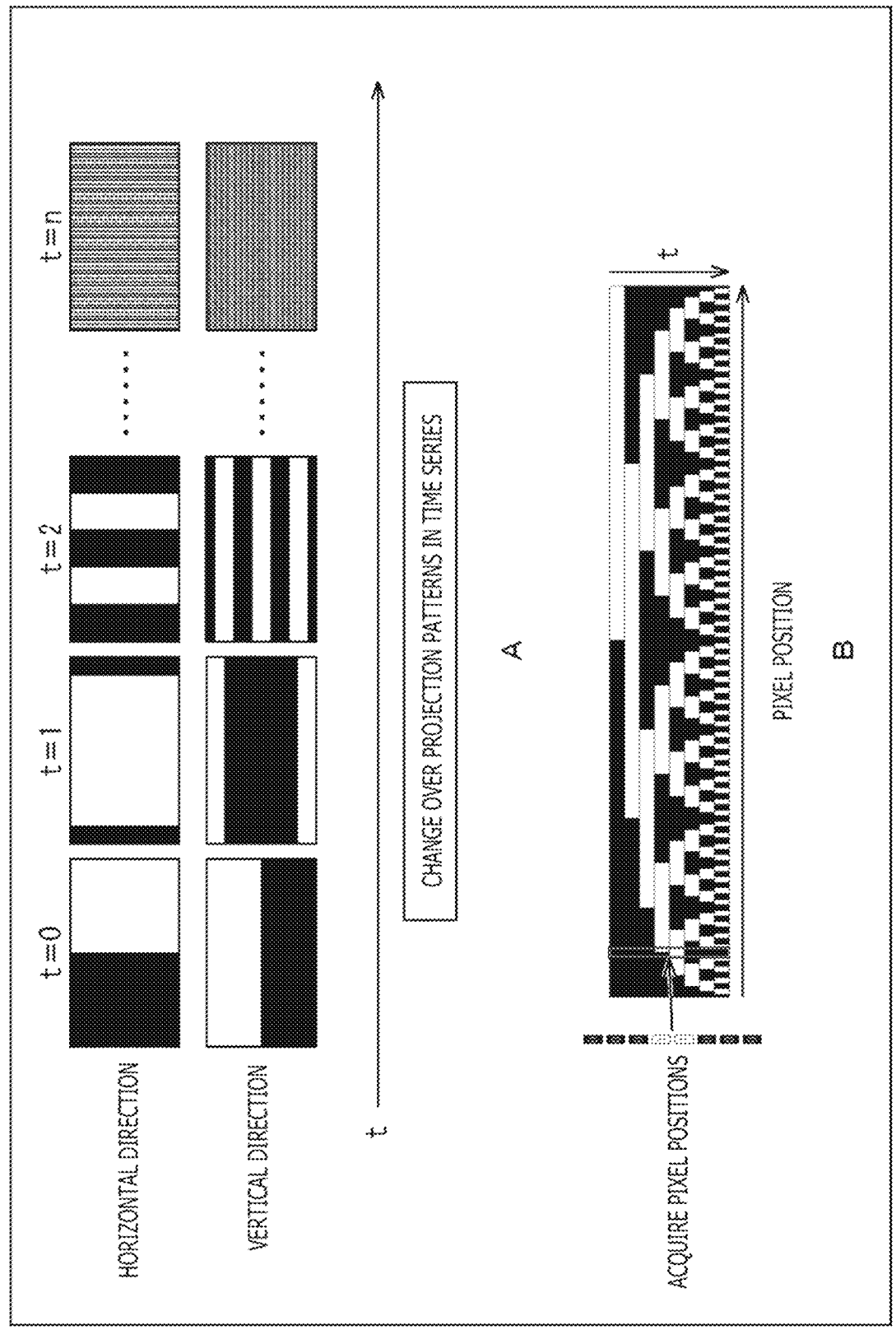
FIGS. 8A and 8B are views depicting an example of a Gray code.

A method is available by which, for example, a Gray code is used as the structured light pattern to be used in such an ISL method as described above. For example, such predetermined pattern images as depicted in FIG. 8A are projected while being changed over in a time series to pick up images of the individual patterns. Then, after the image pickup of all patterns is completed, "1" (white) or "0" (black) of each image pickup pattern is detected at each pixel of the picked up images and then variation patterns of "1" and "0" are decoded as depicted in FIG. 8B to acquire the positions of the projector pixels. By this, a corresponding relationship of the pixels can be acquired.

Figure 9:
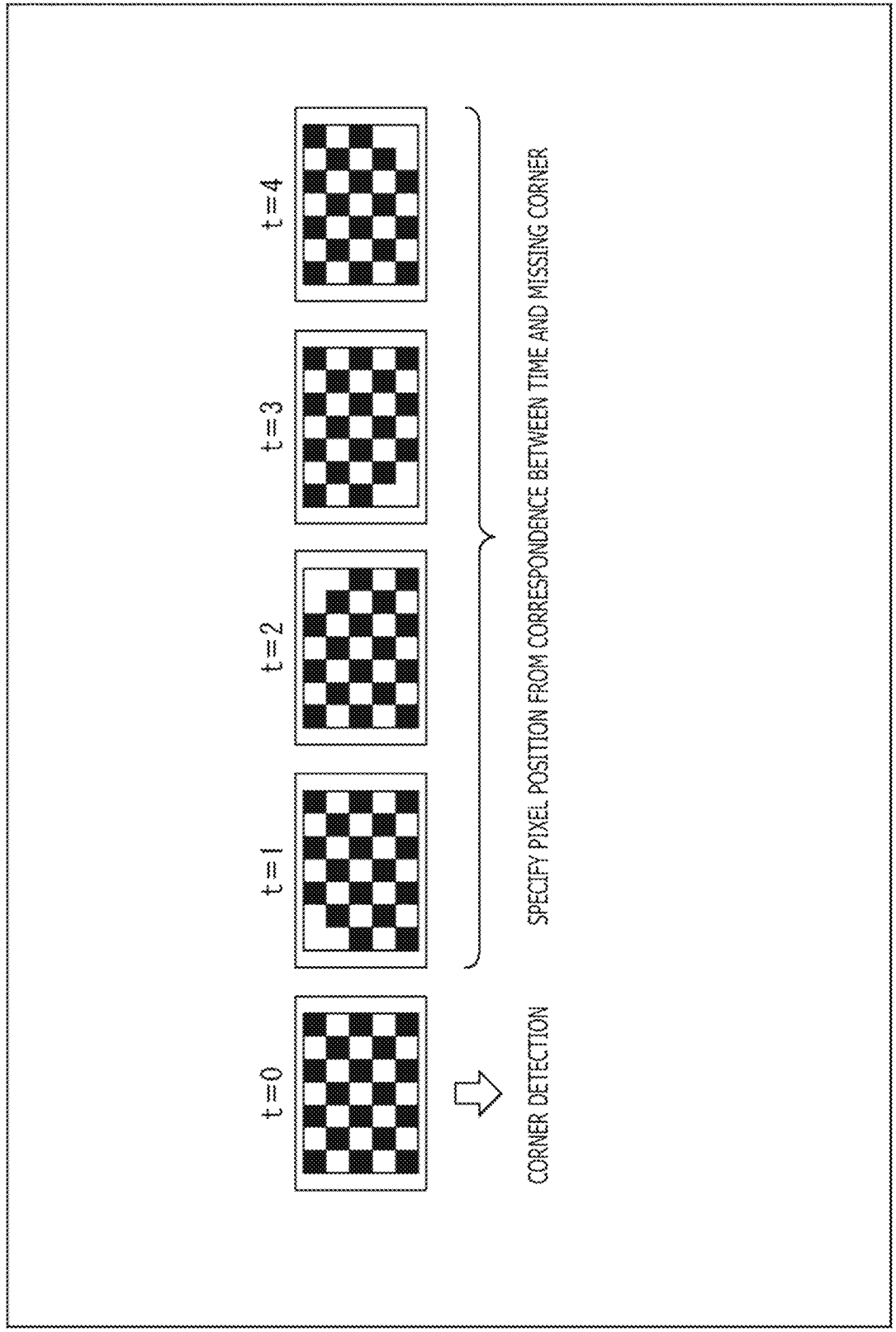
FIG. 9 is a view depicting an example of a checker pattern.

On the other hand, for example, a method is available by which such a checker patter as depicted in FIG. 9 is used as the structured light pattern. For example, one checker pattern and four patterns in which one of the four corners of the checker pattern is missing as depicted in FIG. 9 are projected, and it is detected to which pixel of the projector each corner of the checker corresponds by establishing matching of the projection order of the patterns and information of the missing corners.

However, since such a Gray code or a checker pattern has patterns having a great luminance variation gradient and having a high spatial regularity, it is liable to be perceived by a user who is viewing the projection image, and there is the possibility that the invisibility may be degraded. Such a structured light pattern as just described is unnecessary to an image (image being projected) to be superimposed (namely, to the user). In short, there is the possibility that to perceive the structured light pattern may correspond to picture quality degradation of the projection image (image being projected) to the user.

It is to be noted that, in the case where a Gray code or a checker pattern is used, it is necessary to project many patterns. Generally, as the number of patterns to be projected increases, the projection image becomes liable to be perceived by a user, resulting in possibility that the invisibility may be degraded further.

Meanwhile, in a system in which the base line between a projector and a camera is short, in order to perform triangulation with high accuracy, corresponding point detection with sub pixel accuracy is demanded. However, according to the method that uses a Gray code or a checker pattern, detection accuracy equal to or lower than pixel accuracy cannot be achieved and it is difficult to assure sufficiently high accuracy of triangulation. Further, according to the method that uses a checker pattern, it is necessary for at least one missing corner to be seen from the camera, and there is the possibility that the degree of freedom in installation of the projector or the camera (degree of freedom in position or posture) may degrade.

Furthermore, in the case where a Gray code or a checker pattern is used as described above, since it is necessary to project many patterns, there is the possibility that the time for corresponding point detection may increase as much. Further, in order to detect corresponding points in a higher density, it is necessary to project a greater number of patterns, and there is the possibility that the time for corresponding point detection may increase further.

<Structure of Structured Light Pattern>

Figure 10:
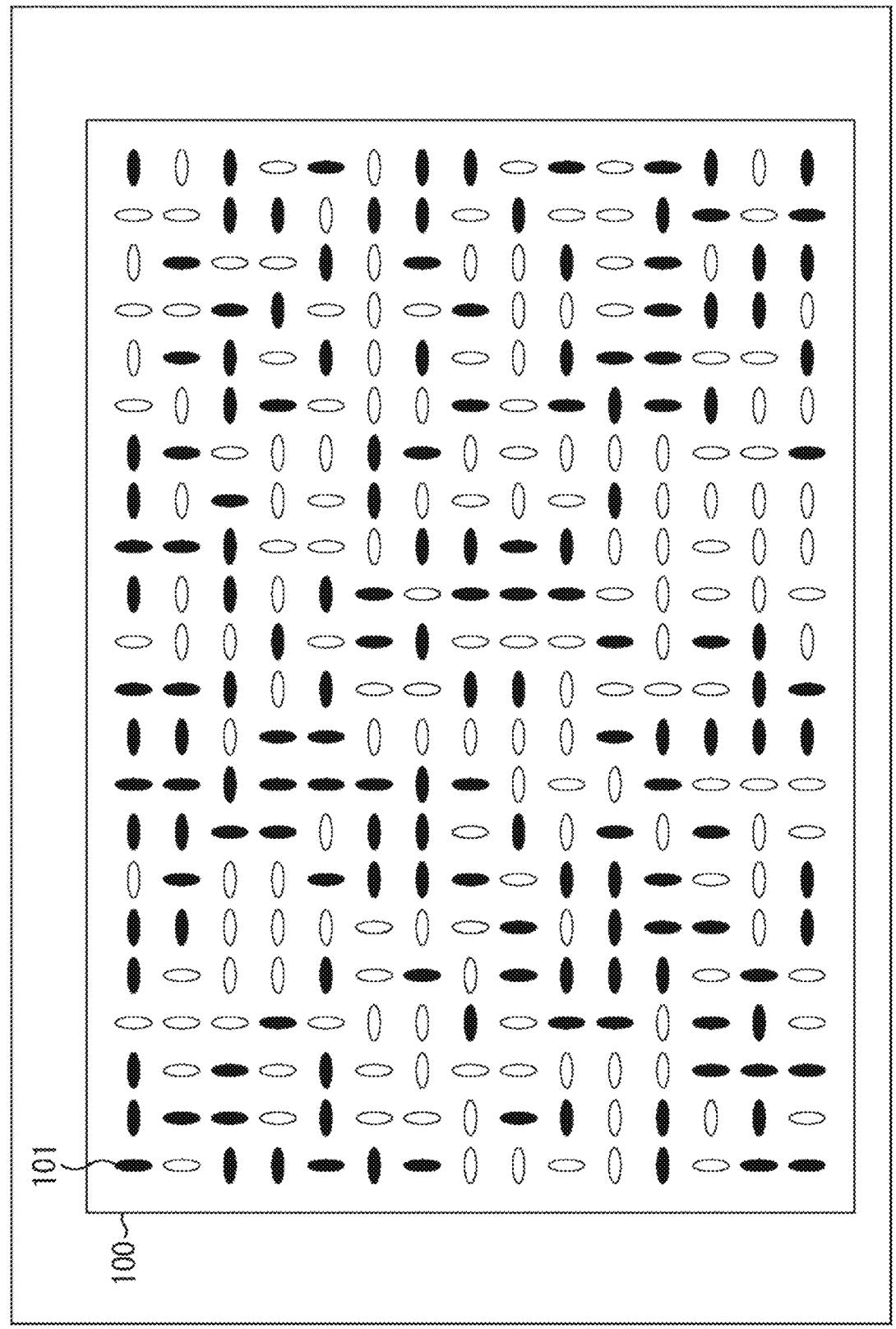
FIG. 10 is a view depicting an example of a structured light pattern.

A structured light pattern 100 depicted in FIG. 10 indicates an example of an embodiment of a structured light pattern to which the present technology is applied. The structured light pattern 100 is for detecting corresponding points between a projection image projected by the projection section and a picked up image picked up by the image pickup section (in short, a pixel corresponding relationship between the projection section and the image pickup section), and includes a plurality of patterns 101 of luminance distributions of an elliptical shape having a luminance value different from that around the same as depicted in FIG. 10. In short, a plurality of patterns 101 are disposed (formed) in the structured light pattern 100. By detecting a pattern 101 of the structured light pattern 100, detection of a corresponding point can be performed.

Figure 11:
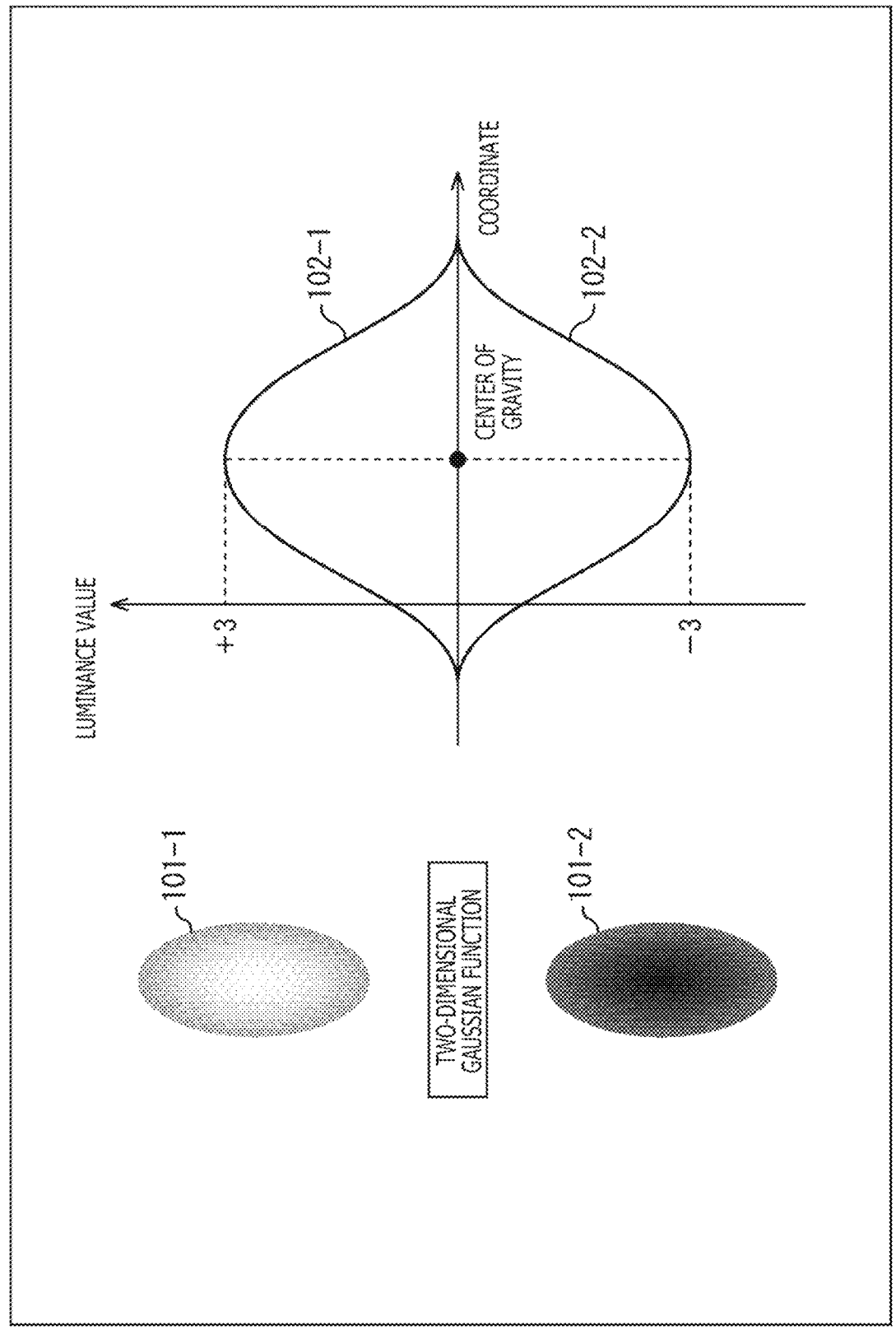
FIG. 11 is a view depicting an example of a structure of a pattern.

In each pattern 101, the luminance value varies like a two-dimensional Gaussian function between the periphery and the center of gravity thereof as depicted in FIG. 11. In short, the pattern 101 has a luminance distribution of a two-dimensional Gaussian function.

By forming the pattern 101 in this manner, the luminance variation gradient can be reduced (moderated) and can be made hard to perceive in comparison with that of the case of a Gray code or a checker pattern. Accordingly, even in such a case that the integration effect degrades because, for example, the line of sight moves or the field of vision is obstructed or else the frame rate of the projection image is low or the like, it is possible to make it more difficult for the user who views the projection image to perceive the pattern 101. In short, the invisibility can be improved.

Further, in the case where the luminance distribution has a shape configured from a straight line like, for example, a side or a corner of a rectangle, since this is a configuration that appears less frequently in a natural image, there is the possibility that it may become easy to be perceived by the user. However, by forming a luminance distribution in an elliptical shape configured from a curved line like the pattern 101, the invisibility can be improved in comparison with that in the former case. Further, since the shape is simple, the detection accuracy of the pattern 101 can be improved (the resistance to the error or noise by deformation or the like of the projection image can be improved).

Further, the structured light pattern 100 makes corresponding point detection possible by a manner of disposition of a plurality of types of patterns 101 (in what arrangement the patterns 101 are disposed or the like). In particular, by searching out, from within the structured light patterns 100, a portion in which the structured light patterns 100 coincides in arrangement with the patterns 101 included in the picked up image that is a picked up image of the projection image of the structured light pattern 100, it is determined to which portion of the structured light pattern 100 the portion included in the picked up image corresponds. Generally, as the number of kinds of patterns 101 included in the structured light pattern 100 increases, the number of combinations of the patterns 101 increases. In other words, the number of (kinds of) manners of arrangement of the patterns 101 increases. Accordingly, since many patterns 101 can be disposed without increasing the number of same arrangements of patterns 101 in the structured light pattern 100, corresponding points can be detected with a higher degree of accuracy (in a higher density). Further, by increasing the manners of arrangement of the patterns 101, it becomes possible to specify uniquely a position in the structured light pattern 100 (detection of a corresponding point) from a smaller number of patterns 101. Although details are hereinafter described, as the number of patterns 101 necessary for corresponding point detection decreases, the degree of freedom in posture of the projection section and the image pickup section in which corresponding point detection is possible increases. It is to be noted that, as the number of patterns 101 decreases, also the load of the corresponding point detection processes decreases.

As depicted in FIG. 11, in the structured light pattern 100, there are two kinds of luminance variation directions of the patterns 101. For example, the luminance value of the pattern 101-1 in FIG. 11 varies in a Gaussian function in the positive direction from the periphery to the center of gravity as indicated by a curve 102-1. In contrast, the luminance value of the pattern 101-2 varies in a Gaussian function in the negative direction from the periphery toward the center of gravity thereof as indicated by a curve 102-2. In short, the structured light pattern 100 includes two kinds of patterns 101 having luminance variation directions opposite to each other.

By applying a plurality of luminance variation directions to the patterns 101 in this manner, the number of kinds of patterns 101 can be increased without changing the shape of the patterns 101. Further, by utilizing the luminance variation directions in this manner, it is possible to adopt a luminance distribution of a two-dimensional Gaussian function for all patterns 101. In particular, the number of kinds of patterns 101 can be increased without using a luminance variation gradient or a shape that can be perceived easily. In other words, the number of kinds of patterns 101 can be increased without degrading the invisibility. In addition, the patterns 101 having luminance variation directions opposite to each other as in the example of FIG. 11 can be identified readily. Further, since the luminance variation can be increased in either direction, the S/N ratio of the structured light pattern 100 extracted from the picked up image can be increased.

It is to be noted that, although the two kinds of patterns 101 (pattern 101-1 and pattern 101-2 of FIG. 10) actually have a luminance that varies between the periphery and the center of gravity thereof as in the example of FIG. 11, in FIG. 10, the pattern 101-1 is indicated by a white ellipsis and the pattern 101-2 is indicated by a black ellipsis for the simplified illustration. In particular, in FIG. 10, the colors of the patterns 101 indicate only that two kinds of luminance variation exist and do not indicate a manner of luminance variation. Also in other figures hereinafter described, a similar illustration to that of FIG. 10 may be applied from a similar reason.

Further, the luminance distribution of the pattern 101 of FIG. 10 has a predetermined principal axis of inertia. In the case of the example depicted in FIGS. 10 and 11, the luminance distribution of the pattern 101 has an elliptical shape, whose center axis in the longitudinal direction is the principal axis of inertia. Further, in the structured light patterns 100 of FIG. 10, two kinds of a vertical direction and a horizontal direction in FIG. 10 exist as the direction of the principal axis of inertia. In particular, in the case of the present example, as depicted in FIG. 12, the structured light pattern 100 has four kinds of patterns 101 (pattern 101-1 to 101-4 of FIG. 12) in regard to the luminance variation direction and the direction of the principal axis of inertia.

Figure 12:
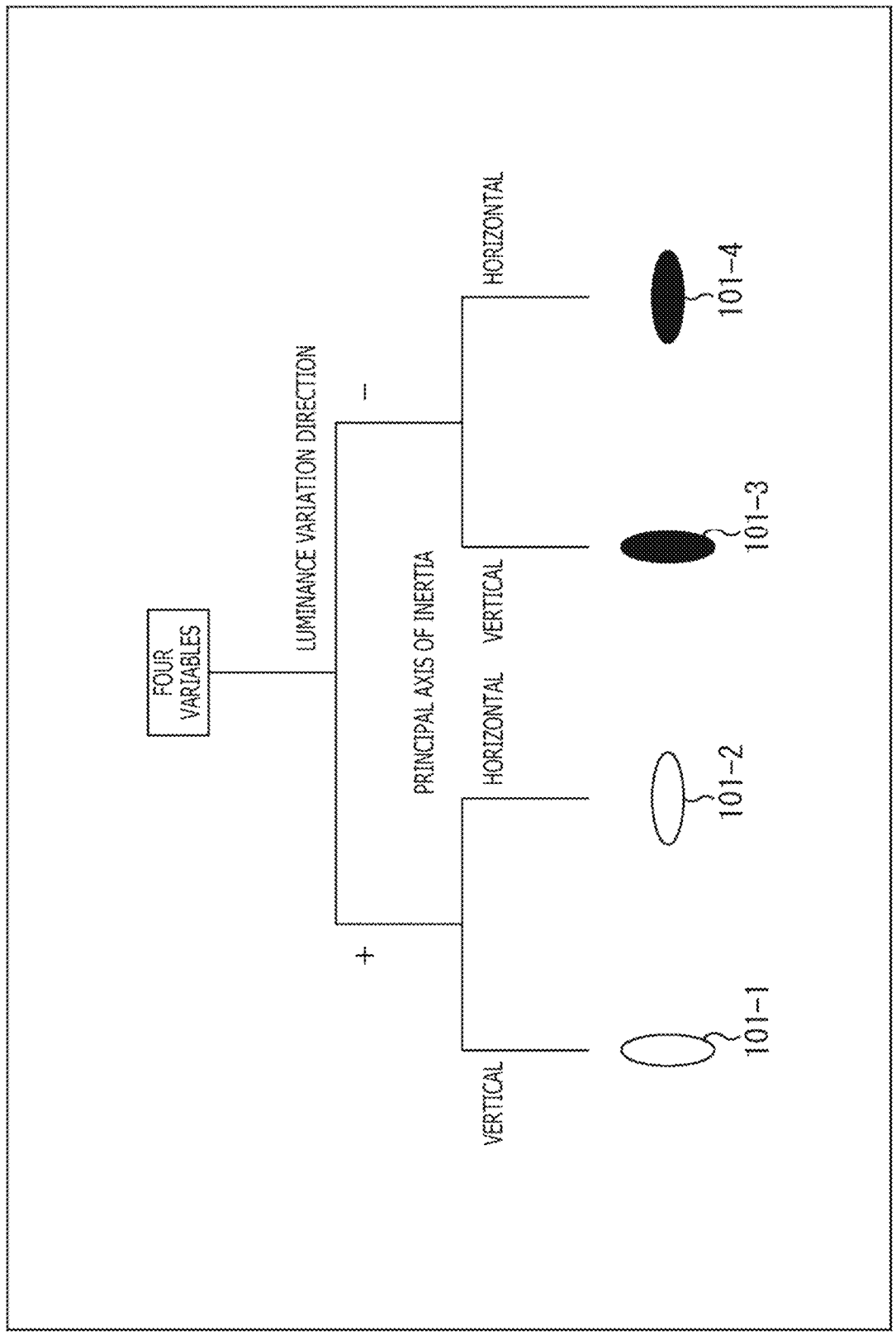
FIG. 12 is a view depicting an example of types of patterns.

For example, in FIG. 12, the pattern 101-1 has a luminance value that varies in a Gaussian function in the positive direction from the periphery to the center of gravity and besides has a principal axis of inertia in the vertical direction. In addition, the pattern 101-2 has a luminance value that varies in a Gaussian function in the positive direction from the periphery to the center of gravity and besides has a principal axis of inertia in the horizontal direction. In contrast, the pattern 101-3 has a luminance value that varies in a Gaussian function in the negative direction from the periphery to the center of gravity and besides has a principal axis of inertia in the vertical direction. Further, the pattern 101-4 has a luminance value that varies in a Gaussian function in the negative direction from the periphery to the center of gravity and besides has a principal axis of inertia in the horizontal direction.

By causing the patterns 101 to generally have a plurality of directions of the principal axis of inertia (postures of the patterns) in this manner, it is possible to increase the number of kinds of patterns 101 without changing the shape of the patterns 101. In short, the number of kinds of patterns 101 can be increased without using a shape that is perceived easily. In other words, the number of kinds of patterns 101 can be increased without degrading the invisibility. In addition, the patterns 101 having principal axes of inertia perpendicular to each other as in the example of FIG. 12 can be identified readily.

Further, by combining both the luminance variation direction and the direction of the principal axis of inertia as in the example of FIG. 12, the number of kinds of patterns 101 can be further increased without degrading the invisibility of the patterns 101.

Further, by increasing the number of kinds by using the luminance variation direction, the direction of the principal axis of inertia, or both of them of the patterns 101, it is further facilitated to specify the position or range of each pattern 101 in comparison with an alternative case in which the shape or the size of the patterns 101 is changed to increase the number of types, and detection of a pattern 101 can be performed more easily.

It is to be noted that, while it is described in the foregoing description that the luminance distribution of each pattern 101 is represented by a two-dimensional Gaussian function, the luminance distribution of the pattern 101 may be a distribution of any function if the distribution decreases the luminance variation gradient in comparison with that of the case of a Gray code or a checker pattern. However, if the distribution makes it possible to more easily determine a position (center of gravity) at which the luminance value is in the maximum (or in the minimum), then corresponding point detection can be performed using the center of gravity, and corresponding point detection of higher accuracy (in sub pixel accuracy) can be implemented more easily. It is to be noted that this luminance distribution (function) may be common to all patterns 101 or may not be common.

Further, the shape (of the luminance distribution) of each pattern 101 is arbitrary and may be other than an elliptical shape. Also the size and the direction of the principal axis of inertia of the pattern 101 are arbitrary. A character, a symbol, a picture, a design or the like may be formed in the pattern 101. It is to be noted that also those parameters may be common to all patterns 101 or may not be common. Furthermore, also the arrangement position of the patterns 101 is arbitrary. For example, in the structured light pattern 100, the patterns 101 may be disposed at substantially equal distances, or the distribution of patterns 101 may have some one-sidedness.

Further, the structured light pattern 100 may be formed from a distribution of one or a plurality of color components (or color difference components) in place of the luminance distribution or may be formed from distributions of both the luminance and the color component. Furthermore, the size and the aspect ratio of the structured light pattern 100 are arbitrary and may be same as or may be different from those of a different image on which the structured light pattern 100 is superimposed. In short, the pattern 101 may be disposed over the overall area of the different image or may be disposed at part of the area of the different image.

Further, the number of types of patterns 101 is arbitrary and may be three or less or may be five or more. For example, the luminance variation direction may be identified among three or more directions such that classification into three or more kinds is performed, or by identifying the principal axis of inertia among three or more directions, classification of three or more kinds may be performed. Furthermore, a parameter for classifying the patterns 101 is arbitrary. For example, as the luminance variation direction, a different direction than the positive direction and the negative direction may be used. Furthermore, a parameter other than the luminance variation direction and the direction of the principal axis of inertia may be used. For example, the patterns 101 may be classified depending upon the shape, color, size, picture (design), disposition position (positional displacement), rate (function) of change of the luminance variation or the like of the pattern 101. Further, a plurality of such parameters may be combined or such parameters may be combined with the luminance variation direction and the principal axis of inertia.

Figure 13:
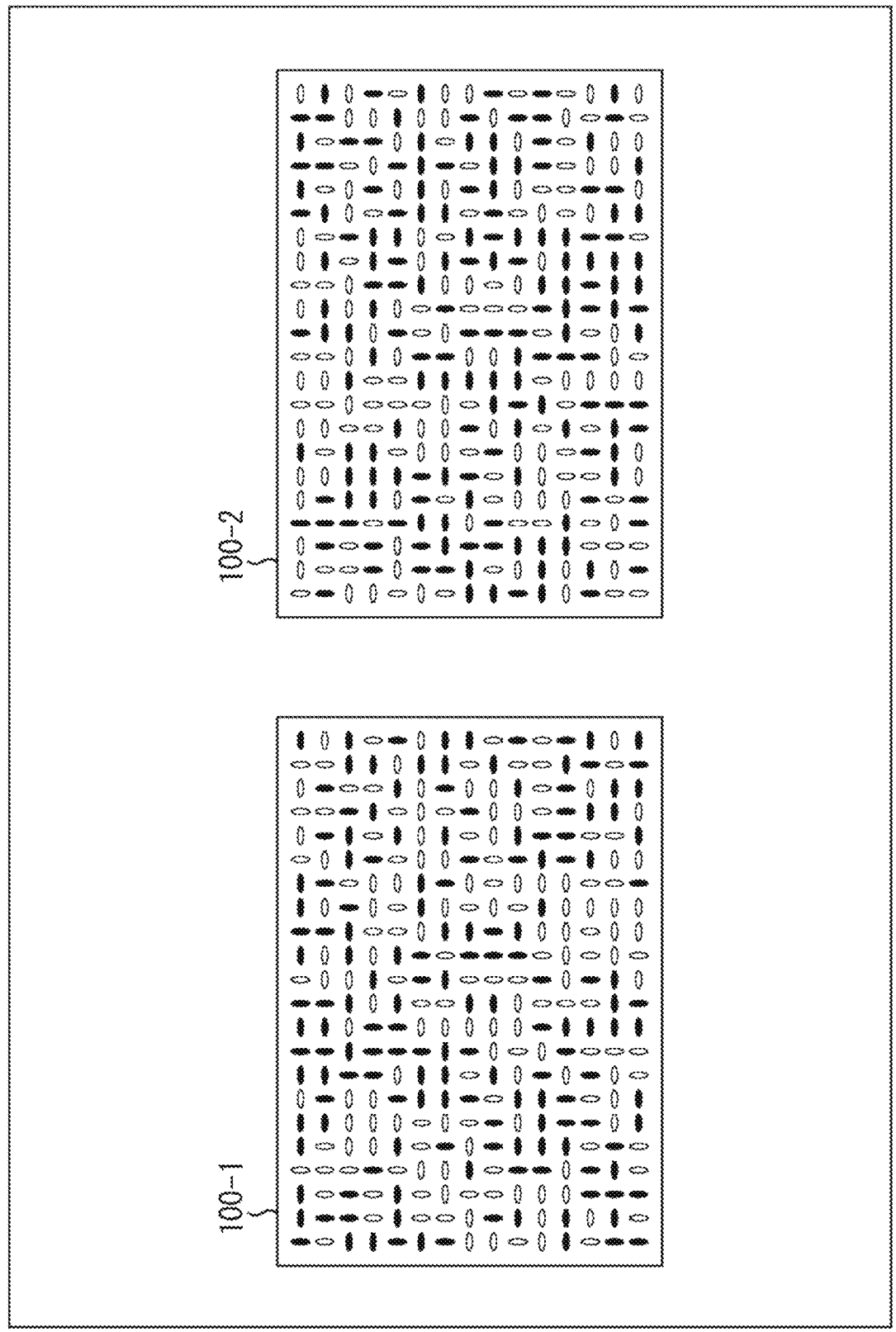
FIG. 13 is a view depicting an example of a positive image and a negative image of a structured light pattern.

In the case of the ISL method, the structured light pattern 100 of such a configuration as described above is projected in a superimposed relationship with a different image. Along with this, similarly as in the case of explanation with reference to FIG. 7, the structured light pattern 100 is projected such that the luminance values of the structured light pattern 100 are added to a certain frame of the different image and then are subtracted from a next frame of the different image. In short, the structured light pattern 100 is superimposed as a positive image 100-1 or a negative image 100-2 on a different image as depicted in FIG. 13. The negative image 100-2 is an image that is reversed in positive-negative polarity from the luminance values of the positive image 100-1. By projecting such a positive image 100-1 and a negative image 100-2 as just described in a superimposed relationship to two successive frames, it is possible to make the structured light pattern 100 less liable to be perceived by the user who views the projection image by an integration effect.

Naturally, only the positive image 100-1 or the negative image 100-2 may be superimposed on a different image. In this case, although such an integration effect as describe above cannot be achieved, by reducing the luminance variation gradient of each pattern 101 as in the example of FIG. 11, degradation of invisibility can be suppressed.

It is to be noted that the structured light pattern 100 may be utilized for a corresponding point detection method other than the ISL method. In short, the structured light pattern may be utilized for corresponding point detection by projecting the same such that it is not superimposed on a different image.

<Conversion of Pattern into Code String>

Figure 14:
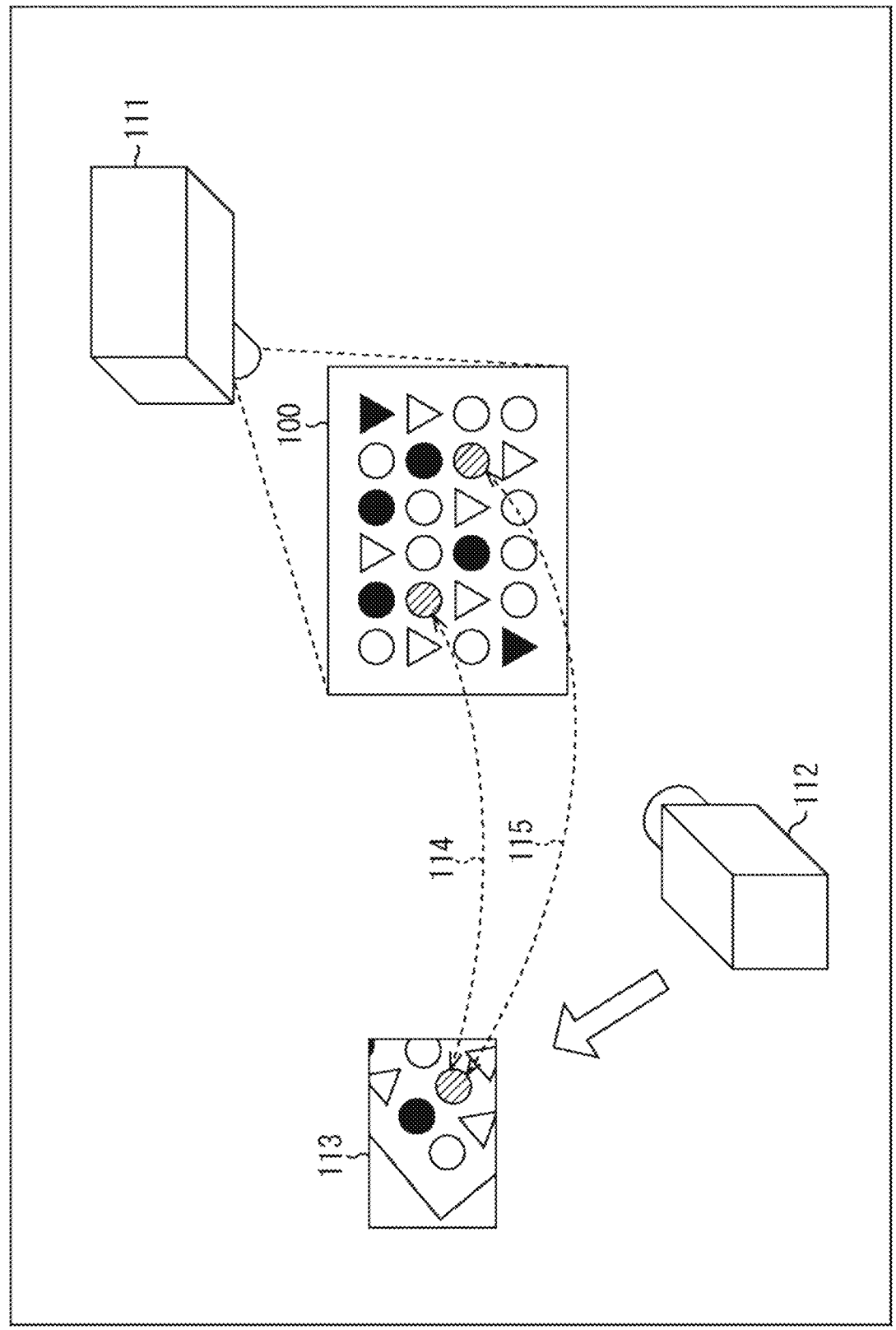
FIG. 14 is a view illustrating an example of a manner of corresponding point detection.

Incidentally, as the degree of freedom in installation of a projector (projection section) and a camera (image pickup section) (degree of freedom in position or posture) increases, the system construction becomes easier and also implementation of systems of various configurations is facilitated. For example, it is assumed that, as depicted in FIG. 14, a projector 111 projects a structured light pattern 100 and a camera 112 picks up an image of the projection image to obtain a picked up image 113. If, in such a system as just described, the degree of freedom in installation of the projector 111 and the camera 112 is high, then there is the possibility that such a case may occur that the camera 112 cannot pick up an image of the overall structured light pattern 100 and only part of the structured light pattern 100 is included in the picked up image 113.

If information of a pattern 101 included in the picked up image 113 is excessively small in amount (in the case where the range included in the picked up image 113 is smaller than a range necessary for specification of a position of the pattern 101), then there is the possibility that the position of the pattern 101 included in the picked up image 113 in the structured light pattern 100 cannot be specified uniquely as indicated by a broken line double headed arrow mark 114 or another broken line double headed arrow mark 115.

Therefore, the disposition of the patterns 101 in the structured light pattern 100 is made a pseudo-random array. The pseudo-random array is an array configured from N (N is an arbitrary natural number) variables and is an array having a nature that, when a window (partial region) of a certain fixed size is cut out and elements of the window are permutation expanded, the code string is unique over the overall array. In other words, the patterns 101 of the structured light pattern 100 are disposed such that the dispositions (code strings) of the patterns 101 in all partial regions are different from each other, and from the patterns 101 in a partial region included in the picked up image, it can be specified patterns in which portion of the structured light pattern 100 the patterns 101 are. In other words, a corresponding point can be determined using the information in the partial regions. It is to be noted that, by setting the disposition of the patterns 101 to a pseudo-random array, since the regularity of the luminance distribution of the structured light pattern 100 decreases, it is possible to make the structured light pattern 100 less liable to be perceived.

In the following description, this partial region is referred to also as corresponding point detection unit. By making the size of this partial region as small as possible, it is possible to cope also with a higher degree of freedom of the projector 111 and the camera 112.

Figure 15:
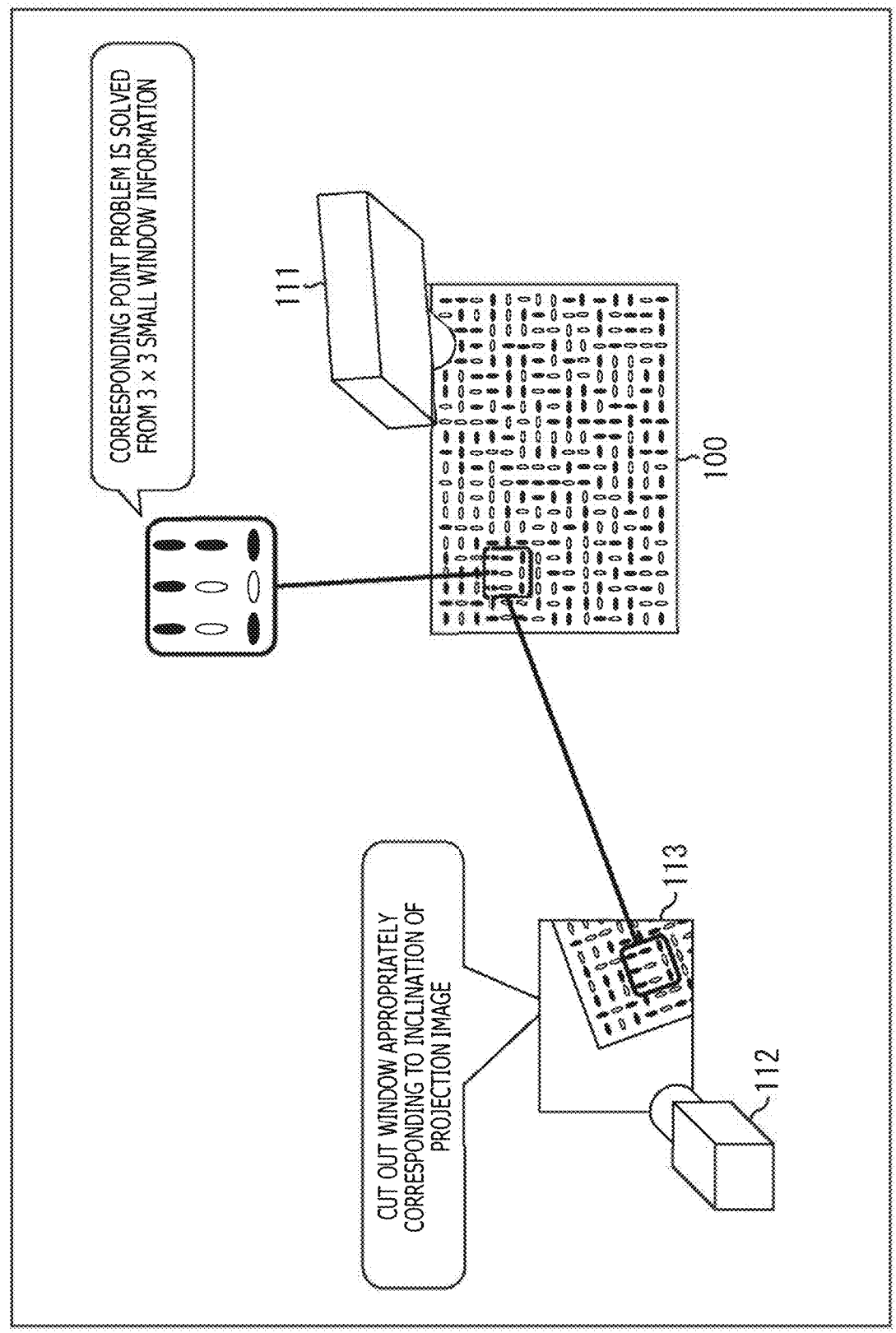
FIG. 15 is a view illustrating an example of a manner of corresponding point detection.

For example, the disposition of a pattern 101 in the structured light pattern 100 may be set such that a disposition position thereof can be specified uniquely on the basis of the disposition of vertical 3×horizontal 3 (totaling nine) patterns as in an example of FIG. 15.

Figure 16:
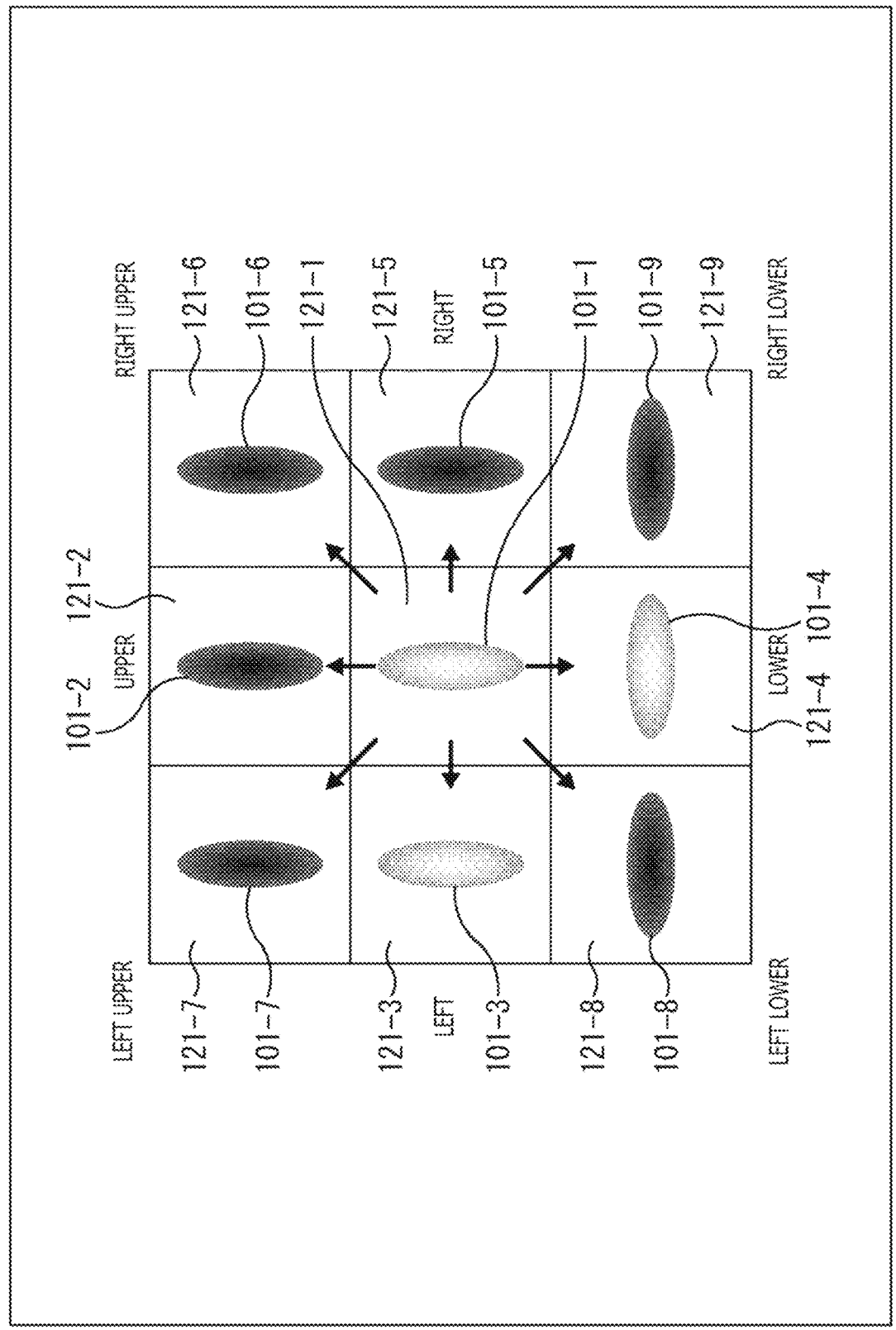
FIG. 16 is a view depicting an example of a structured light pattern of a corresponding point detection unit.

For example, as depicted in FIG. 16, in a picked up image, a region 121-1 of a processing target is determined and a pattern 101-1 positioned in the region 121-1 is detected. Then, a pattern 101-2 in a region 121-2 positioned above the region 121-1 is detected; a pattern 101-3 in a region 121-3 positioned on the left of the region 121-1 is detected; a pattern 101-4 in a region 121-4 positioned under the region 121-1 is detected; and a pattern 101-5 in a region 121-5 positioned on the right of the region 121-1 is detected. Similarly, a pattern 101-6 in a region 121-6 positioned on the upper right of the region 121-1 is detected; a pattern 101-7 in a region 121-7 positioned on the upper left of the region 121-1 is detected; a pattern 101-8 in a region 121-8 positioned on the lower left of region 121-1 is detected; and a pattern 101-9 in a region 121-9 positioned on the lower right of the region 121-1 is detected.

It is to be noted that, in the case where the regions 121-1 to 121-9 need not be described in a distinguished manner from each other, each of them is referred to as region 121.

Figure 17:
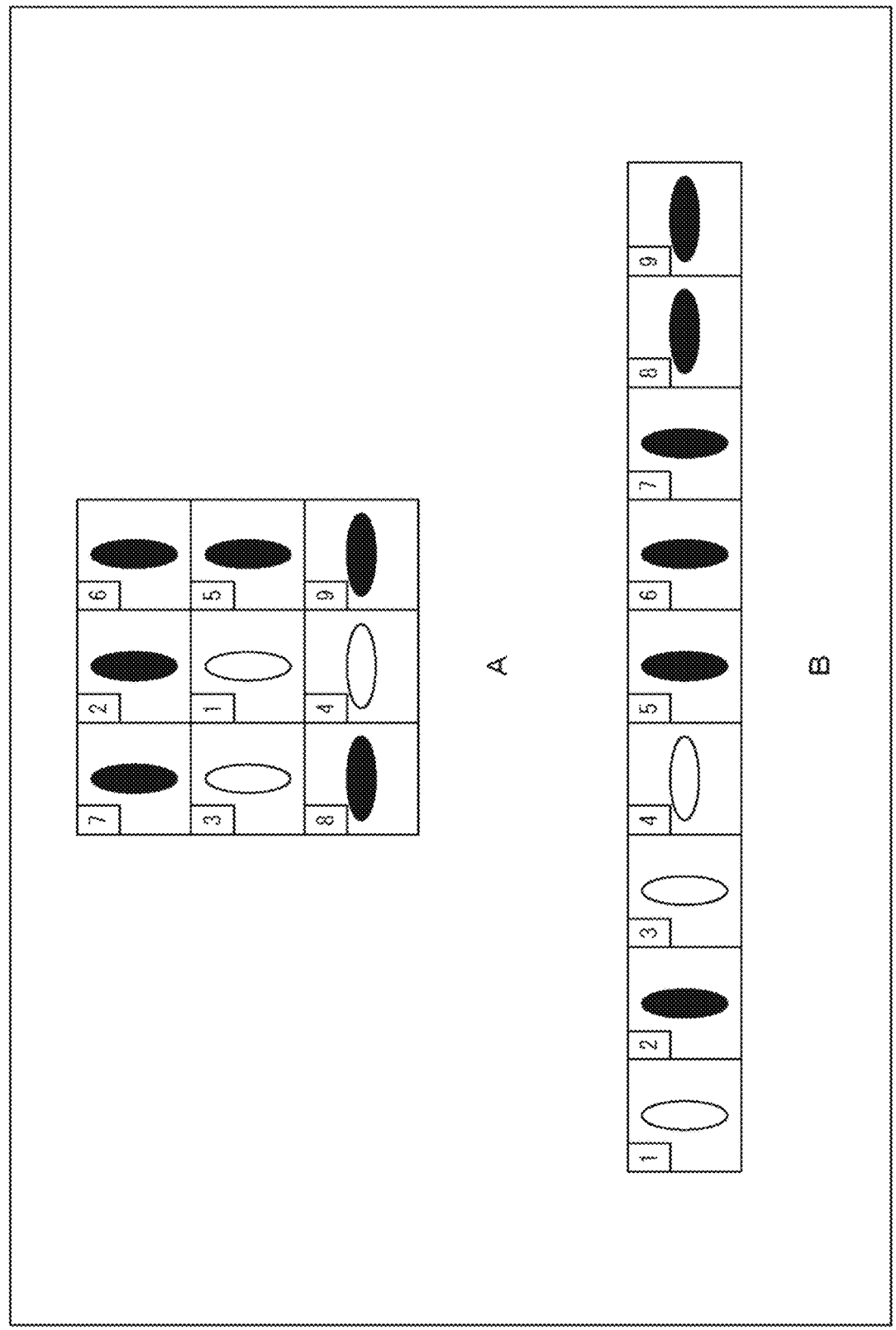
FIGS. 17A and 17B are views illustrating an example of a manner of permutation expansion.

The 3×3 patterns 101 determined in this manner are individually converted into variables, and the variables are permutation expanded in a predetermined order as depicted in FIG. 17A to generate such a code string as depicted in FIG. 17B. Numerals indicated in the individual regions 121 in FIGS. 17A and 17B indicate an example of an order in which the patterns are permutation expanded.

Then, a code string that coincides with the code string determined in this manner is searched out from within the structured light pattern 100. Since the individual patterns 101 of the structured light pattern 100 are disposed in such arrangement that code strings each obtained by converting the 3×3 patterns 101 at an arbitrary position into variables and permutation expanding the variables are different from each other (are uniquely determined), detection of a corresponding point is possible.

By doing so, detection of a corresponding point based on a small number of structured light patterns 100 in comparison with that in an alternative case in which a Gray code or the like is used becomes possible, and therefore, it is possible to make it more difficult for the user who views the projection image to perceive the structured light pattern 100, and to improve the invisibility of corresponding point detection. Further, in comparison with an alternative case in which a Gray code or the like is used, a corresponding point can be detected in a short period of time.

It is to be noted that, if the degree of freedom in installation of the projector 111 or the camera 112 becomes higher, then there is the possibility that the picked up image may be inclined with respect to the projection image, and there is the possibility that this inclination may cause generation of an erroneous code string.

Figure 18:
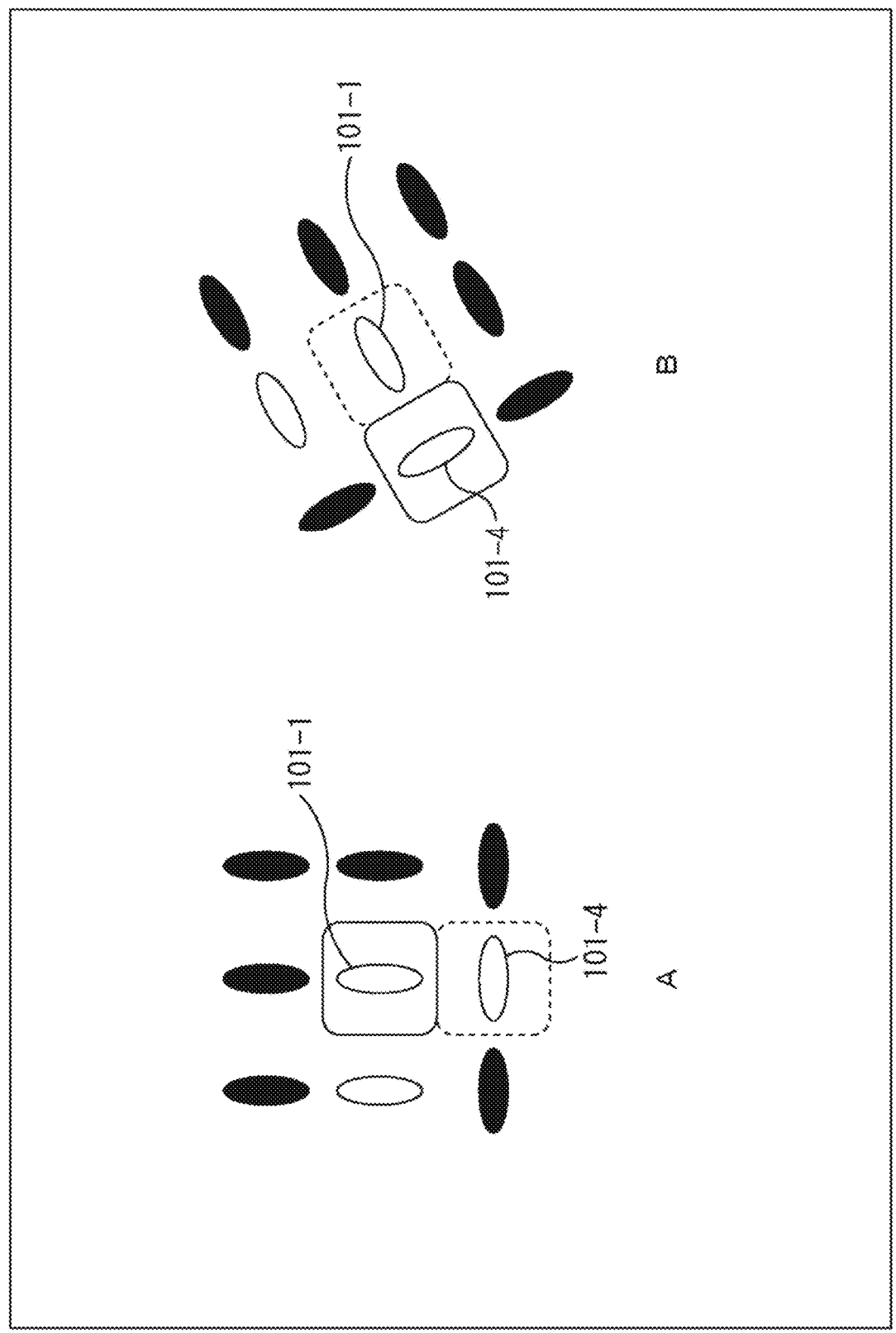
FIGS. 18A and 18B are views illustrating an example of an error of variable identification.

For example, there is the possibility that an error in variable identification of each pattern 101 may occur. It is assumed that, in the case where the picked up image is not inclined with respect to the projection image, a pattern 101 is disposed in such a manner as depicted in FIG. 18A in a certain corresponding point detection unit. In this case, it is identified that the direction of the principal axis of inertia of the pattern 101-1 is the vertical direction and the direction of the principal axis of inertia of the pattern 101-4 is the horizontal direction. In contrast, if the picked up image is rotated by 45 degrees in a clockwise direction in FIGS. 18A and 18B, then the disposition of the pattern 101 in the corresponding point detection unit becomes such disposition as depicted in FIG. 18B. In this case, since the pattern 101-1 and the pattern 101-4 are individually inclined by 45 degrees as depicted in FIG. 18B, there is the possibility that it may be identified that the direction of the principal axis of inertia of the pattern 101-1 is the horizontal direction and the direction of the principal axis of inertia of the pattern 101-4 is the vertical direction. As the inclination of the picked up image further increases, such possibility of an error further increases.

Figure 19:
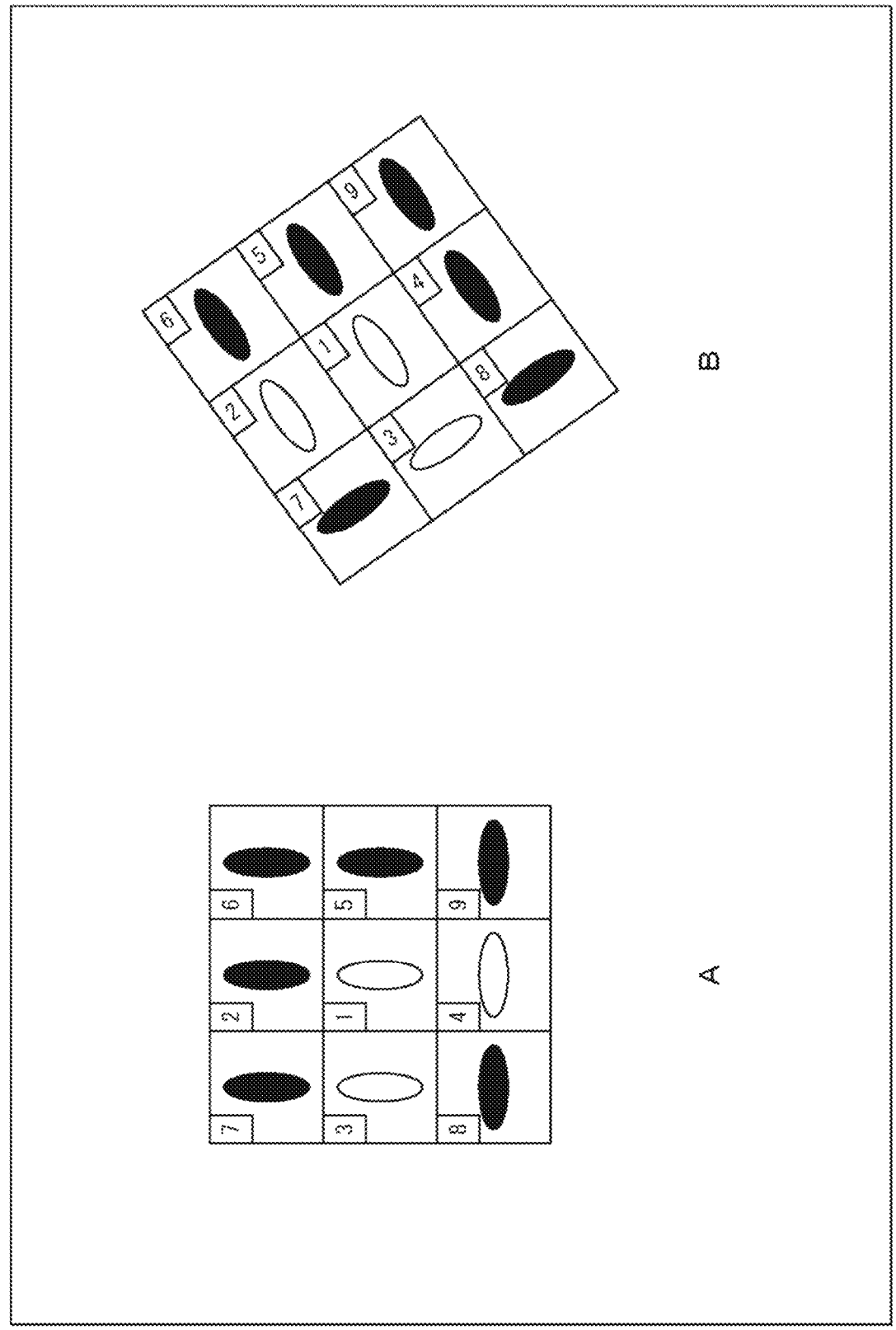
FIGS. 19A and 19B are views illustrating an example of an error of an expansion order.

Further, for example, there is the possibility that an error may occur in the expansion order when the individual patterns 101 are permutation expanded. It is assumed that, in the case where the picked up image is not inclined with respect to the projection image, the individual patterns 101 of a certain corresponding point detection unit are expanded in such an order as depicted in FIG. 19A. In contrast, if the picked up image is rotated by 45 degrees in the clockwise direction in FIGS. 19A and 19B, then there is the possibility that the patterns 101 may be expanded in such an order as depicted in FIG. 19B. As the inclination of the picked up image further increases, the possibility of such an error further increases.

Figure 20:
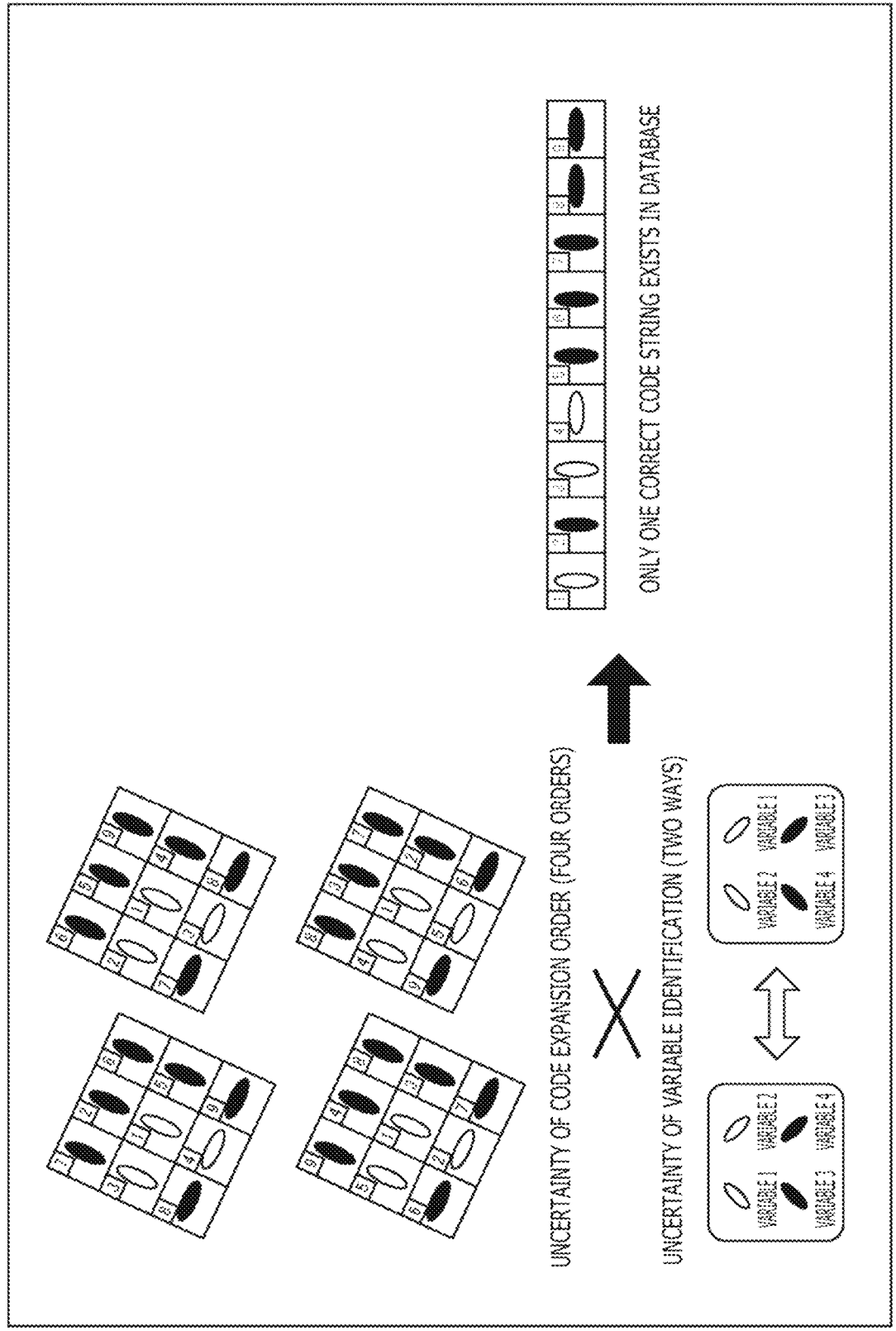
FIG. 20 is a view illustrating an example of a code string adopted in a structured light pattern.

In particular, in the case where a code string is generated from patterns 101 of a corresponding point detection unit included in a picked up image, totaling eight uncertainties are available including, as depicted in FIG. 20, as an uncertainty of the code string expansion order, four uncertainties (in particular, four possibilities including the possibility that the corresponding point detection unit may be expanded in a state in which it is rotated by 0 degrees, the possibility that the corresponding point detection unit may be expanded in a state in which it is rotated by 90 degrees, the possibility that the corresponding point detection unit may be expanded in a state in which it is rotated by 180 degrees, and the possibility that the corresponding point detection unit may be expanded in a state in which it is rotated by 270 degrees), and as an uncertainty of the variable identification, two uncertainties (in particular, the possibility that the principal axis of inertia may be inclined by 0 degrees or 180 degrees and the possibility that the principal axis of inertia may be inclined by 90 degrees or 270 degrees). Therefore, if a plurality of code strings from within such eight types exist in the structured light pattern 100, then it is difficult to uniquely determine a code string, and there is the possibility that the detection accuracy of a corresponding point may be degraded.

Therefore, a code string group of the structured light pattern 100 (code strings corresponding to individual corresponding point detection units) is configured only from code strings that belong to groups different from each other (in short, the arrangement of the patterns 101 is set to such arrangement). By doing so, whichever code string belonging to a group a code string detected in a picked up image is, the code string (or a code string belonging to the same group) can be determined uniquely in the structured light pattern 100, and a corresponding point can be detected.

It is to be noted that the reference for grouping of a code string is arbitrary, and code strings may be grouped on the basis of any information. For example, by grouping code strings on the basis of the uncertainty of code string generation, degradation of the detection accuracy of a corresponding point by the uncertainty of a code string can be suppressed. For example, this group may include a code string obtained by converting patterns of a predetermined pattern group into variables and permutation expanding the variables and a code string obtained by rotating the pattern group by a predetermined angle, converting the patterns of the pattern group into variables and permutation expanding the variables. Further, this group may include a code string obtained by converting patterns of a predetermined pattern group into variables and permutation expanding the variables and a code string obtained by converting the patterns of the pattern group into variables of different values and permutation expanding the variables of the different values. Furthermore, this group may include a code string obtained by converting patterns of a predetermined pattern group into variables and permutation expanding the variables and a code string obtained by rotating the pattern group by a predetermined angle, converting the patterns into variables of different values and permutation expanding the variables of the different values. Further, this group may include a code string obtained by converting patterns of a predetermined pattern group into variables and permutation expanding the variables, a code string obtained by rotating the pattern group by a predetermined angle, converting the patterns into variables and permutation expanding the variables of the different values, and a code string obtained by rotating the pattern group by a predetermined angle, converting the patterns into variables of different values and permutation expanding the variables of the different values. Furthermore, this group may include a code string obtained by converting patterns of a predetermined pattern group into variables and permutation expanding the variables, a code string obtained by converting the patterns of the pattern group into variables of different values and permutation expanding the variables of the different values, and a code string obtained by rotating the pattern group by a predetermined angle, converting the patterns into variables of different values and permutation expanding the variables of the different values. Further, as depicted in FIG. 20, this group may include a code string obtained by converting patterns of a predetermined pattern group into variables and permutation expanding the variables, a code string obtained by converting the patterns of the pattern group into variables of different values and permutation expanding the variables of the different values, a code string obtained by rotating the pattern group by a predetermined angle, converting the patterns into variables and permutation expanding the variables of the different values, and a code string obtained by rotating the pattern group by a predetermined angle, converting the patterns into variables of different values and permutation expanding the variables of the different values. By doing so, it is possible to suppress degradation of the detection accuracy of a corresponding point by such uncertainty of the expansion order and uncertainty of variable identification described above. In other words, also it is possible to cope with a higher degree in installation of the projector 111 and the camera 112. It is to be noted that, while a case is described with reference to FIG. 20 in which four uncertainties of the code string expansion order are available and two uncertainties of the variable identification, the numbers of types of such uncertainties are individually arbitrary (there is the possibility that it may rely upon the corresponding point detection unit or the shape, structure and so forth of the patterns 101) and are not limited to those of the example of FIG. 20. For example, while the angle of rotation of the uncertainties of the code string expansion order is described taking 0 degrees, 90 degrees, 180 degrees, and 270 degrees as examples, it may be any other than the angles. Further, all of the uncertainties may be included in a group or some of them may be included in a group. Furthermore, where there exists an uncertainty other than those described above, a code string pattern based on the uncertainty may be included in a group.

It is to be noted that, although it is described in the foregoing description that a corresponding point is detected using (a positive image and a negative image of) one structured light pattern 100, the method for corresponding point detection is not limited to this. For example, (a positive image and a negative image of) one structured light pattern 100 may be projected repetitively by a plural number of times to perform image pickup by the plural number of times, and the plurality of picked up images obtained by the image pickup may be used to improve the S/N ratio upon extraction of the patterns 101 to improve the detection accuracy of the patterns 101. By detecting the patterns 101 more accurately, the detection accuracy of a corresponding point can be improved.

Further, a plurality of structured light patterns between which the arrangement of patterns 101 is different from each other may be used to detect a corresponding point. In particular, while, in the foregoing description, it is described that a plurality of spatially neighboring patterns are used to generate a code string, the generation of a code string is not limited to this, and a plurality of temporally neighboring patterns may be used to generate a code string. For example, a code string may be generated using patterns neighboring not only temporally but also spatially, for example, like collocated. Further, a code string may be generated using both a pattern neighboring spatially and a pattern neighboring temporally.

It is to be noted that the order of code string expansion is arbitrary and is not limited to the example described above. Further, the size and the shape of a partial region to be made a corresponding point detection unit are arbitrary and are not limited to the above-described example (3×3). In short, also the length of the code string is arbitrary and is not limited to the example described above (9 codes).

2. Second Embodiment

<Structured Light Pattern Generation Apparatus>

Figure 21:
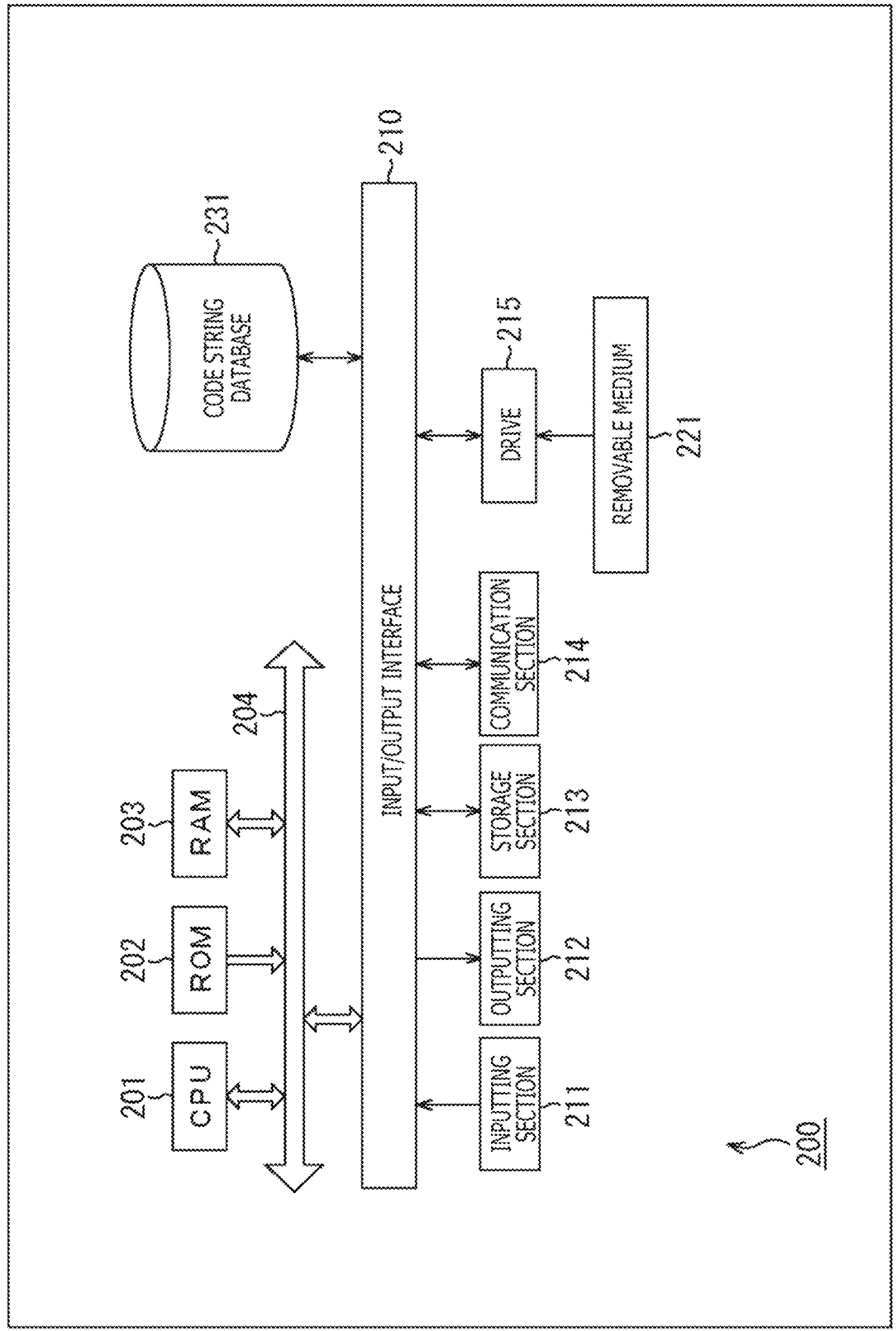
FIG. 21 is a block diagram depicting an example of a principal configuration of a structured light pattern generation apparatus.

Now, generation of such a structured light pattern 100 as described above is described. The structured light pattern 100 may be generated partly or entirely by an arbitrary apparatus. FIG. 21 is a block diagram depicting an example of a principal configuration of a structured light pattern generation apparatus that is an embodiment of an image processing apparatus to which the present technology is applied.

As depicted in FIG. 21, a structured light pattern generation apparatus 200 includes a CPU (Central Processing Unit) 201, a ROM (Read Only Memory) 202, a RAM (Random Access Memory) 203, a bus 204, an input/output interface 210, an inputting section 211, an outputting section 212, a storage section 213, a communication section 214, a drive 215, and a code string database 231.

The CPU 201, the ROM 202, and the RAM 203 are connected to each other by the bus 204. To the bus 204, also the input/output interface 210 is connected. To the input/output interface 210, the inputting section 211, the outputting section 212, the storage section 213, the communication section 214, the drive 215, and the code string database 231 are connected.

The inputting section 211 is configured from an inputting device that accepts external information such as a user input or the like. For example, the inputting section 211 may include a keyboard, a mouse, an operation button, a touch panel, a camera, a microphone, an inputting terminal and so forth. Further, inputting equipment such as various sensors such as an acceleration sensor, an optical sensor, a temperature sensor and so forth, a bar code reader and so forth may be included in the inputting section 211. The outputting section 212 is configured from an outputting device that outputs information of an image, sound and so forth. For example, the outputting section 212 may include a display, a speaker, an output terminal and so forth.

The storage section 213 is configured from a storage medium that stores information such as a program, data and so forth. For example, the storage section 213 may include a hard disk, a RAM disk, a nonvolatile memory or the like. The communication section 214 is configured from a communication device that performs communication for exchanging information such as a program, data and so forth with an external apparatus through a predetermined communication medium (an arbitrary network such as, for example, the Internet). The communication section 214 may be configured, for example, from a network interface. For example, the communication section 214 performs communication (exchange of a program or data) with an external apparatus of the structured light pattern generation apparatus 200.

The drive 215 reads out information (program, data and so forth) stored in a removable medium 221 such as, for example, a magnetic disk, an optical disk, a magneto-optical disk, a semiconductor memory or the like loaded in the drive 215 itself. The drive 215 supplies the information read out from the removable medium 221 to the CPU 201, the RAM 203 and so forth. Further, in the case where a writable removable medium 221 is loaded in the drive 215, the drive 215 can store information (program, data or the like) supplied from the CPU 201, the RAM 203 or the like into the removable medium 221.

The CPU 201 performs various processes by loading a program stored, for example, in the storage section 213 into the RAM 203 through the input/output interface 210 and the bus 204 and executing the program. Into the RAM 203, also data and so forth necessary for the CPU 201 to execute various processes are stored suitably.

For example, the CPU 201 can perform a process relating to structured light pattern generation by executing a program or the like in this manner.

The code string database 231 is a database in which a code string of a corresponding point detection unit corresponding to each pattern 101 of the structured light pattern 100 and the position of the code string are registered in an associated relationship with each other. The code string database 231 may store the code string and information of the position of the same in any form if a structured light pattern 100 can be generated on the basis of at least the information stored therein. For example, the code string database 231 may store information of the code string and information indicative of the position of the code string in a linked relationship with each other using the table information or the like. Further, the code string database 231 may store the structured light pattern 100 as such image data as depicted, for example, in FIG. 10. Furthermore, the code string database 231 may store both the information of the code string and the information indicative of the position of the code string linked with each other and the image data of the structured light pattern 100. Further, the structured light pattern 100 may be formed from all code strings registered in the code string database 231. In this case, the code string database 231 can be regarded also as data of the structured light pattern 100 (as equivalent to the structured light pattern 100). Naturally, the structured light pattern 100 may be formed from some of the code strings registered in the code string database 231. For example, the code string database 231 may correspond to a plurality of structured light patterns 100. In this case, the code string database 231 may register each of the code strings independently for each structured light pattern 100 or a common code string included in a plurality of structured light patterns 100 may be allowed to be registered as one code string.

It is to be noted that the code string database 231 may be formed in the inside of the storage section 213 or may be provided as an apparatus independent of the structured light pattern generation apparatus 200 outside the structured light pattern generation apparatus 200.

<Functional Blocks>

Figure 22:
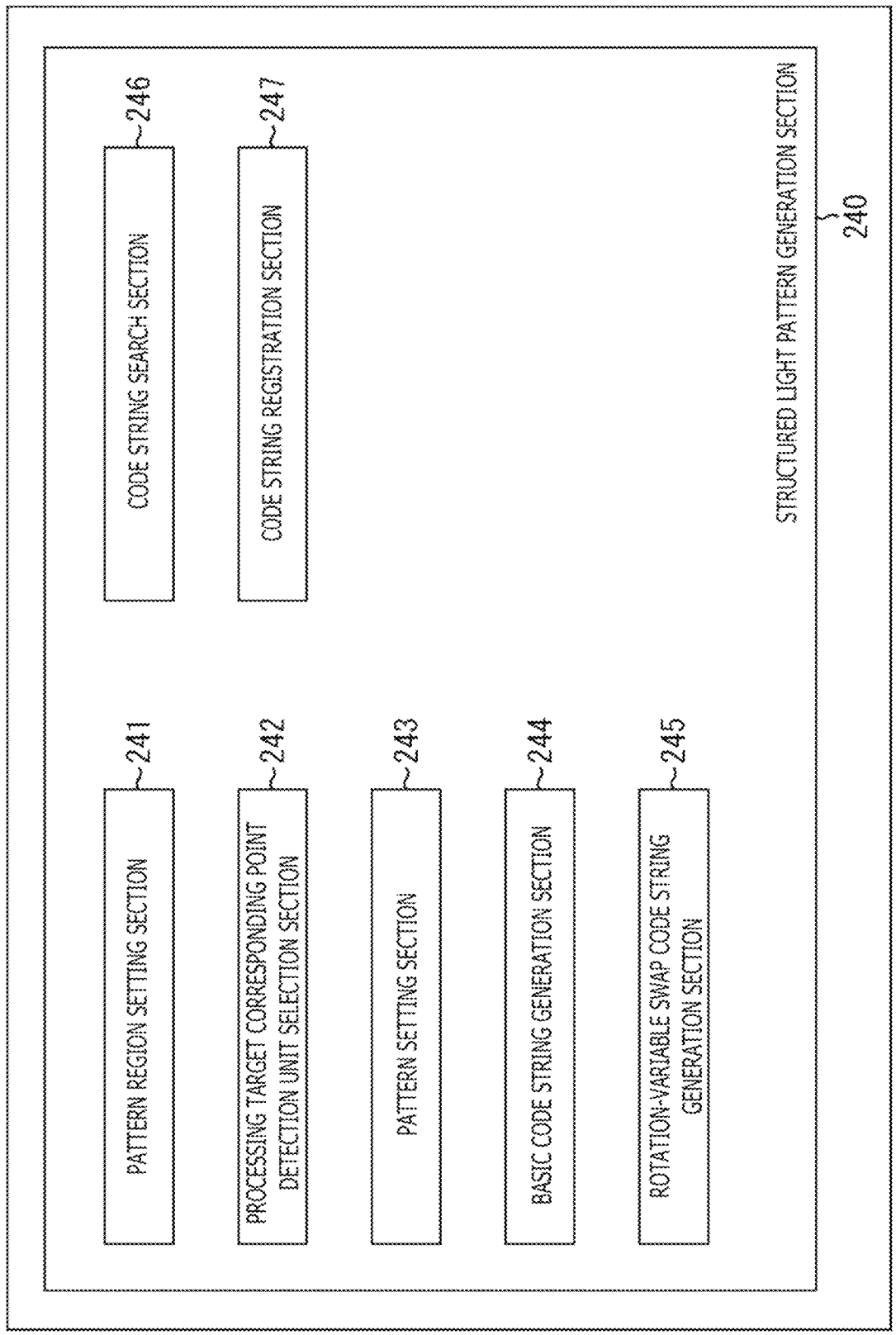
FIG. 22 is a functional block diagram depicting an example of functions implemented by the structured light pattern generation apparatus.

FIG. 22 is a functional block diagram depicting an example of functions implemented by the structured light pattern generation apparatus 200 executing a program or the like. As depicted in FIG. 22, the structured light pattern generation apparatus 200 has a function of a structured light pattern generation section 240 by executing a program.

The structured light pattern generation section 240 performs processes relating to generation of a structured light pattern 100. The structured light pattern generation section 240 includes a pattern region setting section 241, a processing target corresponding point detection unit selection section 242, a pattern setting section 243, a basic code string generation section 244, a rotation-variable swap code string generation section 245, a code string search section 246, and a code string registration section 247.

The pattern region setting section 241 performs a process relating to setting of a pattern region. The processing target corresponding point detection unit selection section 242 performs a process relating to selection of a corresponding point detection unit to be made a processing target. The pattern setting section 243 performs a process relating to setting of a pattern 101. The basic code string generation section 244 performs a process relating to generation of a basic code string. The rotation-variable swap code string generation section 245 performs a process relating to generation of a rotation-variable swap code string. The code string search section 246 performs a process relating to a search for a code string. The code string registration section 247 performs a process relating to registration of a code string.

It is to be noted that the blocks can exchange information (for example, an instruction, data and so forth) with each other as occasion demands.

<Flow of Structured Light Pattern Generation Process>

Figure 23:
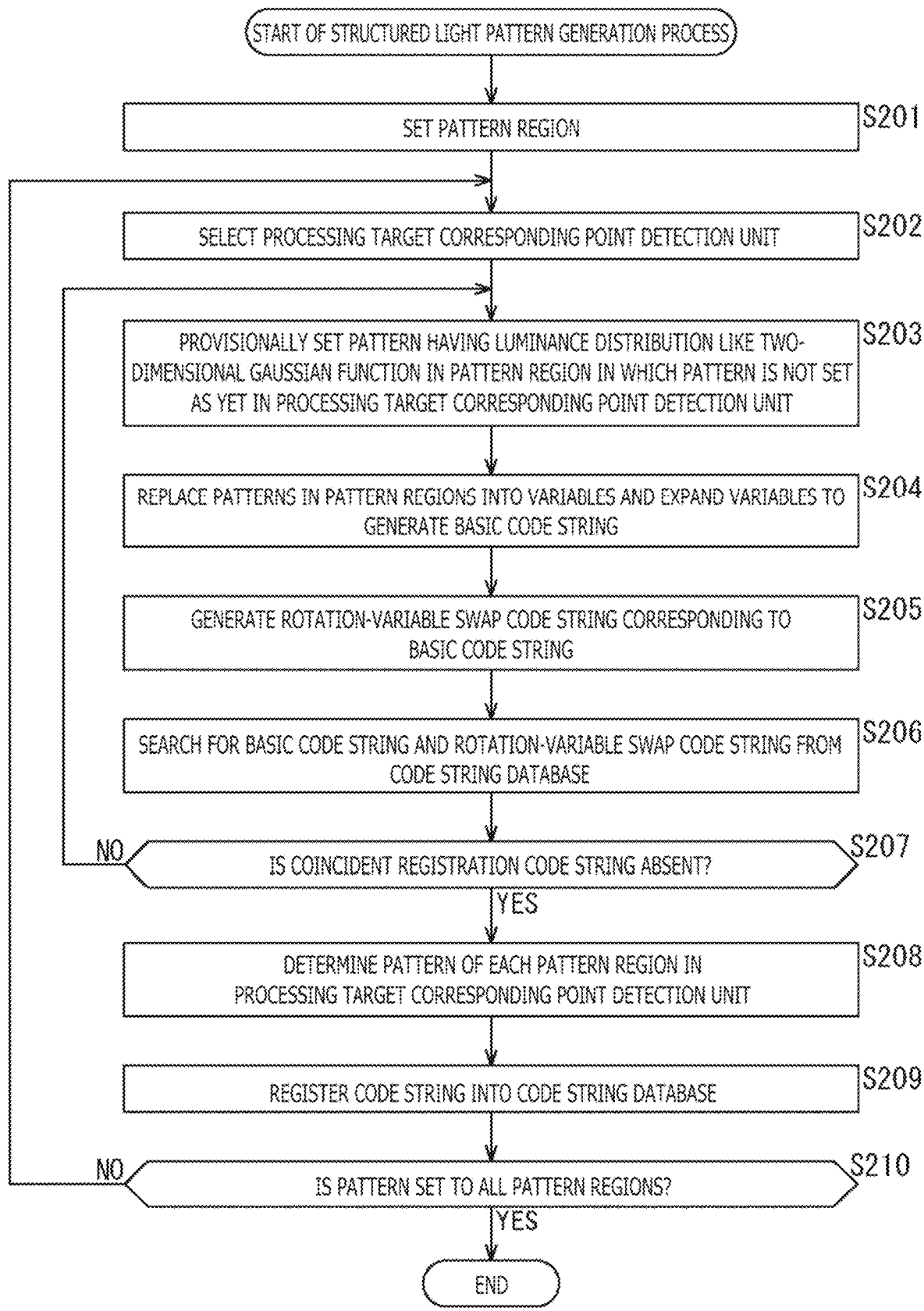
FIG. 23 is a flow chart illustrating an example of a flow of a structured light pattern generation process.

The structured light pattern generation section 240 executes a structured light pattern generation process at a predetermined timing or on the basis of an instruction, a request or the like of a user or a program to generate a structured light pattern 100 having such a technical characteristic as described hereinabove in connection with the first embodiment. An example of a flow of the structured light pattern generation process is described with reference to a flow chart of FIG. 23.

After the structured light pattern generation process is started, the pattern region setting section 241 sets a pattern region at step S201. The pattern region is a region in which a pattern 101 is to be formed. One pattern 101 is formed in one pattern region. The pattern region setting section 241 sets a plurality of pattern regions for all regions or some regions of the structured light pattern 100 to be generated. It is to be noted that the size and the shape of the pattern regions are arbitrary. The pattern regions may be all same in size or shape or some of the pattern regions may be different in size or shape. Further, pattern regions may be formed without any gap therebetween in the region of the structured light pattern 100, or a gap may be formed between adjacent pattern regions, or else, regions adjacent each other may partly superimpose with each other.

At step S202, the processing target corresponding point detection unit selection section 242 selects a corresponding point detection unit (also referred to as processing target corresponding point detection unit) to be made a processing target. As the pattern region is set at step S201, also a corresponding point detection unit is set in combination with the pattern region. The processing target corresponding point detection unit selection section 242 selects a region to be made a processing target from within the corresponding point detection unit.

At step S203, the pattern setting section 243 provisionally sets a pattern 101 having a luminance distribution of a two-dimensional Gaussian function in a pattern region in which pattern is not set as yet in the processing target corresponding point detection unit. In the processing target corresponding point detection unit, the pattern setting section 243 provisionally sets, in each pattern region in which a pattern 101 is not set as yet, a pattern 101 having such a technical structure as described hereinabove in connection with the first embodiment one by one. Along with this, the pattern setting section 243 selects an arbitrary one type from among the types for a pattern 101 prepared in advance and temporarily sets the arbitrary one type. For example, in the case of FIG. 12, the pattern setting section 243 selects, from among the four types of patterns 101 depicted in FIG. 12, a type to be provisionally set to each pattern region.

It is to be noted that, in the case where a pattern region having a pattern 101 registered already (a pattern region for which a type of a pattern 101 is determined already) exists in the processing target corresponding point detection unit, for the pattern region, the pattern 101 determined already is adopted in the process described below. On the other hand, in the case where a plurality of pattern regions in which a pattern 101 is not set as yet exist, the pattern setting section 243 selects a type of a pattern 101 for the individual pattern regions independently of each other and temporarily sets the type of a pattern 101.

The selection method of a type of a pattern 101 is arbitrary. Different types may be selected in a predetermined order determined in advance (in other words, some preferential order is provided to the individual types), or a predetermined order may be provided on the basis of some condition such as a timing, data or the like, or else the types are selected at random. However, in the case where the current process for the processing target corresponding point detection unit is process for the second or succeeding time, the pattern setting section 243 performs provisional setting in a disposition (code string) other than dispositions (code strings) of patterns 101 that have been provisionally set in the last or preceding process.

At step S204, the basic code string generation section 244 replaces the individual patterns 101 in the processing target corresponding point detection unit with variables and expands the variables in a predetermined order to generate a basic code string. Here, to expand the variables in a predetermined order is referred to also as permutation expansion. Further, to replace the individual patterns 101 with variables and expand the variables in a predetermined order is referred to also as permutation code expansion. Further, the basic code string indicates a code string obtained by permutation code expansion of the provisionally set patterns 101.

At step S205, the rotation-variable swap code string generation section 245 generates a rotation-variable swap code string corresponding to the basic code string. Here, the rotation-variable swap code string indicates a code string obtained by replacing each pattern 101 of the processing target corresponding point detection unit with different variables and performing permutation expansion of the variables, another code string obtained by permutation code expanding each pattern 101 after the processing target corresponding point detection unit is rotated by a predetermined angle, and a further code string obtained by replacing each pattern 101 with different variables to permutation expand the variable after the processing target corresponding point detection unit is rotated by a predetermined angle. In short, by the processes at steps S204 and S205, all code strings belonging to the same group are generated.

For example, as indicated at the third stage from below in FIG. 24A, patterns 101 of processing target corresponding point detection units rotated by angles of rotation of 90 degrees, 180 degrees, and 270 degrees from the processing target corresponding point detection unit of the angle of rotation of 0 degrees are generated.

Then, the individual patterns 101 of the processing target corresponding point detection unit of the angles of rotation of 0 degrees, 90 degrees, 180 degrees, and 270 degrees are converted into variables as indicated at the second stage from below in FIG. 24A. It is to be noted that, in FIG. 24A, a pattern 101 is converted into a variable that is one of variables 0 to 3 in response to the type (for example, a luminance variation direction and a direction of the principal axis of inertia) of the pattern 101.

Further, as indicated at the first stage from below in FIG. 24A, the individual patterns 101 of the processing target corresponding point detection unit of the angles of rotation of 0 degrees, 90 degrees, 180 degrees, and 270 degrees are converted into variables of different values.

Figure 24:
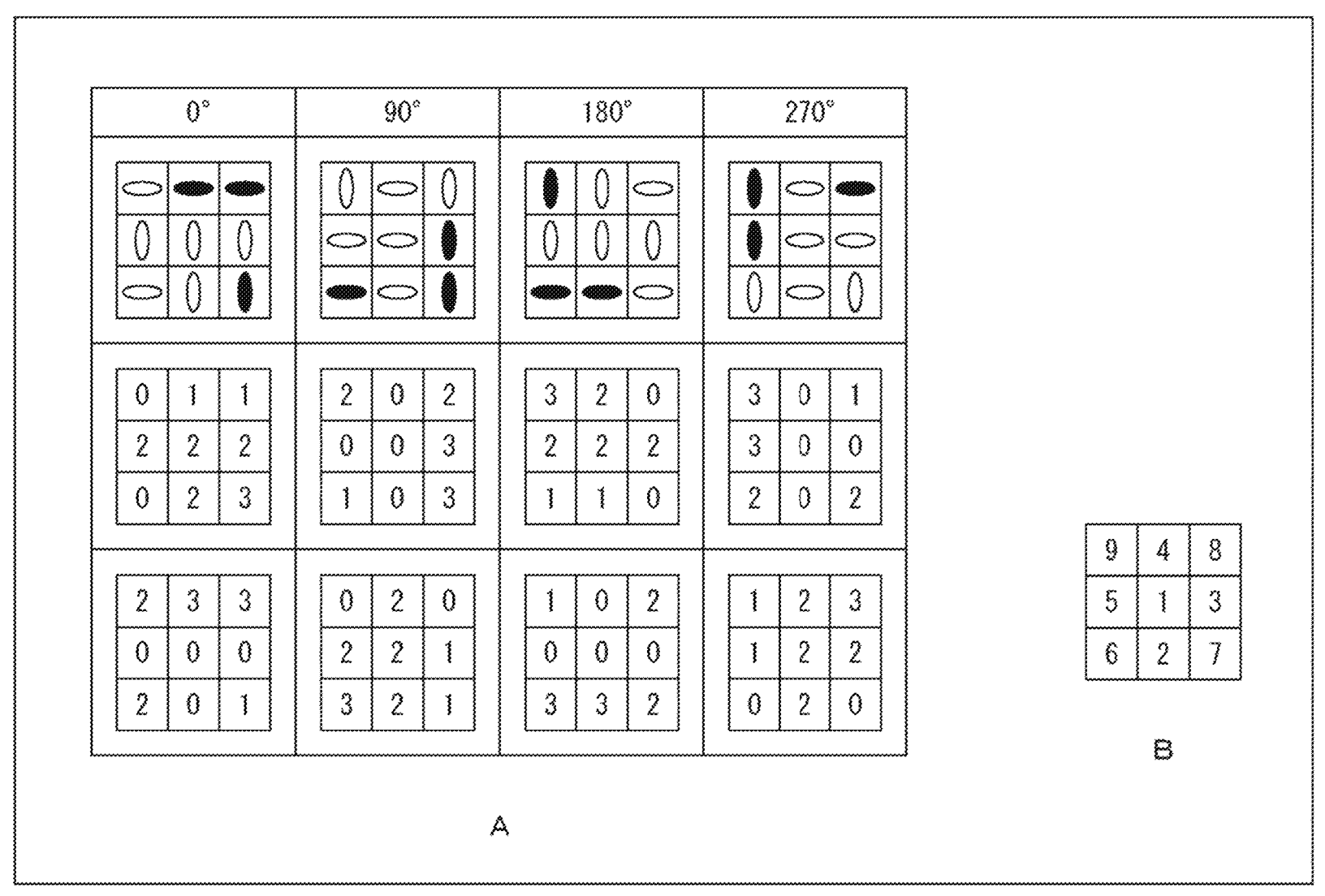

Then, by permutation expanding the variables of the individual processing target corresponding point detection units in such a predetermined order as depicted in FIG. 24B, a basic code string and a rotation-variable swap code string are generated.

At step S206, the code string search section 247 searches the code string database 231 for the basic code string and the rotation-variable swap code string generated by the processes at steps S204 and S205. In particular, the code string search section 247 searches for a code string that coincides with one of the basic code strings and the rotation-variable swap code strings from among code strings (each referred to also as registered code string) registered in the code string database 231. In other words, the code string search section 247 searches for a registered code string belonging to a group same as that of the basic code string.

Into the code string database 231, code strings corresponding to the patterns 101 that configure the structured light pattern 100 are registered. In particular, at the point of time at which the process at step S206 is performed, code strings corresponding to patterns determined already as the patterns 101 that configure the structured light pattern 100 at the point of time are registered in the code string database 231.

At step S207, the code string search section 247 decides whether or not a registered code string that coincides with one of the basic code string and the rotation-variable swap code string is absent. Into the code string database 231, only one code string from among code strings that belong to one group can be registered. In other words, any code string that belongs to a group in which some code string is registered already cannot be registered into the code string database 231. Accordingly, in the case where it is decided at step S207 that a coincident registered code string exists, the process returns to step S203, and the processes at the steps beginning with step S203 are performed. In other words, the provisional setting of a pattern 101 of a processing target corresponding point detection unit is performed again. In this manner, the processes at steps S203 to S207 are repeated until a code string that is not registered in a code string database 231 in which any code string belonging to the group is registered is found.

In the case where it is decided at step S207 that a coincident code string is absent, since a code string of the group can be registered into the code string database 231, the process advances to step S208.

At step S208, the pattern setting section 243 determines a pattern 101 for each pattern region in the processing target corresponding point detection unit. In other words, a basic code string and a position of the basic code string in the structured light pattern 100 are determined. At step S209, the code string registration section 247 registers the determined basic code string into the code string database 231. Along with this, the code string registration section 247 registers the basic code string in a linked relationship with the position of the basic code string in the structured light pattern 100 into the code string database 231.

At step S210, the pattern region setting section 241 decides whether or not a pattern 101 is set in all pattern regions set at step S201. In the case where it is decided that a pattern region in which pattern 101 is not set as yet exists, the process returns to step S202, and the processes at the steps beginning with step S202 are executed. In particular, a new corresponding point detection unit that is not processed as yet is selected as a processing target, and the processes described above are executed for the processing target corresponding point detection unit. In this manner, the processes at steps S202 to S210 are repeated until a pattern 101 is set in all pattern regions.

In the case where it is decided at step S210 that a pattern 101 is set in all pattern regions, the structured light pattern generation process is ended.

In this manner, by generating a structured light pattern 100 described in connection with the first embodiment, the structured light pattern generation apparatus 200 can improve the invisibility of corresponding point detection similarly as in the case of the first embodiment.

3. Third Embodiment

<Projection Image Pickup System>

Figure 25:
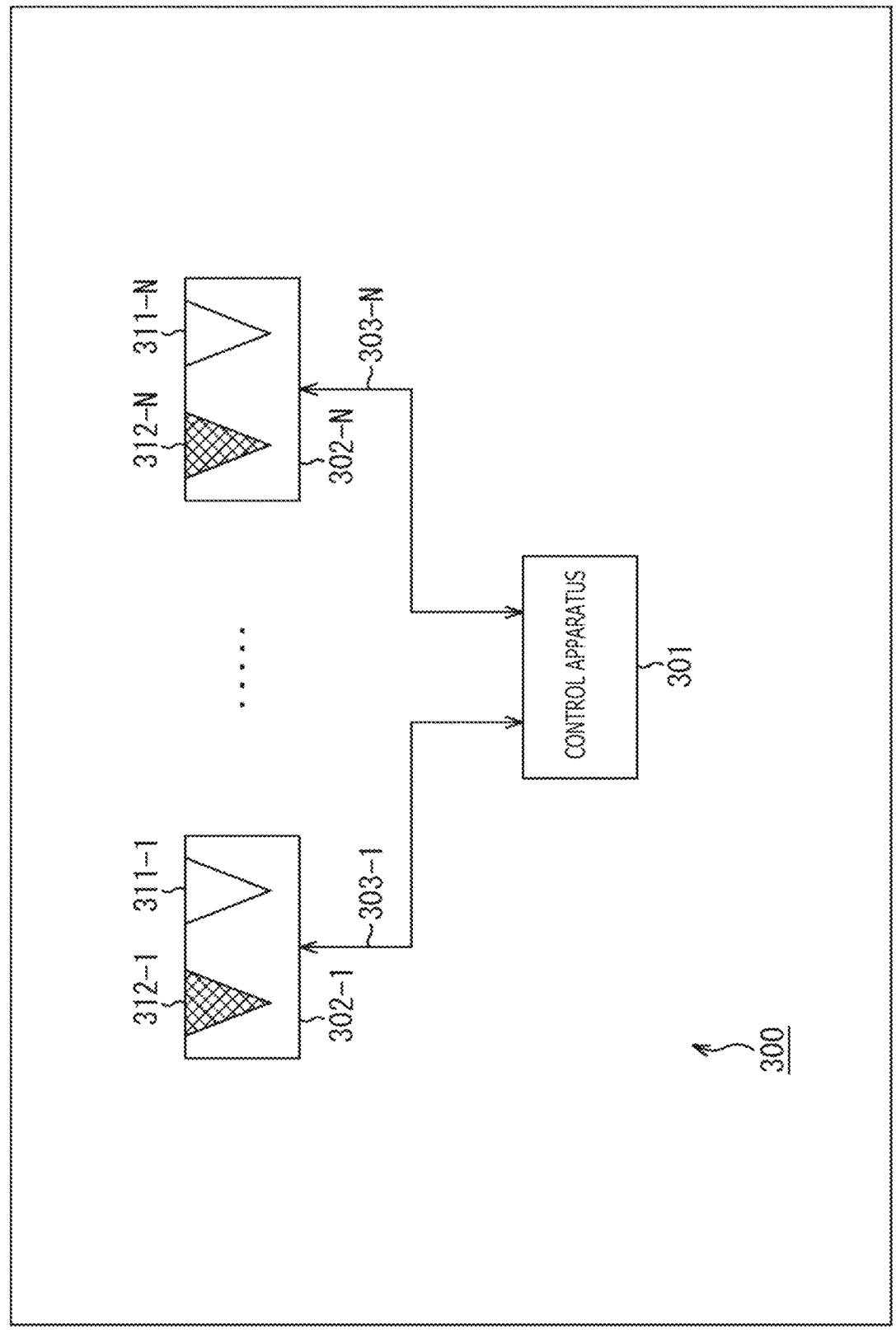
FIG. 25 is a block diagram depicting an example of a principal configuration of a projection image pickup system.

Now, detection of a corresponding point in which such a structured light pattern 100 as described above is used is described. FIG. 25 is a block diagram depicting an example of a principal configuration of an embodiment of a projection image pickup system to which the present technology is applied. In FIG. 25, a projection image pickup system 300 is a system which can project an image, pick up the projection image, and perform corresponding point detection according to an ISL method by a method to which the present technology is applied.

As depicted in FIG. 25, the projection image pickup system 300 includes a control apparatus 301 and projection image pickup apparatus 302-1 to 302-N (N is an arbitrary natural number). The projection image pickup apparatus 302-1 to 302-N are connected to the control apparatus 301 through cables 303-1 to 303-N, individually.

In the following description, where there is no necessity to describe the projection image pickup apparatus 302-1 to 302-N in a distinguished manner, each of them is referred to as projection image pickup apparatus 302. Further, where there is no necessity to describe the cables 303-1 to 303-N in a distinguished manner, each of them is referred to as cable 303.

The control apparatus 301 controls the individual projection image pickup apparatus 302 through the cables 303. For example, the control apparatus 301 can supply an image to be projected to each projection image pickup apparatus 302 such that the projection image pickup apparatus 302 projects the image. Further, for example, the control apparatus 301 can instruct each projection image pickup apparatus 302 to pick up a projection image or the like and acquire the picked up image. Furthermore, for example, the control apparatus 301 can perform detection of corresponding points between a projection image and a picked up image or perform geometric correction of an image to be projected by the individual projection image pickup apparatus 302 on the basis of the determined corresponding points. It is to be noted that this geometric correction can include not only an image process for the image to be projected (for example, enlargement, contraction, deformation or the like) but also control and so forth (for example, control of a projection direction, an image pickup direction and so forth) of an optical system of each projection image pickup apparatus 302.

The projection image pickup apparatus 302-1 to 302-N individually include projection sections 311-1 to 311-N for projecting an image and image pickup sections 312-1 to 312-N for picking up an image pickup object. In the following description, in the case where there is no necessity to describe the projection sections 311-1 to 311-N in a distinguished manner, each of them is referred to as projection section 311. Further, in the case where there is no necessity to describe the image pickup sections 312-1 to 312-N in a distinguished manner, each of them is referred to as image pickup section 312.

Each projection section 311 has a function of a so-called projector. In short, each projection image pickup apparatus 302 can be driven as a projector using the projection section 311. For example, the projection image pickup apparatus 302 can project an image supplied from the control apparatus 301 to an arbitrary projection plane using the projection section 311.

Each image pickup section 312 has a function of a so-called camera. In short, each projection image pickup apparatus 302 can be driven as a camera using the image pickup section 312. For example, the projection image pickup apparatus 302 can perform image pickup of the projection plane to which an image is projected by the projection section 311 using the image pickup sections 312 and supplies data of the obtained picked up image to the control apparatus 301.

The number of the projection image pickup apparatus 302 is arbitrary and may be a single number or a plural number. In the case where the number of projection image pickup apparatus 302 is a plural number, the projection image pickup apparatus 302 can cooperate with each other under the control of the control apparatus 301 to perform such projection of an image as described hereinabove with reference to FIGS. 2A and 2B or FIG. 3. In sort, the projection image pickup system 300 in this case is a so-called multi-projection system and can implement so-called projection mapping.

It is to be noted that the projection direction and the magnification ratio of an image by the projection section 311, distortion correction of a projection image and so forth may be made controllable. For this control, for example, the position or the posture of the optical system the projection section 311 has or the entire projection section 311 may be made controllable.

Further, the image pickup direction or the angle of view of an image by the image pickup section 312, distortion correction of a picked up image and so forth may be made controllable. For this control, for example, the position or the posture of the optical system the image pickup section 312 has or the entire image pickup section 312 may be made controllable.

Furthermore, such control of the projection section 311 and control of the image pickup section 312 as described above may be performed independently of each other. Further, the position or the posture of the projection image pickup apparatus 302 may be made controllable. It is to be noted that such control of the projection section 311, the image pickup section 312, and the projection image pickup apparatus 302 as described above may be performed by the control apparatus 301 or may be performed by any other than the control apparatus 301.

Each cable 303 is an electric communication cable of an arbitrary communication standard that can make a communication path between the control apparatus 301 and a projection image pickup apparatus 302. It is to be noted that only it is necessary for the control apparatus 301 and the projection image pickup apparatus 302 to be communicatable with each other, and for example, the control apparatus 301 and the projection image pickup apparatus 302 may be connected by wireless communication. In this case, the cables 303 can be omitted.

In such a projection image pickup system 300 as described above, the control apparatus 301 performs corresponding point detection between each projection section 311 and each image pickup section 312 in order to perform geometric correction of an image. For example, the control apparatus 301 can perform corresponding point detection according to an ISL method of online sensing. Along with this, the control apparatus 301 can perform corresponding point detection to which the present technology is applied.

<Control Apparatus>

Figure 26:
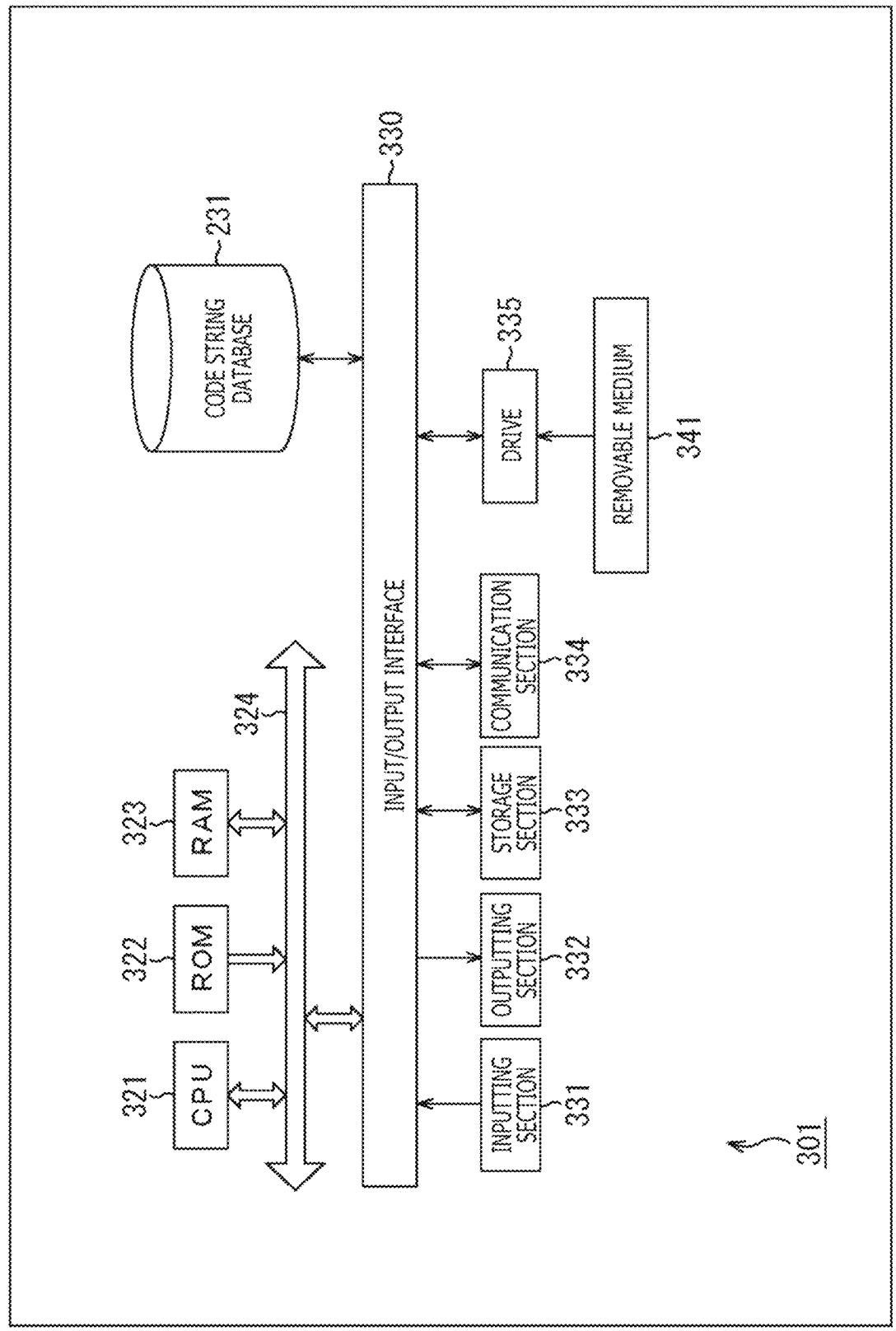
FIG. 26 is a block diagram depicting an example of a principal configuration of a control apparatus.

FIG. 26 is a block diagram depicting an example of a principal configuration of the control apparatus 301 that is an embodiment of the image processing apparatus to which the present technology is applied.

As depicted in FIG. 26, the control apparatus 301 includes a CPU 321, a ROM 322, a RAM 323, a bus 324, an input/output interface 330, an inputting section 331, an outputting section 332, a storage section 333, a communication section 334, a drive 335, and a code string database 231.

The CPU 321, the ROM 322, and the RAM 323 are connected to each other by the bus 324. To the bus 324, also the input/output interface 330 is connected. To the input/output interface 330, the inputting section 331, the outputting section 332, the storage section 333, the communication section 334, the drive 335, and the code string database 231 are connected.

The inputting section 331 is configured from an inputting device that accepts external information such as a user input or the like. For example, the inputting section 331 may include a keyboard, a mouse, an operation button, a touch panel, a camera, a microphone, an inputting terminal and so forth. Further, inputting equipment such as various sensors such as an acceleration sensor, an optical sensor, a temperature sensor and so forth, a bar code reader and so forth may be included in the inputting section 211. The outputting section 332 is configured from an outputting device that outputs information of an image, sound and so forth. For example, the outputting section 332 may include a display, a speaker, an output terminal and so forth.

The storage section 333 is configured from a storage medium that stores information such as a program, data and so forth. For example, the storage section 333 may include a hard disk, a RAM disk, a nonvolatile memory or the like. The communication section 334 is configured from a communication device that performs communication for exchanging information such as a program, data and so forth with an external apparatus through a predetermined communication medium (an arbitrary network such as, for example, the Internet). The communication section 334 may be configured, for example, from a network interface. For example, the communication section 334 performs communication (exchange of a program or data) with an external apparatus of the control apparatus 301. It is to be noted that the communication section 334 may have a wired communication function or may have a wireless communication function or else may have both of them.

The drive 335 reads out information (program, data and so forth) stored in a removable medium 341 such as, for example, a magnetic disk, an optical disk, a magneto-optical disk, a semiconductor memory or the like loaded in the drive 335 itself. The drive 335 supplies the information read out from the removable medium 341 to the CPU 321, the RAM 323 and so forth. Further, in the case where a writable removable medium 341 is loaded in the drive 335, the drive 335 can store information (program, data or the like) supplied from the CPU 321, the RAM 323 or the like into the removable medium 341.

The CPU 321 performs various processes by loading a program stored, for example, in the storage section 333 into the RAM 323 through the input/output interface 330 and the bus 324 and executing the program. Into the RAM 323, also data and so forth necessary for the CPU 321 to execute various processes are stored suitably.

For example, the CPU 321 can perform a process relating to detection of a corresponding point by executing a program or the like in this manner.

The code string database 231 is a database generated by the structured light pattern generation apparatus 200 and has stored therein information relating to the structured light pattern 100 as described hereinabove. It is to be noted that the code string database 231 may be formed in the inside of the storage section 333 or may be provided as an apparatus independent of the control apparatus 301 outside the control apparatus 301.

<Functional Blocks of Control Apparatus>

Figure 27:
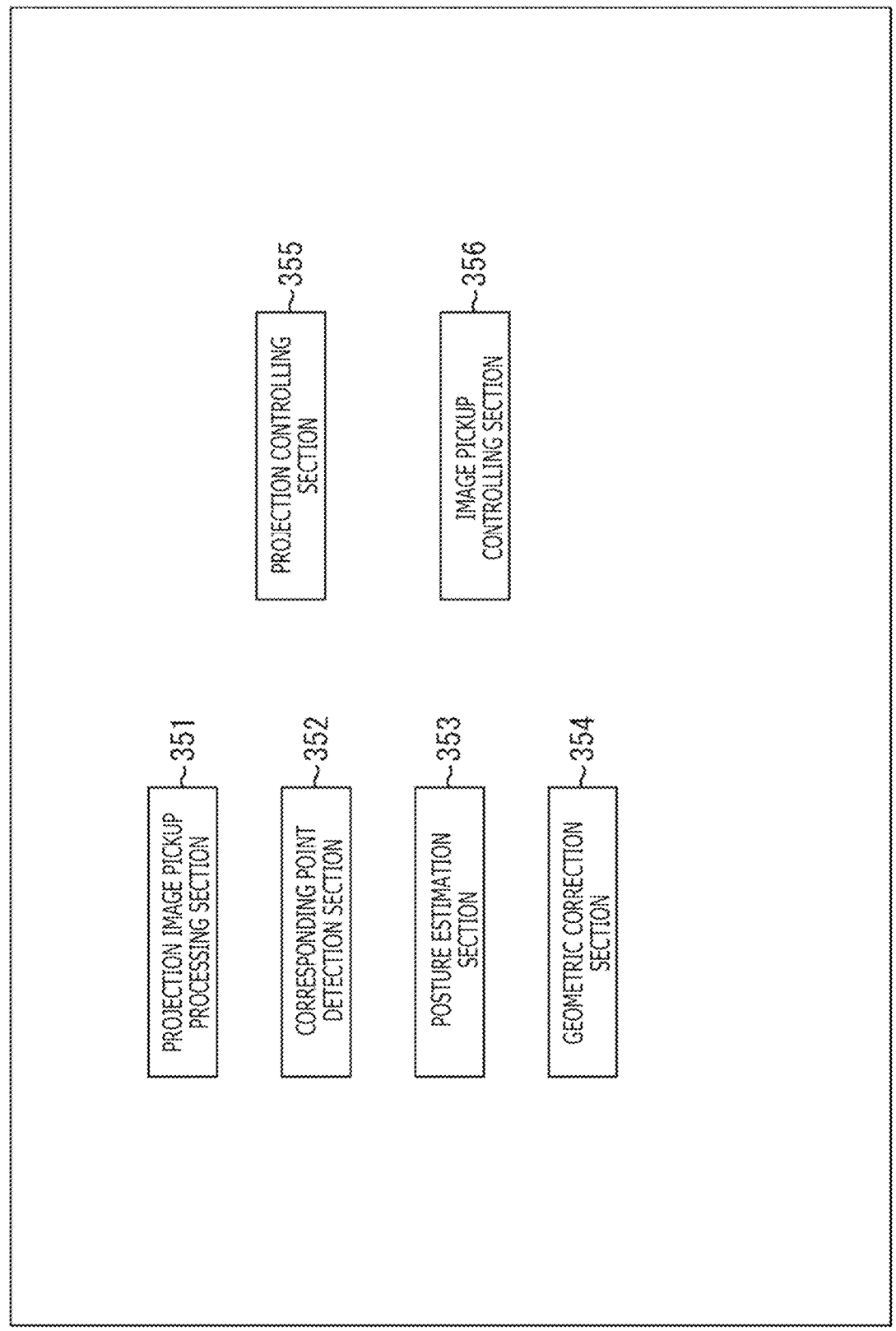
FIG. 27 is a functional block diagram depicting an example of functions implemented by the control apparatus.

FIG. 27 is a functional block diagram depicting an example of functions implemented by the control apparatus 301 executing a program and so forth. As depicted in FIG. 27, the control apparatus 301 has functions of a projection image pickup processing section 351, a corresponding point detection section 352, a posture estimation section 353, a geometric correction section 354, a projection controlling section 355, and an image pickup controlling section 356 by executing a program.

The projection image pickup processing section 351 performs processes relating to projection and image pickup by the individual projection image pickup apparatus 302. The corresponding point detection section 352 performs processes relating to corresponding point detection between each projection section 311 and each image pickup section 312. The posture estimation section 353 performs processes relating to posture estimation of each projection section 311 or each image pickup section 312. The geometric correction section 354 performs processes relating to geometric correction of an image to be projected from each projection section 311. The projection controlling section 355 controls operation of each projection section 311. The image pickup controlling section 356 controls operation of each image pickup section 312.

It is to be noted that the blocks can exchange information (for example, an instruction, data and so forth) with each other as occasion demands.

<Corresponding Point Detection Section>

Figure 28:
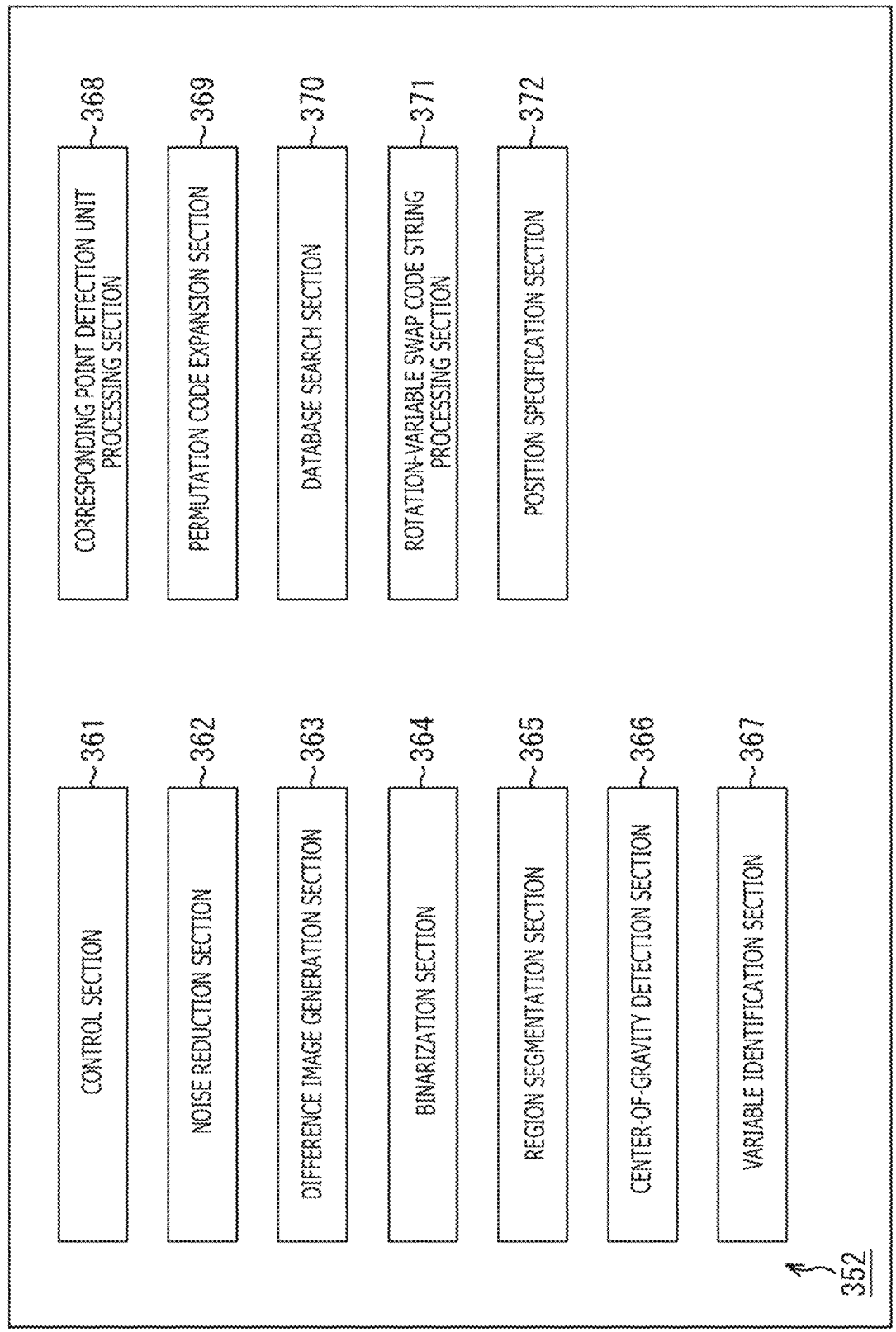
FIG. 28 is a functional block diagram depicting an example of functions implemented by a corresponding point detection section.

The corresponding point detection section 352 has functions indicated as functional blocks in FIG. 28. In particular, the corresponding point detection section 352 has functions of a control section 361, a noise reduction section 362, a difference image generation section 363, a binarization section 364, a region segmentation section 365, a center-of-gravity detection section 366, a variable identification section 367, a corresponding point detection unit processing section 368, a permutation code expansion section 369, a database search section 370, a rotation-variable swap code string processing section 371, and a position specification section 372.

The control section 361 performs processes relating to control of corresponding point detection. The noise reduction section 362 performs processes relating to noise reduction. The difference image generation section 363 performs processes relating to generation of a difference image. The binarization section 364 performs processes relating to binarization. The region segmentation section 365 performs processes relating to segmentation of a region. The center-of-gravity detection section 366 performs processes relating to detection of the center of gravity. The variable identification section 367 performs processes relating to an identification of a variable. The corresponding point detection unit processing section 368 performs processes relating to a corresponding point detection unit. The permutation code expansion section 369 performs processes relating to permutation code expansion. The database search section 370 performs processes relating to a search for a code string in the code string database 231. The rotation-variable swap code string processing section 371 performs processes relating to a rotation-variable swap code string. The position specification section 372 performs processes relating to specification of a position in a structured light pattern 100.

It is to be noted that the blocks can exchange information (for example, an instruction, data and so forth) with each other as occasion demands.

<Project Image Pickup Apparatus>

Figure 29:
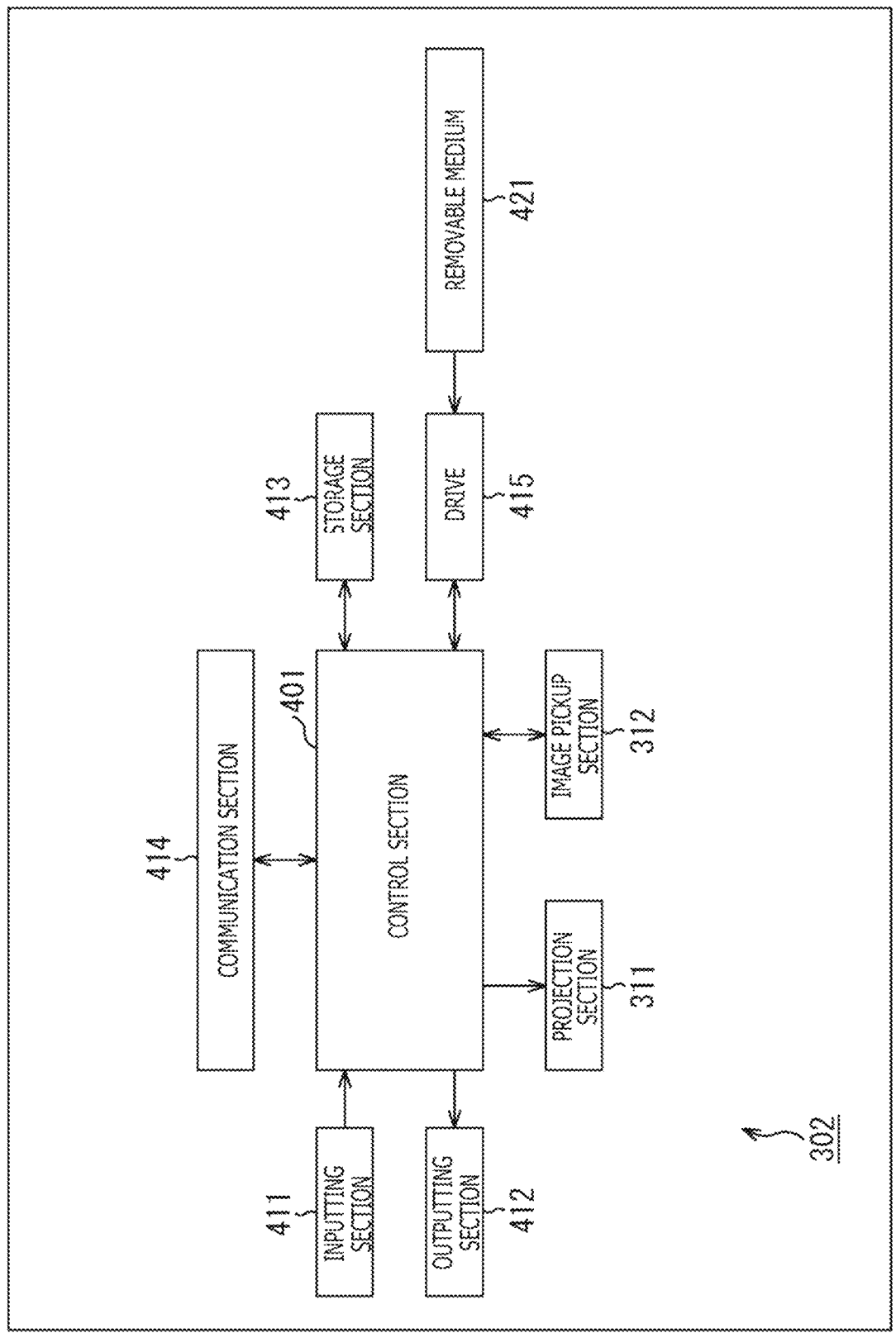
FIG. 29 is a block diagram depicting an example of a principal configuration of a projection image pickup apparatus.

FIG. 29 is a block diagram depicting an example of a principal configuration of each projection image pickup apparatus 302. As depicted in FIG. 29, the projection image pickup apparatus 302 includes a control section 401, a projection section 311, an image pickup section 312, an inputting section 411, an outputting section 412, a storage section 413, a communication section 414, and a drive 415.

The control section 401 includes, for example, a CPU, a ROM, a RAM and so forth, and controls the individual processing sections in the apparatus and executes various processes necessary for the control such as, for example, an image process and so forth. The control section 401 performs the processes, for example, under the control of the control apparatus 301.

The projection section 311 performs processes relating to projection of an image under the control of the control section 401. For example, the projection section 311 projects an image supplied from the control section 401 to the outside (for example, to a projection plane or the like) of the projection image pickup apparatus 302. The projection section 311 uses laser light as a light source and scans the laser light using a MEMS (Micro Elector Mechanical Systems) mirror to project an image. Naturally, the light source of the projection section 311 is arbitrary and is not limited to laser light but may be, for example, an LED (Light Emitting Diode), xenon or the like.

The image pickup section 312 picks up an image of an image pickup object outside the apparatus (for example, on a projection plane or the like) to generate a picked up image under the control of the control section 401 and supplies the picked up image to the control section 401. For example, the image pickup section 312 picks up an image of a projection image projected to the projection plane by the projection section 311. The image pickup section 312 includes an image sensor for which, for example, a CMOS (Complementary Metal Oxide Semiconductor) image sensor, an image sensor for which a CCD (Charge Coupled Device) image sensor or the like is used, and photoelectrically converts light from the image pickup object by the image sensor to generate an electric signal (data) of the picked up image.

The inputting section 411 is configured from an inputting device that accepts external information such as a user input or the like. For example, the inputting section 411 includes an operation button, a touch panel, a camera, a microphone, an input terminal and so forth. Further, various sensors such as an optical sensor, a temperature sensor and so forth may be included in the inputting section 411. The outputting section 412 is configured from an outputting device that outputs an image, sound and so forth. For example, the outputting section 412 includes a display, a speaker, an output terminal and so forth.

The storage section 413 is configured, for example, from a hard disk, a RAM disk, a nonvolatile memory or the like. The communication section 414 is configured, for example, from a network interface. For example, the communication section 414 is connected to the cable 303 and can communicate with the control apparatus 301 connected through the cable 303. It is to be noted that the communication section 414 may have a wired communication function or may have a wireless communication function or else may have both of the functions. The drive 415 drives a removable medium 421 such as, for example, a magnetic disk, an optical disk, a magneto-optical disk, a semiconductor memory or the like.

<Projection Section>

Figure 30:
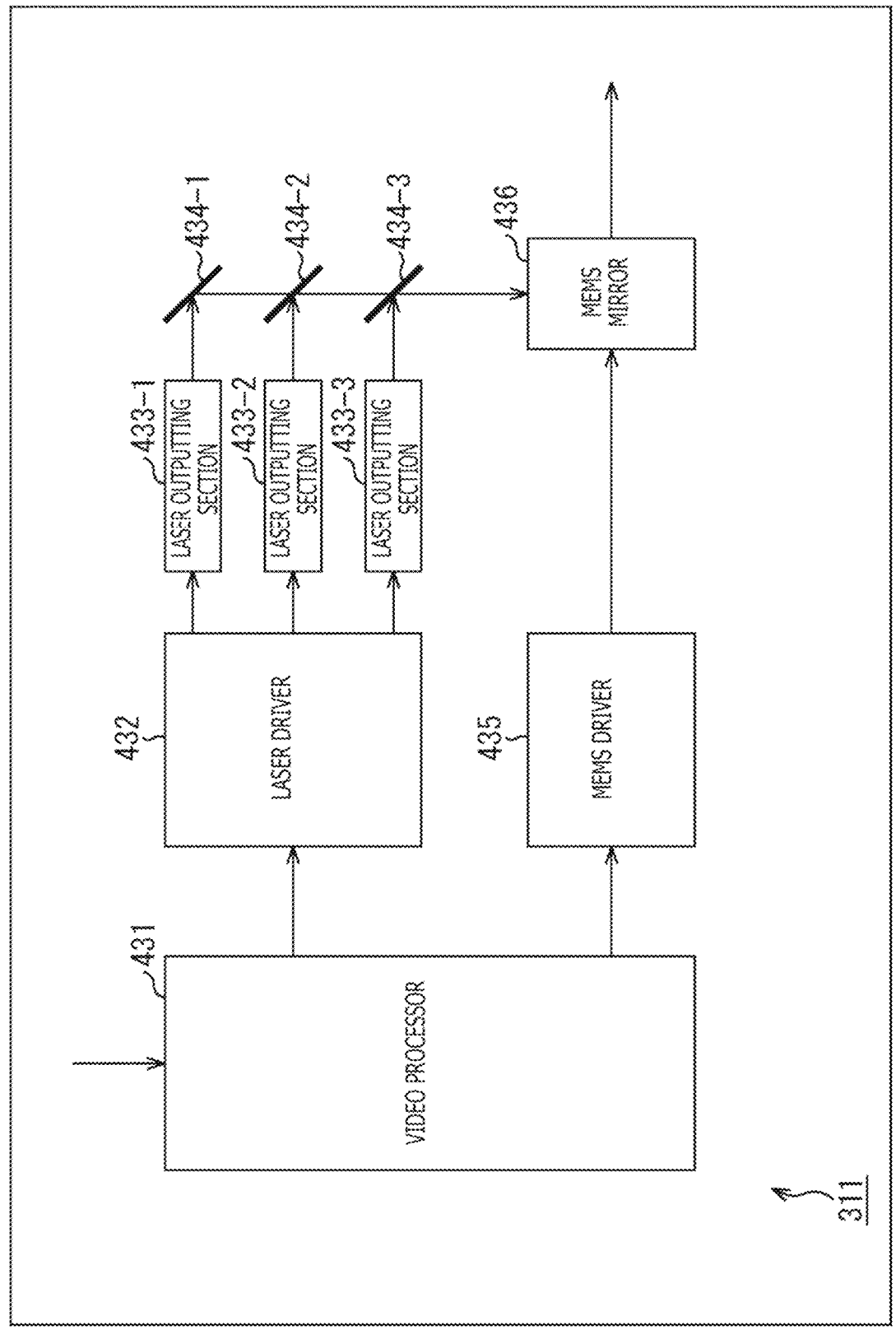
FIG. 30 is a block diagram depicting an example of a principal configuration of a projection section.

FIG. 30 is a block diagram depicting an example of a principal configuration of the projection section 311. As depicted in FIG. 30, the projection section 311 includes a video processor 431, a laser driver 432, a laser outputting section 433-1, another laser outputting section 433-2, a further laser outputting section 433-3, a mirror 434-1, another mirror 434-2, a further mirror 434-3, a MEMS driver 435, and a MEMS mirror 436.

The video processor 431 retains an image supplied from the control section 401 and performs a necessary image process for the image. The video processor 431 supplies the image to be projected to the laser driver 432 and the MEMS driver 435.

The laser driver 432 controls the laser outputting sections 433-1 to 433-3 such that an image supplied from the video processor 431 is projected. The laser outputting sections 433-1 to 433-3 output laser beams of colors (wavelength regions) different from each other such as, for example, red, blue, green or the like. In other words, the laser driver 432 controls laser outputs of the colors such that an image supplied from the video processor 431 is projected. It is to be noted that, in the case where there is no necessity to describe the laser outputting sections 433-1 to 433-3 in a distinguished manner, each of them is referred to as laser outputting section 433.

The mirror 434-1 reflects a laser beam output from the laser outputting section 433-1 and guides the laser beam to the MEMS mirror 436. The mirror 434-2 reflects a laser beam output from the laser outputting section 433-2 and guides the laser beam to the MEMS mirror 436. The mirror 434-3 reflects a laser beam output from the laser outputting section 433 and guides the laser beam to the MEMS mirror 436. It is to be noted that, where there is no necessity to describe the mirrors 434-1 to 434-3 in a distinguished manner, each of them is referred to as mirror 434.

Figure 31:
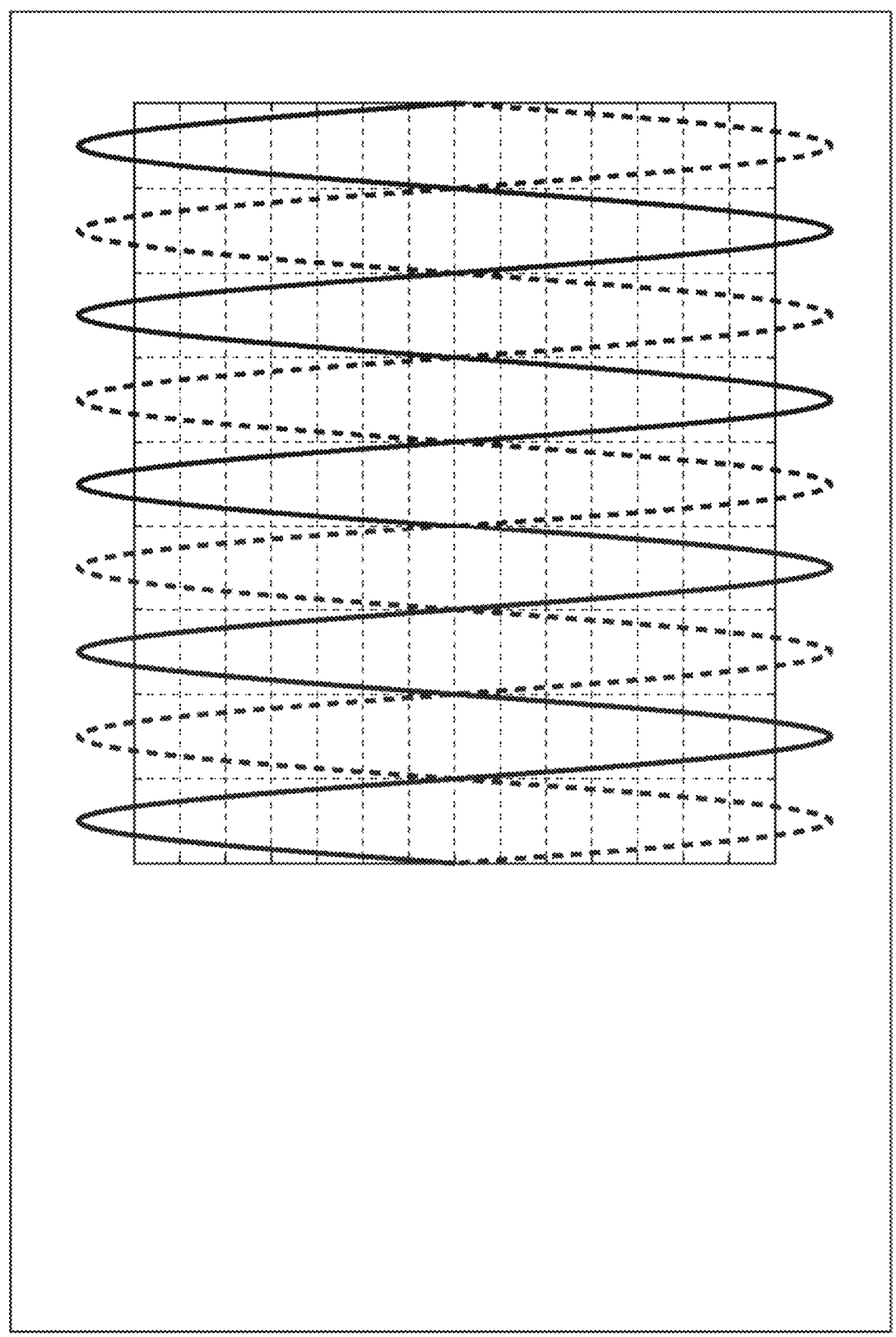
FIG. 31 is a view depicting an example of scanning of laser light.

The MEMS driver 435 controls driving of the mirrors of the MEMS mirror 436 such that an image supplied from the video processor 431 is projected. Each MEMS mirror 436 drives the mirror (mirror) attached to a MEMS thereof to scan the laser beam of the corresponding color, for example, in such a manner as in an example of FIG. 31 under the control of the MEMS driver 435. This laser beam is output to the outside of the apparatus from a projection port and is irradiated, for example, upon a projection plane. Consequently, an image supplied from the video processor 431 is projected to the projection plane.

It is to be noted that, while it is described that, in the example of FIG. 30, three laser outputting sections 433 are provided such that laser beams of three colors are output, the number of laser beams (or the number of colors) is arbitrary. For example, four or more laser outputting sections 433 may be provided or two or less laser outputting sections 433 may be provided. In other words, the number of laser beams to be output from the projection image pickup apparatus 302 (projection section 311) may be equal to or smaller than two or may be equal to or greater than four. Also the number of colors of laser beams to be output from the projection image pickup apparatus 302 (projection section 311) is arbitrary and may be equal to or smaller than two or may be equal to or greater than four. Also the configuration of the mirror 434 and the MEMS mirror 436 is arbitrary and is not limited to that of the example of FIG. 30. Naturally, the scanning pattern of the laser beams is arbitrary.

<Flow of Geometric Correction Process>

Now, processes executed by the projection image pickup system 300 having such a configuration as described above are described. As described hereinabove, in the projection image pickup system 300, the control apparatus 301 controls the individual projection image pickup apparatus 302 such that, while an image of a content or the like is projected, corresponding point detection between each projection section 311 and each image pickup section 312 is performed through online sensing of the ISL method and posture estimation, projection plane formation and so forth of each projection section and each image pickup section 312 are performed on the basis of such corresponding points and then geometric correction of an image to be projected is performed.

An example of a flow of a geometric correction process executed by the control apparatus 301 in order to execute the processes described above is described with reference to a flow chart of FIG. 32.

After the geometric correction process is started, the projection image pickup processing section 351 of the control apparatus 301 controls the individual projection image pickup apparatus 302 through the projection controlling section 355 and the image pickup controlling section 356, and performs projection and image pickup of an image of a structured light pattern 100 at step S301.

At step S302, the corresponding point detection section 352 performs detection of corresponding points using the picked up image acquired from the individual projection image pickup apparatus 302 through the image pickup controlling section 356 (picked up images when the image pickup section 312 picks up an image of a projection plane) by the process at step S301.

At step S303, the posture estimation section 353 performs posture estimation and projection screen reconfiguration of the projection sections 311 and the image pickup sections 312 (or the individual projection image pickup apparatus 302) using the detected corresponding points. The projection screen reconfiguration is a process for estimating a shape of a projection screen that is the projection plane.

At step S304, the geometric correction section 354 performs geometric correction of an image to be projected from each projection section 311 as occasion demands on the basis of processing results of the posture estimation and the projection screen reconfiguration.

When the geometric correction ends, the geometric correction process ends.

<Flow of Projection Image Pickup Process>

Figure 32:
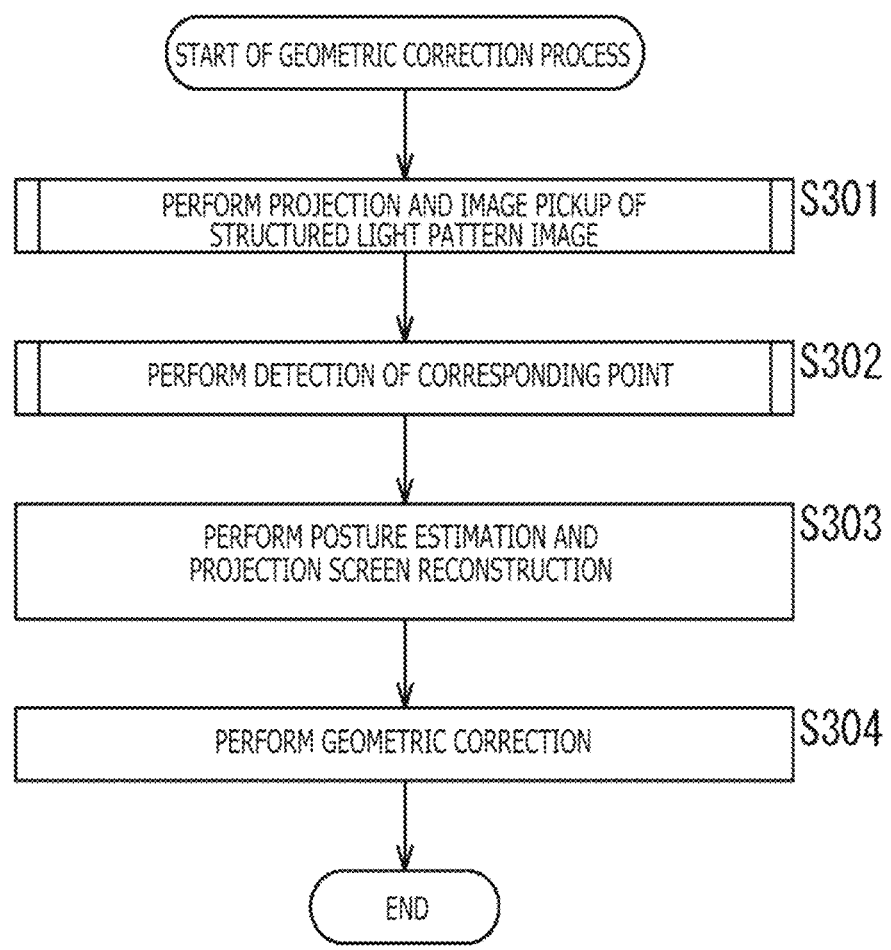
FIG. 32 is a flow chart illustrating an example of a flow of a geometric correction process.

Now, a flow of a projection image pickup process executed at step S301 of FIG. 32 is described with reference to a flow chart of FIG. 33.

After the projection image pickup process is started, the projection image pickup processing section 351 selects a projection section 311 to be made a processing target (processing target projection section) at step S321.

At step S322, the projection image pickup processing section 351 selects a structured light pattern 100 to be projected. The projection image pickup processing section 351 selects a structured light pattern 100 to be projected from among structured light patterns 100 registered in the code string database 231. In short, the projection image pickup processing section 351 selects a structured light pattern 100 configured in such a manner as described in the description of the first embodiment.

At step S323, the projection image pickup processing section 351 superimposes a positive image of the selected structured light pattern 100 on the image to be projected by the processing target projection section (generates a superimposition image). In particular, the projection image pickup processing section 351 adds the selected structured light pattern 100 to the luminance values of the image to be projected by the projection section 311 of the processing target.

At step S324, the projection image pickup processing section 351 causes the superimposition image to be projected by the processing target projection section through the projection controlling section 355 and causes non-superimposition images to be projected by the other projection sections. In other words, the projection image pickup processing section 351 causes the projection section 311 of the processing target to project an image on which the positive image of the structured light pattern 100 is superimposed (superimposition image) and causes the other projection sections 311 to project images on which the positive image of a structured light pattern 100 is not superimposed (non-superimposition images) suitably.

At step S325, the projection image pickup processing section 351 causes each image pickup section 312 to pick up a projection image (projection image of the superimposition image projected by the processing target projection section) through the image pickup controlling section 356 and obtains the picked up images (pattern picked up images) of the image pickup sections 312. It is to be noted that image pickup may be omitted for any image pickup section 312 with regard to which it is apparent that the projection image of the superimposition image projected by the processing target projection section comes outside of an image pickup range.

At step S326, the projection image pickup processing section 351 superimposes a negative image of the selected structured light pattern 100 on the image to be projected by the processing target projection section (generates a superimposition image). In particular, the projection image pickup processing section 351 subtracts the selected structured light pattern 100 from the luminance values of the image to be projected by the projection section 311 of the processing target.

At step S327, the projection image pickup processing section 351 causes the processing target projection section to project the superimposition image and causes the other projection sections to project non-superimposition images through the projection controlling section 355. In particular, the projection image pickup processing section 351 causes the projection section 311 of the processing target to project the image (superimposition image) on which the negative image of the structured light pattern 100 is superimposed and causes the other projection sections 311 to suitably project images (non-superimposition images) on which the negative image of the structured light pattern 100 is not superimposed.

At step S328, the projection image pickup processing section 351 causes the individual image pickup sections to pick up a projection image (projection image of the superimposition image projected by the processing target projection section) through the image pickup controlling section 356 to obtain picked up images (pattern picked up images). It is to be noted that image pickup may be omitted for any image pickup section 312 with regard to which it is apparent that the projection image of the superimposition image projected by the processing target projection section comes outside of an image pickup range.

At step S329, the projection image pickup processing section 351 decides whether or not the processes described above are performed for all projection sections 311. In the case where a projection section 311 that is not processed as yet exists, the process returns to step S321, and the processes beginning with step S321 are repeated. In other words, the processes at steps S321 to S329 are executed for each projection section 311 as a processing target. Then, in the case where it is decided at step S329 that processes are performed for all projection sections 311, the projection image pickup process ends, and the process returns to FIG. 32.

The projection image pickup system 300 (control apparatus 301) can cause a structured light pattern 100 generated in such as manner as described hereinabove in connection with the second embodiment to be projected as the structured light pattern 100 to perform corresponding point detection and perform geometric correction in such a manner as described above. In particular, the projection image pickup system 300 (control apparatus 301) can cause a structured light pattern 100 of the configuration described hereinabove in connection with the first embodiment to be projected to perform corresponding point detection and perform geometric correction. Accordingly, the projection image pickup system 300 (control apparatus 301) can improve the invisibility of corresponding point detection similarly as in the case of the first embodiment or the second embodiment.

<Flow of Corresponding Point Detection Process>

Now, a flow of the corresponding point detection process executed at step S302 of FIG. 32 is described with reference to flow charts of FIGS. 34 and 35.

Figure 33:
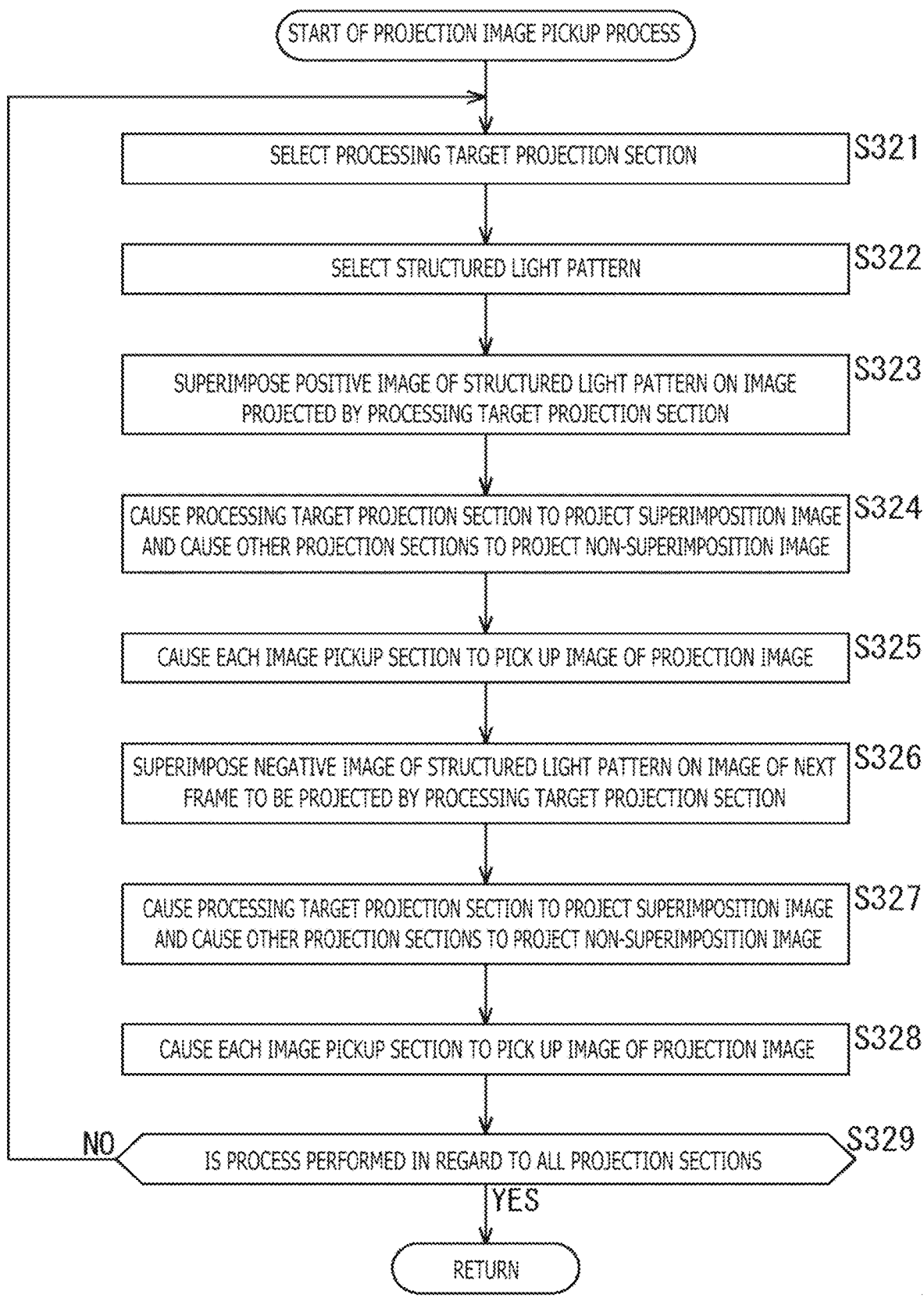
FIG. 33 is a flow chart illustrating an example of a flow of a projection image pickup process.
Figure 34:
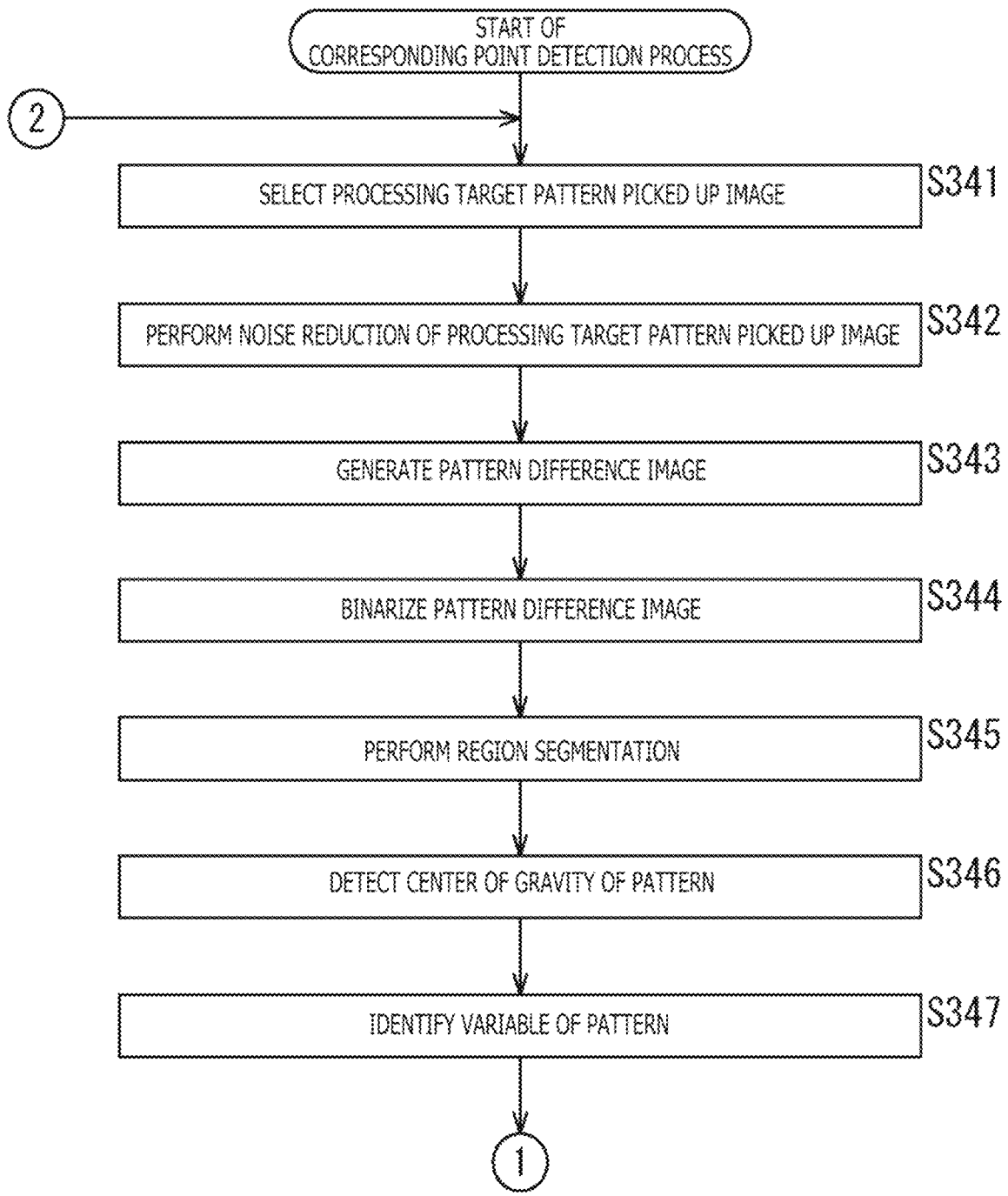
FIG. 34 is a flow chart illustrating an example of a flow of a corresponding point detection process.

After the corresponding point detection process is started, at step S341 of FIG. 34, the control section 361 of the corresponding point detection section 352 selects, from among pattern picked up images, which are not processed as yet, from among pattern picked up images obtained by the individual image pickup sections 312 in the projection image pickup process of FIG. 33, a pattern picked up image to be made a processing target (processing target pattern picked image).

At step S342, the noise reduction section 362 performs noise reduction of the processing target pattern picked up image. The method of noise reduction is arbitrary. For example, the noise reduction section 362 may superimpose a plurality of pattern picked up images obtained by image pickup of the same structured light pattern 100 by the same image pickup section 312 to improve the S/N ratio of the pattern 101.

At step S343, the difference image generation section 363 generates a difference image between pattern picked up images (pattern difference image) between two successive frames. In particular, the difference image generation section 363 takes the difference between the superimposition image of the positive image of the structured light pattern 100 and the superimposition image of the negative image of the structured light pattern 100. By doing so, an image of a content or the like on which the structured light pattern 100 is superimposed is canceled while the image of the structured light pattern 100 is extracted. It is to be noted that, since, thereupon, the positive image and the negative image are opposite in luminance variation direction of the pattern 101, on the pattern difference image, the luminance variation directions of the pattern 101 are the same direction and the luminance variations are added. Therefore, the S/N ration of the pattern 101 can be improved.

At step S344, the binarization section 364 binarizes the pattern difference image. At step S345, the region segmentation section 365 performs 8-neighbor connection region segmentation using the binarized pattern difference image to specify the region of the pattern 101. It is to be noted that, although it is possible to omit the binarization of the pattern difference image, if this binarization is performed, then since the boundary between a portion of the pattern 101 and a portion that is not of the pattern 101 becomes clearer, the region segmentation can be performed more easily and more accurately.

At step S346, the center-of-gravity detection section 366 detects the center of gravity of each pattern 101. This center of gravity can be detected in sub pixel accuracy. Accordingly, by using this center of gravity, corresponding point detection can be performed in sub pixel accuracy (in higher accuracy).

At step S347, the variable identification section 367 identifies a variable of each pattern 101. The variable identification section 367 determines zero-order to second-order moments of each pattern 101 to determine the principal axis of inertia and identifies a variable on the basis of the direction of the principal axis of inertia and the luminance variation direction. After the process at step S347 of FIG. 34 ends, the process advances to step S351 of FIG. 35.

Figure 35:
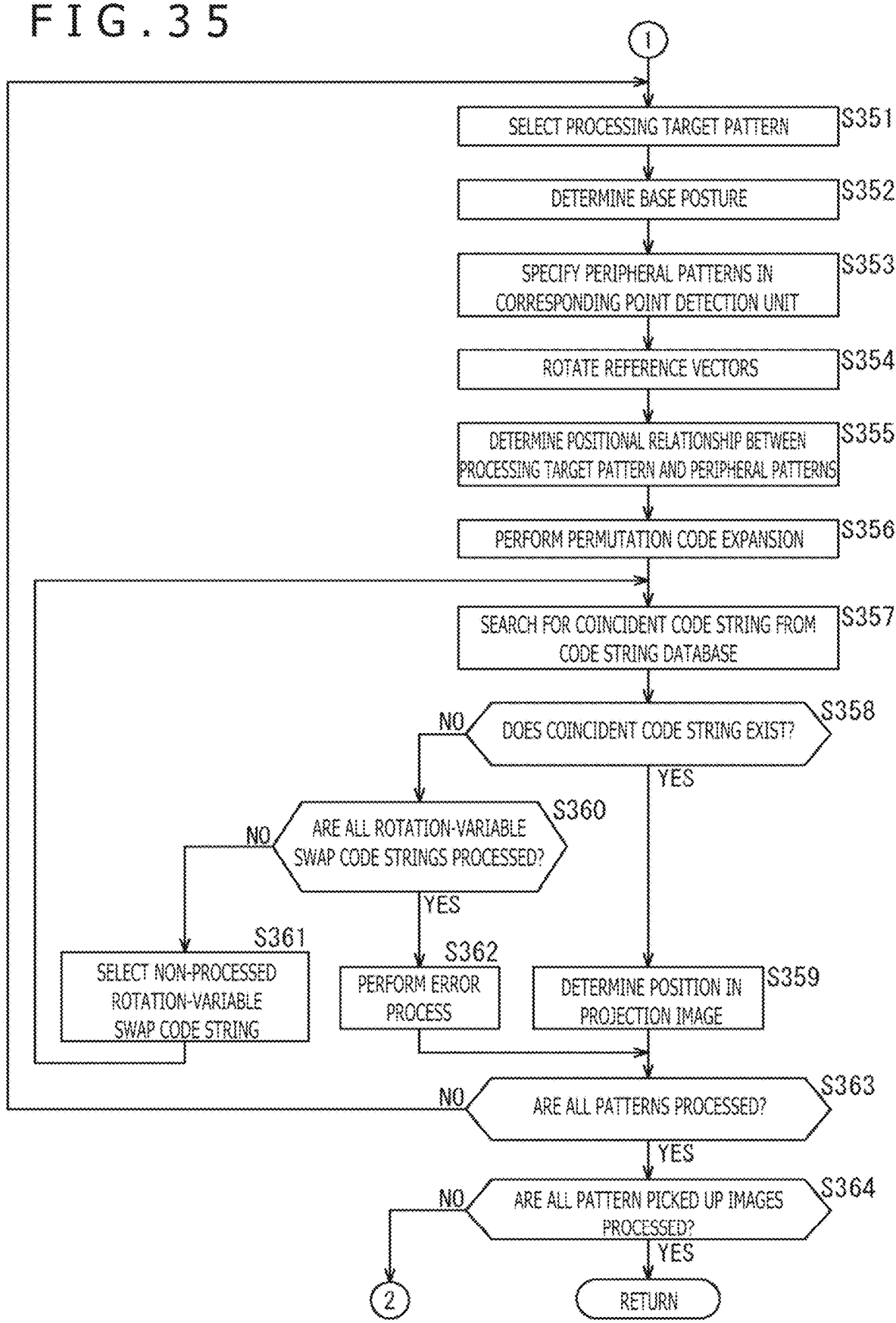
FIG. 35 is a flow chart following FIG. 34 illustrating the example of the flow of the corresponding point detection process.

At step S351 of FIG. 35, the corresponding point detection unit processing section 368 selects a pattern 101 to be made a processing target (processing target pattern).

Figure 36:
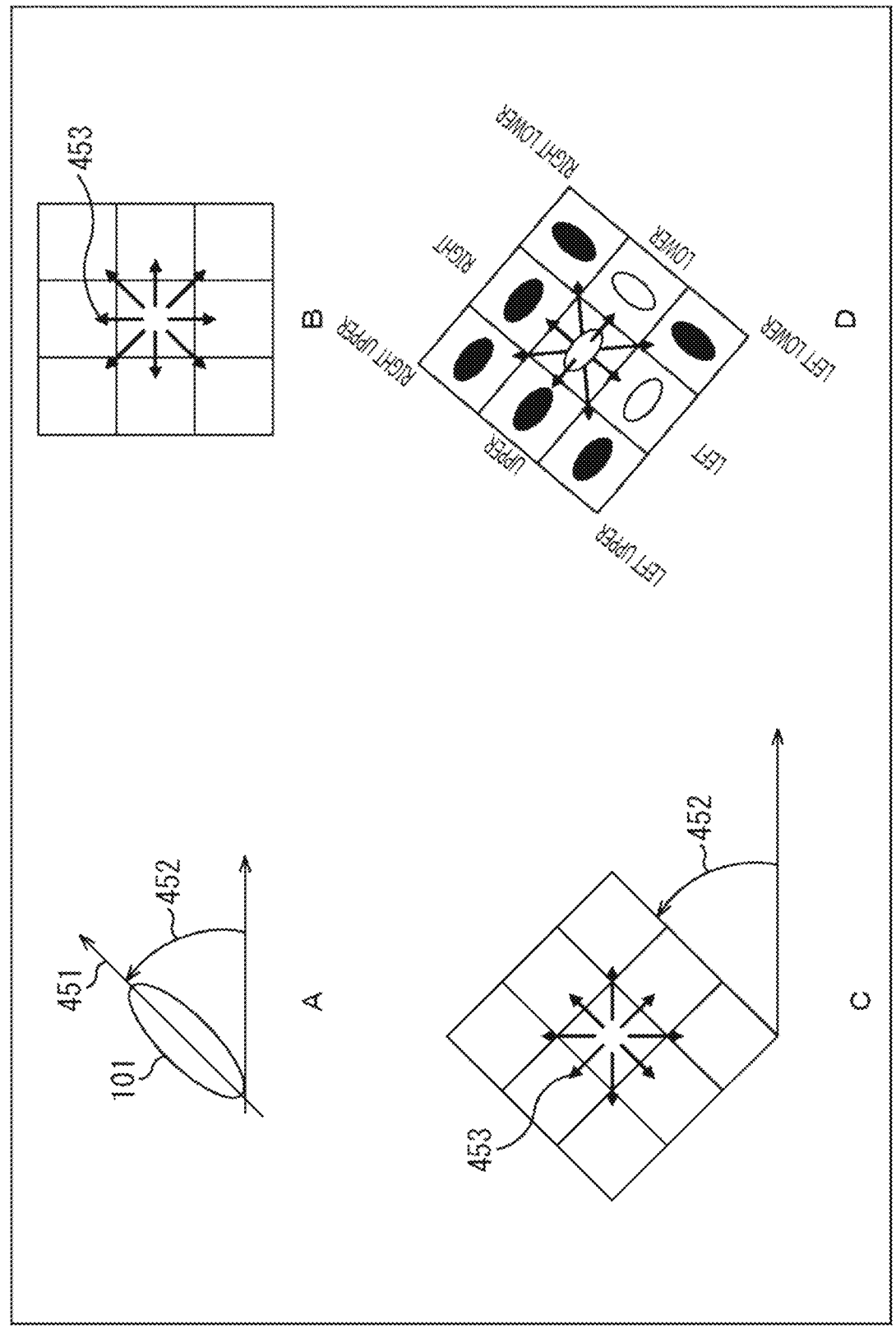
FIGS. 36A, 36B, 36C, and 36D are views illustrating an example of a manner of permutation code expansion.

At step S352, the corresponding point detection unit processing section 368 determines a base posture. The base posture indicates a degree of the inclination between the projection image and the picked up image and is represented by an angle (arrow mark 452) from a reference direction of the principal axis of inertia (arrow mark 451) of the pattern 101, for example, as indicated in FIG. 36A. More particularly, values of the principal axis of inertia of a plurality of patterns 101 extracted in the pattern picked up image are classified into two clusters, and an inertia principal axis average value of one of the classified clusters is determined as a base posture.

At step S353, the corresponding point detection unit processing section 368 specifies patterns 101 (peripheral patterns) around the processing target pattern within a 3×3 corresponding point detection unit centered at the processing target pattern. In short, the corresponding point detection unit processing section 368 specifies the nearest eight centers of gravity from the center of gravity of the processing target pattern.

At step S354, the corresponding point detection unit processing section 368 rotates a reference vector by an amount corresponding to the inclination of the base posture. The reference vector is a vector indicative of a direction from the pattern region in which the processing target pattern is positioned toward a different pattern region in the corresponding point detection unit. For example, in the case of FIG. 36B, the corresponding point detection unit is configured from a 3×3 pattern region group, and the processing target pattern is positioned in the pattern region at the center of the 3×3 pattern region group. Accordingly, in this case, a reference vector 453 is configured from vectors of eight directions (upward, downward, leftward, rightward, right-upward, right-downward, left-upward, and left-downward directions) that are directions from the center pattern region toward the peripheral pattern regions. The reference vectors 453 are rotated by an amount equal to the inclination (arrow mark 452) of the base posture as indicated in FIG. 36C.

At step S355, the corresponding point detection unit processing section 368 performs classification of position categories using the reference vectors rotated in this manner. In particular, the corresponding point detection unit processing section 368 classifies each of the nearest eight patterns (peripheral patterns) around the processing target pattern in regard to in which direction among the reference vectors of the eight directions as viewed from the processing target pattern the nearest pattern is positioned. More particularly, a direction vector directed toward the center of gravity of each peripheral pattern from the center of gravity of the processing target pattern is determined, and inner production values of the reference vector and the direction vectors are determined, and then a position category corresponding to the reference vector is allocated to a peripheral pattern corresponding to the direction vector whose inner production value is lowest (FIG. 36D). Such processes are performed for each reference vector.

At step S356, the permutation code expansion section 369 permutation code expands the individual patterns 101 within corresponding point detection units to generate a code string. Since the classification of position categories is performed using reference vectors rotated by an amount corresponding to an inclination of a base posture as described above, the permutation code expansion section 369 can perform permutation code expansion while suppressing the influence of the inclination of the base posture upon the error in code expansion order. In other words, occurrence of an error in code expansion order can be suppressed, and the permutation code expansion can be performed more accurately.

At step S357, the database search section 370 searches for a code string coincident with the code string from among code strings registered in the code string database 231. In the code string database 231, code strings are registered by such a method as described hereinabove in connection with the second embodiment. The control section 361 decides at step S358 whether or not there exists a coincident code string. In the case where it is decided that a coincident code string exists in the code string database 231, the process advances to step S359.

At step S359, the position specification section 372 determines a position of the coincident code string in the structured light pattern 100 to detect a corresponding point. After the corresponding point is detected, the process advances to step S363.

On the other hand, in the case where it is decided at step S358 that a coincident code string does not exist in the code string database 231, the process advances to step S360.

At step S360, the control section 361 decides, in the case where the code string obtained by permutation code expansion at step S356 is determined as a basic code string, all of code strings that become rotation-variable swap code strings corresponding to the basic code string are processed. In the case where a rotation-variable swap code string that is not processed as yet exists (namely, in the case where a non-processed code string exists which belongs to the same group as that of a code string obtained by permutation code expansion at step S356), the process advances to step S361.

At step S361, the rotation-variable swap code string processing section 371 selects, from among rotation-variable swap code strings corresponding to the code string obtained by permutation code expansion at step S356, a rotation-variable swap code string that is not processed as yet as a processing target, and the process is returned to step S357. In short, a search for a code string coincident with the selected rotation-variable swap code string is performed. Such a series of processes at steps S357 to S361 as described above are repeated until a coincident code string is found out or until a search is ended for all rotation-variable swap code strings. Then, in the case where it is decided at step S360 that all rotation-variable swap code strings are processed, the process advances to step S362.

At step S362, (namely, in the case where a coincident code string is not found), the control section 361 performs an error process. The substance of the error process is arbitrary. After the error process ends, the process advances to step S363. By such processes at steps S357 to S362 as described above, a code string belonging to a group same as that of the code string obtained by the permutation code expansion at step S356 is searched out from among the code strings registered in the code string database 231.

At step S363, the control section 361 decides whether or not all patterns are processed for the pattern picked up image of the processing target. In the case where it is decided that a non-processed pattern exists, the process returns to step S351. In other words, the processes at steps S351 to S363 are executed for each pattern. It is to be noted that, for the second and succeeding times, the processes such as calculation of a base posture, rotation of reference vectors and so forth (steps S352 and S354) are omitted (those that are determined in the first operation cycle are utilized).

In the case where the processes at steps S351 to S363 are executed for each pattern 101 and it is decided at step S363 that all patterns are processed, the process advances to step S364.

At step S364, the control section 361 decides whether or not all pattern picked up images are processed. In the case where it is decided that a non-processed pattern picked up image exists, the process returns to step S341 of FIG. 34. In short, the processes at step S341 of FIG. 34 to step S364 of FIG. 35 are executed for each pattern picked up image.

In the case where the processes at step S341 of FIG. 34 to step S364 of FIG. 35 are executed for each pattern picked up image and it is decided at step S364 of FIG. 35 that all pattern picked up images are processed, the corresponding point detection process ends, and the process returns to FIG. 32.

By detecting a corresponding point in such a manner as described above, detection of a corresponding point can be performed using a structured light pattern 100 generated in the second embodiment (code string registered in the code string database 231 in the second embodiment). In short, the projection image pickup system 300 (control apparatus 301) can perform corresponding point detection using a structured light pattern 100 of a configuration described hereinabove in connection with the first embodiment. Accordingly, the projection image pickup system 300 (control apparatus 301) can improve the invisibility of corresponding point detection similarly as in the case of the first embodiment or the second embodiment.

Figure 37:
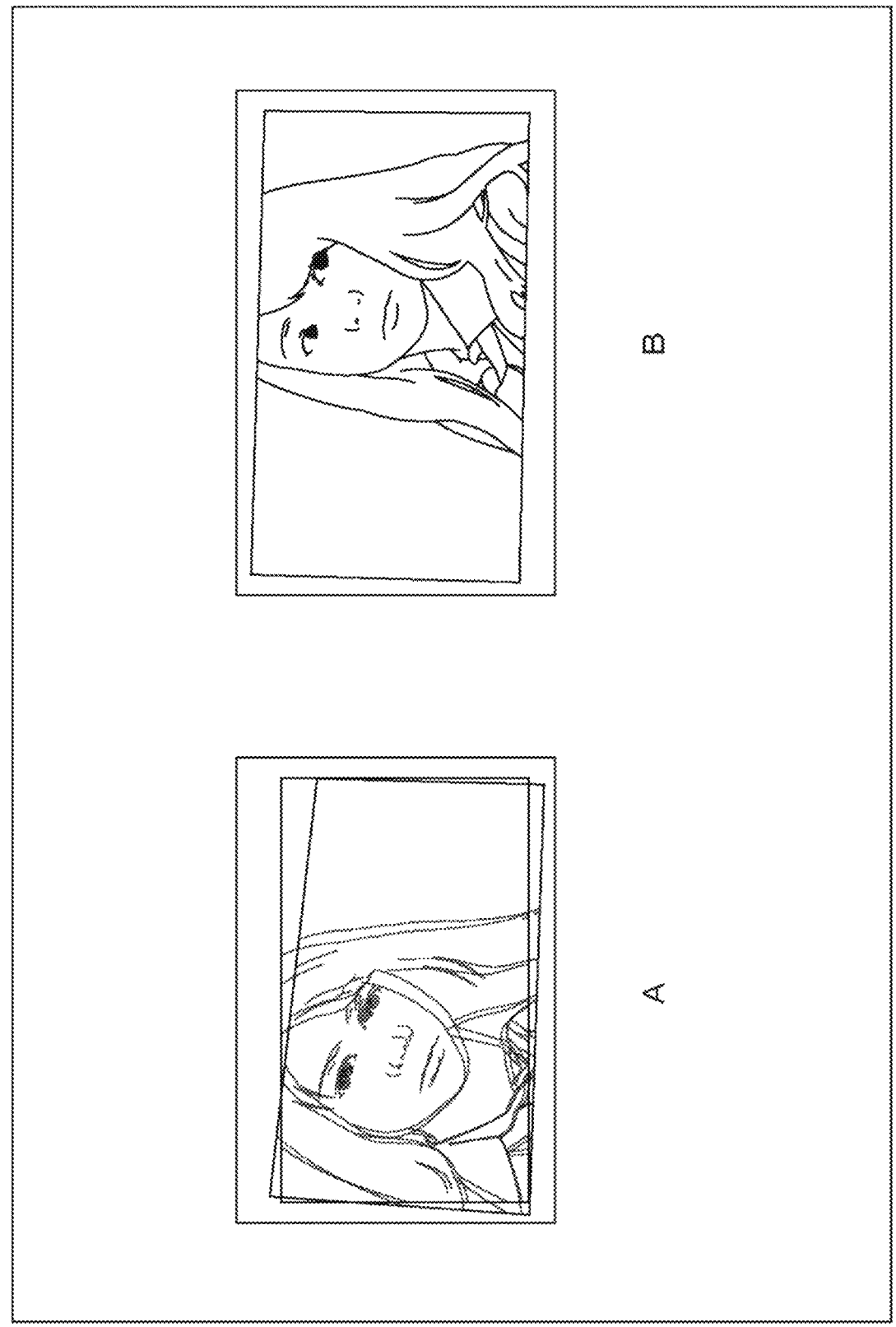
FIGS. 37A and 37B are views illustrating an example of a manner of geometric correction.

Further, since the center of gravity of a pattern 101 can be determined in sub pixel accuracy by performing corresponding point detection as described above, the accuracy in triangulation can be increased sufficiently in comparison with the case of a method that uses a Gray code or a checker pattern and corresponding point detection can be performed with higher accuracy. Accordingly, for example, even in such a case in which a plurality of projection images before geometric correction are superimposed in a state in which they suffer from positional displacement as indicated in FIG. 37A, by performing corresponding point detection and performing geometric correction as described above, positioning can be performed with higher accuracy as depicted in FIG. 37B, and therefore, the picture quality of the projection image can be improved.

Further, by performing corresponding point detection in such a manner as described above, a corresponding point can be determined in a small partial region in comparison with that in an alternative case in which a checker pattern is used, and therefore, it is possible to cope with a case in which the degree of freedom in installation (degree of freedom in position or posture) of a projector or a camera (to detect a corresponding point) is higher.

Furthermore, by performing corresponding point detection in such a manner as described above, corresponding point detection can be performed with a smaller number of structured light patterns 100 than that in an alternative case in which a Gray code or a checker pattern is used. In short, it is possible to detect a corresponding point in a shorter period of time than that in an alternative case in which a Gray code or a checker pattern is used.

4. Fourth Embodiment

<Other Examples of Configuration of Projection Image Pickup System and Projection Image Pickup Apparatus>

It is to be noted that the example of the configuration of the projection image pickup system to which the present technology is applied is not limited to the examples described above. For example, a control apparatus 301 and each projection image pickup apparatus 302 may be connected to each other through a network 501 as in the case of a projection image pickup system 500 depicted in FIG. 38A.

The network 501 is an arbitrary communication network. The communication method adopted in the network 501 is arbitrary. For example, the communication method may be wired communication, or wireless communication, or both of them. Further, the network 501 may be configured from a single communication network or may be configured from a plurality of communication networks. A communication network or a communication path of an arbitrary communication standard such as, for example, the Internet, a public telephone network, a wide area network for wireless mobiles such as a so-called 3G network, a 4G network or the like, a WAN (Wide Area Network), a LAN (Local Area Network), a wireless communication network through which communication in compliance with the Bluetooth (registered trademark) standard is performed, a communication path of short-range wireless communication such as NFC (Near Field Communication) or the like, a communication path of infrared communication, a communication network for wired communication in compliance with a standard such as HDMI (registered trademark) (High-Definition Multimedia Interface), USB (Universal Serial Bus) or the like may be included in the network 501.

The control apparatus 301 and each projection image pickup apparatus 302 are connected for communication to the network 501. It is to be noted that this connection may be a wired connection (namely, a connection through wired communication) or a wireless communication (namely, a connection through wireless communication) or may be both of them. It is to be noted that the number of such apparatus, the shape or the size of a housing, an arrangement position and so forth are arbitrary.

The control apparatus 301 and each projection image pickup apparatus 302 can perform communication (transfer of information and so forth) with each other though the network 501. In other words, the control apparatus 301 and each projection image pickup apparatus 302 may be connected for communication with each other through some other facility (apparatus, transmission path or the like).

Also in the case of the projection image pickup system 500 having such a configuration as described above, the present technology can be applied similarly as in the case of the projection image pickup system 300, and the working-effects described above can be demonstrated.

Figure 38:
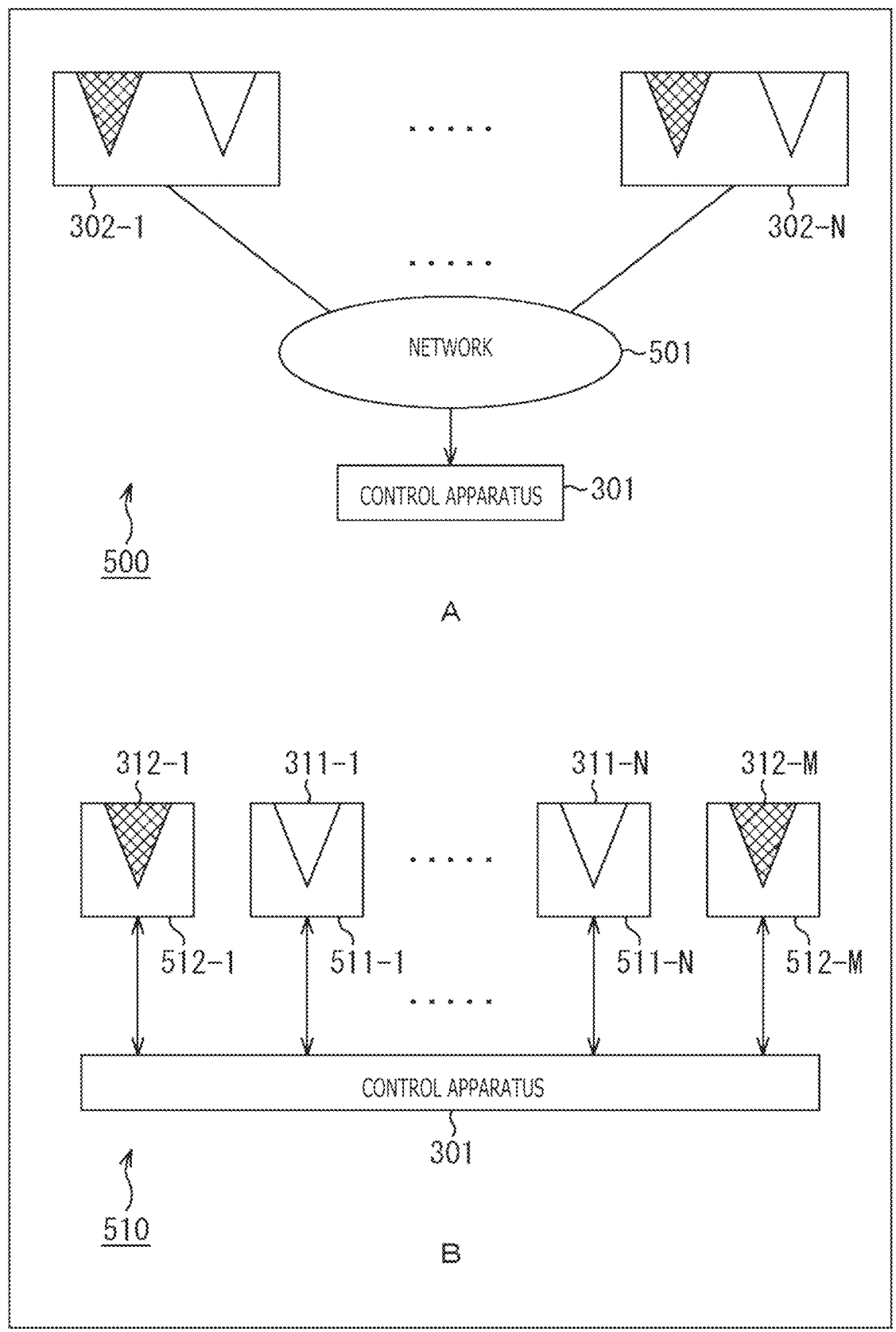
FIGS. 38A and 38B are block diagrams depicting another example of a configuration of a projection image pickup system.

Otherwise, the projection section 311 and the image pickup section 312 may be configured as apparatus different from each other, for example, as in a projection image pickup system 510 depicted in FIG. 38B. The projection image pickup system 510 includes projection apparatus 511-1 to 511-N (N is an arbitrary natural number) and image pickup apparatus 512-1 to 512-M (M is an arbitrary natural number) in place of the projection image pickup apparatus 302. Each of the projection apparatus 511-1 to 511-N includes a projection section 311 (projection sections 311-1 to 311-N) and performs projection of an image. Each of the image pickup apparatus 512-1 to 512-M includes an image pickup section 312 (image pickup sections 312-1 to 312-M) and performs image pickup of a projection plane (projection images projected by the projection sections 311).

In the case where there is no necessity to describe the projection apparatus 511-1 to 511-N in a distinguished manner from each other, each of them is referred to as projection apparatus 511. In the case where there is no necessity to describe the image pickup apparatus 512-1 to 512-M in a distinguished manner from each other, each of them is referred to as image pickup apparatus 512.

Each projection apparatus 511 and each image pickup apparatus 512 are individually connected for communication to the control apparatus 301 and perform communication (to transfer information) with the control apparatus 301 by wired communication or wireless communication or else by both of them. It is to be noted that each projection apparatus 511 and each image pickup apparatus 512 may perform communication with any other projection apparatus 511 or any other image pickup apparatus 512 or with both of them through the control apparatus 301.

Further, the number, the shape or the size of a housing, an arrangement position and so forth of such apparatus are arbitrary. Further, as in the example of FIG. 38A, the individual apparatus may be connected for communication with each other through some other facility (apparatus or transmission path) like the network 501 or the like.

Also in the case of the projection image pickup system 510 having such a configuration as described above, the present technology can be applied similarly as in the case of the projection image pickup system 300, and the working-effects described above can be demonstrated.

Figure 39:
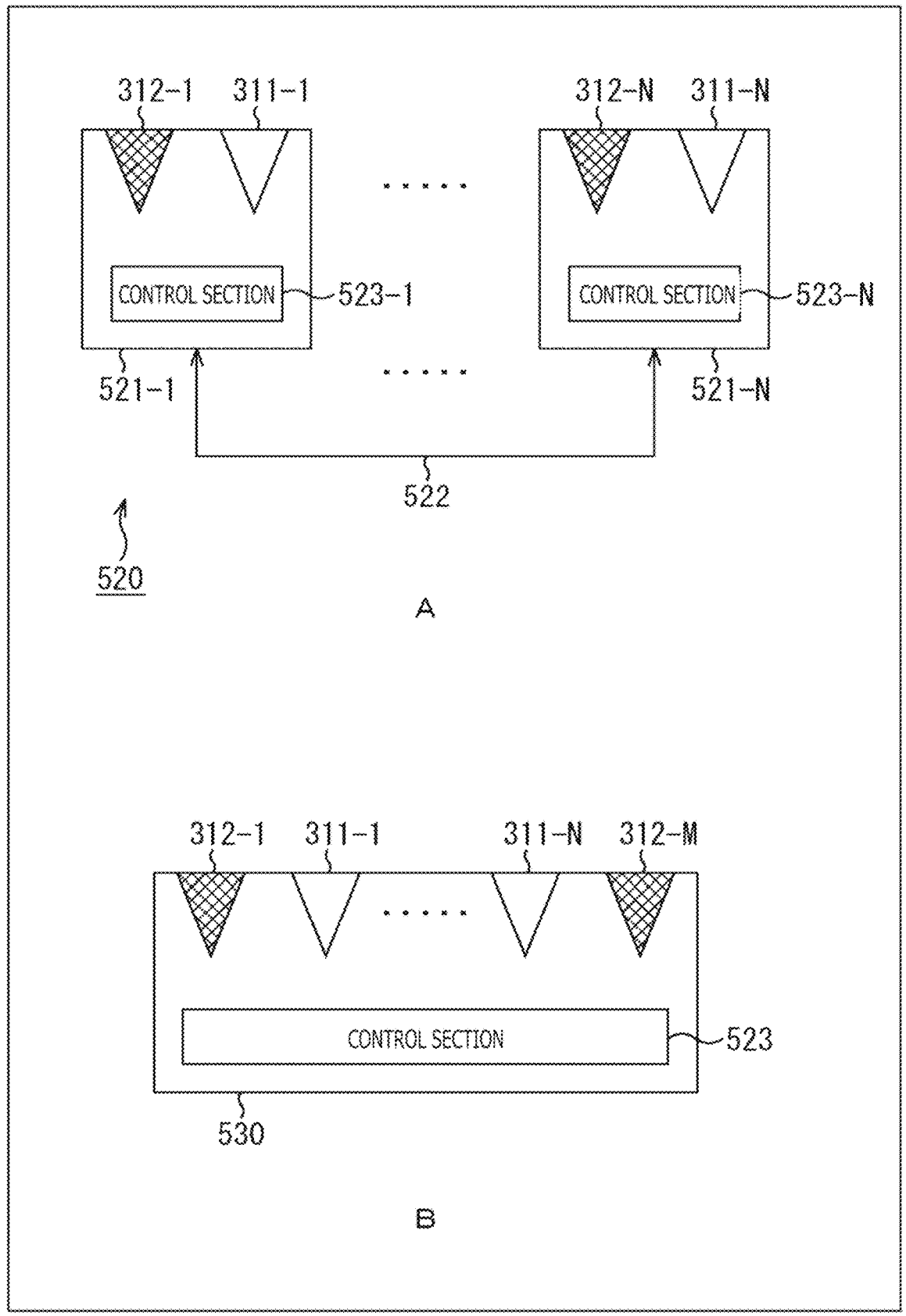
FIGS. 39A and 39B are block diagrams depicting an example of a principal configuration of a projection image pickup system and a projection image pickup apparatus.

Further, the control apparatus 301 may be omitted, for example, as in a projection image pickup system 520 depicted in FIG. 39A. As depicted in FIG. 39A, the projection image pickup system 520 includes projection image pickup apparatus 521-1 to 521-N (N is an arbitrary natural number). Where there is no necessity to describe the projection image pickup apparatus 521-1 to 521-N in a distinguished manner from each other, each of them is referred to as projection image pickup apparatus 521. The individual projection image pickup apparatus 521 are connected for communication with each other through a communication cable 522. It is to be noted that the individual projection image pickup apparatus 521 may be connected for communication with each other by wireless communication.

The projection image pickup apparatus 521-1 to 521-N include control sections 523-1 to 523-N, individually. Where there is no necessity to describe the control sections 523-1 to 523-N in a distinguished manner, each of them is referred to as control section 523. The control sections 523 have functions similar to those of the control apparatus 301 and can perform similar processes.

In particular, in the case of the projection image pickup system 520, processes performed by the control apparatus 301 described hereinabove are performed by (the control section 523 of) the projection image pickup apparatus 521. It is to be noted that (the control section 523 of) one of the projection image pickup apparatus 521 may execute all of processes to be performed by the control apparatus 301, or (the control sections 523 of) the plurality of projection image pickup apparatus 521 may execute process in cooperation by transferring information thereamong or the like.

Also in the case of the projection image pickup system 520 of such a configuration as described above, the present technology can be applied similarly as in the case of the projection image pickup system 300, and the working-effects described above can be demonstrated.

Further, the projection image pickup system 300 may be configured as a single apparatus, for example, as indicated in FIG. 39B. A projection image pickup apparatus 530 depicted in FIG. 39B includes projection sections 311 (projection sections 311-1 to 311-N (N is an arbitrary natural number)), image pickup sections 312 (image pickup sections 312-1 to 312-M (M is an arbitrary natural number)), and a control section 523.

In the projection image pickup apparatus 530, the control section 523 executes the processes performed by the control apparatus 301 described hereinabove to control the projection sections 311 and the image pickup sections 312 to perform detection of a corresponding point and so forth.

Accordingly, also in the case of the projection image pickup apparatus 530 having such a configuration as described above, the present technology can be applied similarly as in the case of the projection image pickup system 300, and the working-effects described above can be demonstrated.

<Software>

While the series of processes described hereinabove can be executed by hardware, it can otherwise be executed by software. In the case where the series of processes is executed by software, a program that constructs the software is installed from a network or a recording medium.

For example, in the case of the structured light pattern generation apparatus 200 of FIG. 21, the recording medium is configured from a removable medium 221 that is distributed in order to distribute the program to a user separately from the apparatus body and has the program recorded thereon. In this case, for example, by loading the removable medium 221 into the drive 215, the drive 215 can read out the program stored in the removable medium 221 and install the program into the storage section 213.

Meanwhile, for example, in the case of the control apparatus 301 of FIG. 26, this recording medium is configured from a removable medium 341 that is distributed in order to distribute the program to a user separately from the apparatus body and has the program recorded thereon. In this case, for example, by loading the removable medium 341 into the drive 335, the drive 335 can read out the program stored in the removable medium 341 and install the program into the storage section 333.

On the other hand, for example, in the case of the projection image pickup apparatus 302 of FIG. 29, this recording medium is configured from a removable medium 421 that is distributed in order to distribute the program to a user separately from the apparatus body and has the program recorded thereon. In this case, for example, by loading the removable medium 421 into the drive 415, the drive 415 can read out the program stored in the removable medium 421 and install the program into the storage section 413.

In the meantime, also it is possible to provide the program through a wired or wireless transmission medium such as a local area network, the Internet, or digital satellite broadcasting. For example, in the case of the structured light pattern generation apparatus 200 of FIG. 21, the program can be received by the communication section 214 and installed into the storage section 213. Meanwhile, for example, in the case of the control apparatus 301 of FIG. 26, the program can be received by the communication section 334 and installed into the storage section 333. Further, for example, in the case of the projection image pickup apparatus 302 of FIG. 29, the program can be received by the communication section 414 and installed into the storage section 413.

On the other hand, also it is possible to install the program in advance in a storage section, a ROM or the like. For example, in the case of the structured light pattern generation apparatus 200 of FIG. 21, the program can be installed in the storage section 213, the ROM 202 or the like in advance. Meanwhile, in the case of the control apparatus 301 of FIG. 26, also it is possible to store the program in the storage section 333, the ROM 322 or the like in advance. Further, in the case of the projection image pickup apparatus 302 of FIG. 29, the program can be installed in the storage section 413, a ROM (not depicted) built in the control section 401 or the like in advance.

It is to be noted that, in the program executed by a computer, processes at steps that describe the program may be executed in a chronological order in accordance with the order described in the present specification or may be executed individually in parallel or at necessary timings such as when they are called or the like. Furthermore, processes at steps describing this program may be executed in parallel to process of a different program or may be executed in combination with processes of a different program.

Further, the processes at the steps described above can be executed by the individual apparatus described above or by an arbitrary apparatus other than the apparatus. In this case, the apparatus that executes the processes may be configured so as to have functions (functional blocks or the like) necessary to execute the processes described above. Further, information necessary for the processes may be transmitted suitably to the apparatus.

<Others>

The embodiments of the present technology are not limited to the embodiments described above and can be altered in various manners without departing from the subject matter of the present technology.

For example, in the present specification, the term system signifies an aggregation of a plurality of constituent elements (apparatus, modules (parts) and so forth) and it does not matter whether or not all of the constituent elements are accommodated in the same housing. Accordingly, a plurality of apparatus accommodated in separate housings and connected to each other through a network are a system, and one apparatus that includes a plurality of modules accommodated in a single housing is a system.

Further, for example, a configuration described as one apparatus (or processing section) may be divided so as to be configured as a plurality of apparatus (or processing section). In contrast, configurations described as a plurality of apparatus (processing sections) in the foregoing description may be gathered together so as to be configured as a single apparatus (or a processing section). Further, a configuration other than those described above may naturally be added to the configurations of the various apparatus (or various processing sections). Further, if a configuration or operation as the entire system is substantially same, then part of the configuration of a certain apparatus (or a processing section) may be included in the configuration of a different apparatus (or a different processing section).

Further, for example, the present technology can assume a configuration for cloud computing by which one function is shared by and processed through cooperation of a plurality of apparatus through a network.

Further, for example, the steps described in connection with the flow charts described hereinabove not only can be executed by a single apparatus but also can be shared and executed by a plurality of apparatus. Furthermore, in the case where a plurality of processes are included in one step, the plurality of processes included in the one step not only can be executed by a single apparatus but also can be shared and executed by a plurality of apparatus.

Further, it is possible not only to carry out the present technology as an apparatus or a system but also to carry out the present technology as any configuration that is incorporated in the apparatus or an apparatus configuring the system, for example, as a processor such as, for example, a system LSI (Large Scale Integration) or the like, a module in which a processors or the like are used, a unit in which a plurality of modules or the like are used, a set in which a different function is added to the unit or the like (namely, as a configuration of part of an apparatus).

It is to be noted that the plurality of present technologies described in the present specification can be carried out independently of each other or solely if no contradiction occurs. Naturally, it is possible to carry out a plurality of arbitrarily ones of present technologies in combination. For example, the present technology described in connection with some embodiment may be carried out in combination of the present technology described in connection with a different embodiment. Further, also it is possible to carry out an arbitrary one of the present technologies described hereinabove in combination with a different technology that is not described hereinabove.

It is to be noted that the present technology can assume also such configurations as described below.

(1) An image processing apparatus including:

a corresponding point detection section that detects, using a pattern picked up image obtained by image pickup, by an image pickup section, of a given structured light pattern projected by a projection section and having a plurality of patterns, each of which has a luminance distribution of a Gaussian function, disposed therein, corresponding points between a projection image projected by the projection section and a picked up image picked up by the image pickup section.

(2) An image processing method including:

detecting, using a pattern picked up image obtained by image pickup, by an image pickup section, of a given structured light pattern projected by a projection section and having a plurality of patterns, each of which has a luminance distribution of a Gaussian function, disposed therein, corresponding points between a projection image projected by the projection section and a picked up image picked up by the image pickup section.

(3) An image processing apparatus including:

a corresponding point detection section that detects, using a pattern picked up image obtained by image pickup, by an image pickup section, of a structured light pattern that is projected by a projection section and has a plurality of patterns of a plurality of types disposed therein and in which the patterns are disposed such that, based on a code string obtained by permutation expansion of variables into which a pattern group in a partial region of a given size from within the structured light pattern is converted, a position of the partial region in the structured light pattern is determined uniquely, corresponding points between a projection image projected by the projection section and a picked up image picked up by the image pickup section.

(4) The image processing apparatus according to (3), in which the corresponding point detection section converts the patterns included in the pattern picked up image into variables and permutation-expands the variables to determine a code string, and searches for the partial region corresponding to a code string coincident with the code string corresponding to the patterns included in the pattern picked up image from within the structured light pattern to detect the corresponding point.

(5) The image processing apparatus according to (4), in which the corresponding point detection section searches a code string coincident with the code string corresponding to the patterns included in the pattern picked up image from within a code string group corresponding to partial regions of the structured light pattern, and detects the corresponding point based on a position of the partial region, with which the code string coincides, in the structured light pattern.

(6) The image processing apparatus according to (5), in which the code string group corresponding to the partial regions of the structured light pattern is configured only from code strings that belong to groups different from each other, and the corresponding point detection section is configured such that, in regard to all of the code strings belonging to the same groups as those of the code strings corresponding to the patterns included in the pattern picked up image, a coincident code string can be searched out from within the code string group corresponding to each partial region of the structured light pattern.

(7) The image processing apparatus according to (6), in which the group includes code strings obtained by converting patterns of a given pattern group into variables and permutation expanding the variables and code strings obtained by rotating the pattern group by a given angle, converting the patterns of the rotated pattern group into variables and permutation expanding the variables.

(8) The image processing apparatus according to any one of (3) to (7), in which the corresponding point detection section extracts the patterns from the pattern picked up image obtained by the image pickup section picking up a superimposition image of an arbitrary image projected by the projection section and the structured light pattern.

(9) The image processing apparatus according to (8), in which the corresponding point detection section extracts the patterns using a first pattern picked up image obtained by the image pickup section picking up a superimposition image of an arbitrary image projected by the projection section and a positive image of the structured light pattern and a second pattern picked up image obtained by the image pickup section picking up a superimposition image of the arbitrary image projected by the projection section and a negative image of the structured light pattern.

(10) The image processing apparatus according to any one of (3) to (9), in which each of the patterns has a luminance distribution of a Gaussian function.

(11) The image processing apparatus according to any one of (3) to (10), in which the structured light pattern is configured from four kinds of patterns that are combinations of two kinds of luminance distributions having luminance variation directions opposite to each other and two directions having principal axes of inertia different from each other.

(12) An image processing method including:

detecting, using a pattern picked up image obtained by image pickup, by an image pickup section, of a structured light pattern that is projected by a projection section and has a plurality of patterns of a plurality of types disposed therein and in which the patterns are disposed such that, based on a code string obtained by permutation expansion of variables into which a pattern group in a partial region of a given size from within the structured light pattern is converted, a position of the partial region in the structured light pattern is determined uniquely, corresponding points between a projection image projected by the projection section and a picked up image picked up by the image pickup section.

(13) An image processing apparatus including:
a generation section that generates a structured light pattern in which a plurality of patterns each having a luminance distribution of a Gaussian function are disposed and which is provided for detecting corresponding points between a projection image projected by a projection section and a picked up image picked up by an image pickup section.

(14) An image processing method including:
generating a structured light pattern in which a plurality of patterns each having a luminance distribution of a Gaussian function are disposed and which is provided for detecting corresponding points between a projection image projected by a projection section and a picked up image picked up by an image pickup section.

(15) An image processing apparatus including:
a generation section that generates a structured light pattern that has a plurality of patterns of a plurality of types disposed therein and is provided for detecting, based on a code string obtained by permutation expansion of variables into which a pattern group in a partial region of a given size from within the structured light pattern is converted, corresponding points between a projection image projected by the projection section and having the patterns such that a position of the partial region in the structured light pattern is determined uniquely and a picked up image picked up by the image pickup section.

(16) An image processing method including:
generating a structured light pattern that has a plurality of patterns of a plurality of types disposed therein and is provided for detecting, based on a code string obtained by permutation expansion of variables into which a pattern group in a partial region of a given size from within the structured light pattern is converted, corresponding points between a projection image projected by the projection section and having the patterns such that a position of the partial region in the structured light pattern is determined uniquely and a picked up image picked up by the image pickup section.

(17) Data of a structured light pattern in which a plurality of patterns each having a luminance distribution of a Gaussian distribution are disposed and which is provided for detecting corresponding points between a projection image projected by a projection section and a picked up image picked up by an image pickup section.

(18) A recording medium that has store therein data of a structured light pattern in which a plurality of patterns each having a luminance distribution of a Gaussian distribution are disposed and which is provided for detecting corresponding points between a projection image projected by a projection section and a picked up image picked up by an image pickup section.

(19) Data of a structured light pattern that has a plurality of patterns of a plurality of types disposed therein and is provided for detecting, based on a code string obtained by permutation expansion of variables into which a pattern group in a partial region of a given size from within the structured light pattern is converted, corresponding points between a projection image projected by the projection section and having the patterns such that a position of the partial region in the structured light pattern is determined uniquely and a picked up image picked up by the image pickup section.

(20) A recording medium that has stored therein data of a structured light pattern that has a plurality of patterns of a plurality of types disposed therein and is provided for detecting, based on a code string obtained by permutation expansion of variables into which a pattern group in a partial region of a given size from within the structured light pattern is converted, corresponding points between a projection image projected by the projection section and having the patterns such that a position of the partial region in the structured light pattern is determined uniquely and a picked up image picked up by the image pickup section.

REFERENCE SIGNS LIST

100 Structured light pattern, 101 Pattern, 121 region, 200 Structured light pattern generation apparatus, 231 Code string database, 240 Structured light pattern generation section, 241 Pattern region setting section, 242 Processing target corresponding point detection unit selection section, 243 Pattern setting section, 244 Basic code string generation section, 245 Rotation-variable swap code string generation section, 246 Code string search section, 247 Code string registration section, 300 Projection image pickup system, 301 Control apparatus, 302 Projection image pickup apparatus, 311 Projection section, 312 Image pickup section, 351 Projection image pickup processing section, 352 Corresponding point detection section, 353 Posture estimation section, 354 Geometric correction section, 355 Projection controlling section, 356 Image pickup controlling section, 361 Control section, 362 Noise reduction section, 363 Difference image generation section, 364 Binarization section, 365 Region segmentation section, 366 Center-of-gravity detection section, 367 Variable identification section, 368 Corresponding point detection unit processing section, 369 Permutation code expansion section, 370 Database search section, 371 Rotation-variable swap code string processing section, 372 Position specification section, 401 control section, 500 Projection image pickup system, 501 network, 510 Projection image pickup system, 511 Projection apparatus, 512 Image pickup apparatus, 520 Projection image pickup system, 521 Projection image pickup apparatus, 523 control section, 530 Projection image pickup apparatus

The invention claimed is:
1. An image processing apparatus, comprising:
a central processing unit (CPU) configured to:
control capture of an image of a structured light pattern which is projected on a screen, wherein
the structured light pattern comprises a plurality of patterns,
a partial region, of the structured light pattern, of a specific size comprises a pattern group,
the plurality of patterns corresponds to four kinds of patterns,
the four kinds of patterns are combinations of at least a first kind of pattern with a first kind of luminance distribution having a first luminance variation direction, and at least a second kind of pattern with a second kind of luminance distribution having a second luminance variation direction,
the first luminance variation direction is opposite to the second luminance variation direction, and a principal axis of inertia in the first luminance variation direction is different from a principal axis of inertia in the second luminance variation direction;

convert the pattern group of the partial region into a first plurality of variables;

obtain a first code string based on a permutation expansion of the first plurality of variables, wherein the plurality of patterns is in the structured light pattern such that a position of the partial region is uniquely determinable based on the first code string;

search, within a group of code strings, for a second code string which is coincident with the first code string, wherein the first code string corresponds to a set of patterns of the plurality of patterns in the captured image, and the group of code strings corresponds to a plurality of partial regions of the structured light pattern; and detect a plurality of corresponding points between a projection image projected on the screen and the captured image, based on the second code string and the position of the partial region of the structured light pattern, wherein the second code string coincides with the partial region of the structured light pattern.

2. The image processing apparatus according to claim 1, wherein the CPU is further configured to:

convert the plurality of patterns in the captured image, into a second plurality of variables; and search for the partial region corresponding to the second code string, wherein the plurality of corresponding points is detected based on the search for the partial region.

3. The image processing apparatus according to claim 1, wherein each code string, of the group of code strings corresponding to the plurality of partial regions of the structured light pattern, belong to a corresponding code string group of a plurality of code string groups, the CPU is further configured to search, based on a third code string that belongs to a specific code string group of the plurality of code string groups, a fourth code string from the group of code strings, the specific code string group of the plurality of code string groups has at least one code string of the group of code strings, and the third code string is coincident with the fourth code string.

4. The image processing apparatus according to claim 3, wherein the CPU is further configured to:

rotate the pattern group by a specific angle; and convert the set of patterns of the plurality of patterns of the rotated pattern group into a second plurality of variables, and the group of code strings comprises at least one code string obtained by a permutation expansion of the second plurality of variables.

5. The image processing apparatus according to claim 1, wherein the CPU is further configured to:

control capture of a superimposition image comprising an arbitrary image projected on the screen and the image of the structured light pattern; and extract the plurality of patterns from the captured superimposition image.

6. The image processing apparatus according to claim 1, wherein the CPU is further configured to:

control capture of a first superimposition image comprising an arbitrary image projected on the screen and a positive image of the structured light pattern;

control capture of a second superimposition image comprising the arbitrary image projected on the screen and a negative image of the structured light pattern; and extract the plurality of patterns based on the captured first superimposition image and the captured second superimposition image.

7. The image processing apparatus according to claim 1, wherein each pattern of the plurality of patterns has a luminance distribution of a Gaussian function.

8. An image processing method, comprising:

capturing an image of a structured light pattern which is projected on a screen, wherein the structured light pattern comprises a plurality of patterns, a partial region, of the structured light pattern, of a specific size comprises a pattern group, the plurality of patterns corresponds to four kinds of patterns, the four kinds of patterns are combinations of at least a first kind of pattern with a first kind of luminance distribution having a first luminance variation direction, and at least a second kind of pattern with a second kind of luminance distribution having a second luminance variation direction, the first luminance variation direction is opposite to the second luminance variation direction, and a principal axis of inertia in the first luminance variation direction is different from a principal axis of inertia in the second luminance variation direction;

converting the pattern group of the partial region into a plurality of variables;

obtaining a first code string based on a permutation expansion of the plurality of variables, wherein the plurality of patterns is in the structured light pattern such that a position of the partial region is uniquely determinable based on the first code string;

searching, within a group of code strings, for a second code string which is coincident with the first code string, wherein the first code string corresponds to a set of patterns of the plurality of patterns in the captured image, and the group of code strings corresponds to a plurality of partial regions of the structured light pattern; and detecting a plurality of corresponding points between a projection image projected on the screen and the captured image, based on the second code string and the position of the partial region of the structured light pattern, wherein the second code string coincides with the partial region of the structured light pattern.

9. An image processing apparatus, comprising:

a central processing unit (CPU) configured to:

generate a structured light pattern comprising a plurality of patterns, wherein a partial region, of the structured light pattern, of a specific size comprises a pattern group;

control capture of an image of the structured light pattern which is projected on a screen, wherein the plurality of patterns corresponds to four kinds of patterns,
the four kinds of patterns are combinations of at least a first kind of pattern with a first kind of luminance distribution having a first luminance variation direction, and at least a second kind of pattern with a second kind of luminance distribution having a second luminance variation direction,
the first luminance variation direction is opposite to the second luminance variation direction, and
a principal axis of inertia in the first luminance variation direction is different from a principal axis of inertia in the second luminance variation direction;
convert the pattern group of the partial region into a plurality of variables;
obtain a first code string based on a permutation expansion of the plurality of variables,
wherein the plurality of patterns is in the structured light pattern such that a position of the partial region is uniquely determinable based on the first code string;
search, within a group of code strings, for a second code string which is coincident with the first code string, wherein
the first code string corresponds to a set of patterns of the plurality of patterns in the captured image, and
the group of code strings corresponds to a plurality of partial regions of the structured light pattern; and
detect a plurality of corresponding points between a projection image projected on the screen and the captured image, based on the second code string and the position of the partial region of the structured light pattern,
wherein the second code string coincides with the partial region of the structured light pattern.

10. An image processing method, comprising:
generating a structured light pattern comprising a plurality of patterns, wherein
a partial region, of the structured light pattern, of a specific size comprises a pattern group;
capturing an image of the structured light pattern which is projected on a screen, wherein
the plurality of patterns corresponds to four kinds of patterns,
the four kinds of patterns are combinations of at least a first kind of pattern with a first kind of luminance distribution having a first luminance variation direction, and at least a second kind of pattern with a second kind of luminance distribution having a second luminance variation direction,
the first luminance variation direction is opposite to the second luminance variation direction, and
a principal axis of inertia in the first luminance variation direction is different from a principal axis of inertia in the second luminance variation direction;
converting the pattern group of the partial region into a plurality of variables;
obtaining a first code string based on a permutation expansion of the plurality of variables,
wherein the plurality of patterns is in the structured light pattern such that a position of the partial region is uniquely determinable based on the first code string;
searching, within a group of code strings, for a second code string which is coincident with the first code string, wherein
the first code string corresponds to a set of patterns of the plurality of patterns in the captured image, and
the group of code strings corresponds to a plurality of partial regions of the structured light pattern; and
detecting a plurality of corresponding points between a projection image projected on the screen and the captured image, based on the second code string and the position of the partial region of the structured light pattern,
wherein the second code string coincides with the partial region of the structured light pattern.

11. A non-transitory computer-readable medium having stored thereon computer-executable instructions that, when executed by a computer, cause the computer to execute operations, the operations comprising:
controlling capture of an image of a structured light pattern which is projected on a screen, wherein
the structured light pattern comprises a plurality of patterns,
a partial region, of the structured light pattern, of a specific size comprises a pattern group,
the plurality of patterns corresponds to four kinds of patterns,
the four kinds of patterns are combinations of at least a first kind of pattern with a first kind of luminance distribution having a first luminance variation direction, and at least a second kind of pattern with a second kind of luminance distribution having a second luminance variation direction,
the first luminance variation direction is opposite to the second luminance variation direction, and
a principal axis of inertia in the first luminance variation direction is different from a principal axis of inertia in the second luminance variation direction;
converting the pattern group of the partial region into a plurality of variables;
obtaining a first code string based on a permutation expansion of the plurality of variables,
wherein the plurality of patterns is in the structured light pattern such that a position of the partial region is uniquely determinable based on the first code string;
searching, within a group of code strings, for a second code string which is coincident with the first code string, wherein
the first code string corresponds to a set of patterns of the plurality of patterns in the captured image, and
the group of code strings corresponds to a plurality of partial regions of the structured light pattern; and
detecting a plurality of corresponding points between a projection image projected on the screen and the captured image, based on the second code string and the position of the partial region of the structured light pattern,
wherein the second code string coincides with the partial region of the structured light pattern.

12. An image processing apparatus, comprising:
a central processing unit (CPU) configured to:
control capture of an image of a structured light pattern which is projected on a screen, wherein
the structured light pattern comprises a plurality of patterns,
a partial region, of the structured light pattern, of a specific size comprises a pattern group, the plurality of patterns is disposed in the structured light pattern such that a position of the partial region is uniquely determinable based on a first code string, the plurality of patterns corresponds to four kinds of patterns, the four kinds of patterns are combinations of at least a first kind of pattern with a first kind of luminance distribution having a first luminance variation direction, and at least a second kind of pattern with a second kind of luminance distribution having a second luminance variation direction, the first luminance variation direction is opposite to the second luminance variation direction, and a principal axis of inertia in the first luminance variation direction is different from a principal axis of inertia in the second luminance variation direction;

convert the pattern group of the partial region into a plurality of variables;

obtain the first code string based on a permutation expansion of the plurality of variables; and detect a plurality of corresponding points between a projection image projected on the screen and the captured image, based on a second code string.

* * * * *